(12) United States Patent
Bhageria et al.

(10) Patent No.: US 12,005,590 B2
(45) Date of Patent: Jun. 11, 2024

(54) SYSTEM AND/OR METHOD FOR ROBOTIC FOODSTUFF ASSEMBLY

(71) Applicant: Chef Robotics, Inc., San Francisco, CA (US)

(72) Inventors: Rajat Bhageria, San Francisco, CA (US); Clement Creusot, San Francisco, CA (US); Luis Rayas, San Francisco, CA (US); Dean Wilhelmi, San Francisco, CA (US); Harjot Bal, San Francisco, CA (US); Xinyi Daniel Tang, San Francisco, CA (US); Erik Gokbora, San Francisco, CA (US); Connor Buckland, San Francisco, CA (US); Kody Brown, San Francisco, CA (US); Weston Wahl, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 0 days.

(21) Appl. No.: 17/881,484

(22) Filed: Aug. 4, 2022

(65) Prior Publication Data

US 2023/0039524 A1 Feb. 9, 2023

Related U.S. Application Data

(60) Provisional application No. 63/336,030, filed on Apr. 28, 2022, provisional application No. 63/229,420, filed on Aug. 4, 2021.

(51) Int. Cl.
*B25J 9/16* (2006.01)
*B25J 9/00* (2006.01)
(Continued)

(52) U.S. Cl.
CPC ........... *B25J 9/1687* (2013.01); *B25J 9/0093* (2013.01); *B25J 9/161* (2013.01); *B25J 9/1653* (2013.01);
(Continued)

(58) Field of Classification Search
CPC ........ B25J 9/1687; B25J 9/0093; B25J 9/161; B25J 9/1653; B25J 9/1664; B25J 9/1697;
(Continued)

(56) References Cited

U.S. PATENT DOCUMENTS 4,922,435 A 5/1990 Cahlander et al.
9,895,018 B2 2/2018 Lin
(Continued)

FOREIGN PATENT DOCUMENTS

JP 2019025646 A1 2/2019
WO 2011152520 A1 12/2011
(Continued)

*Primary Examiner* — Abby Y Lin
*Assistant Examiner* — Esvinder Singh
(74) *Attorney, Agent, or Firm* — Jeffrey Schox

(57) ABSTRACT

The foodstuff assembly system can include: a robot arm, a frame, a set of foodstuff bins, a sensor suite, a set of food utensils, and a computing system. The system can optionally include: a container management system, a human machine interface (HMI). However, the foodstuff assembly system 100 can additionally or alternatively include any other suitable set of components. The system functions to enable picking of foodstuff from a set of foodstuff bins and placement into a container (such as a bowl, tray, or other foodstuff receptacle). Additionally or alternatively, the system can function to facilitate transferal of bulk material (e.g., bulk foodstuff) into containers, such as containers moving along a conveyor line.

16 Claims, 31 Drawing Sheets

(51) Int. Cl.
  *B25J 11/00*  (2006.01)
  *B25J 13/06*  (2006.01)
(52) U.S. Cl.
  CPC ........... *B25J 9/1664* (2013.01); *B25J 9/1697* (2013.01); *B25J 11/0045* (2013.01); *B25J 13/06* (2013.01)
(58) Field of Classification Search
  CPC ...... B25J 11/0045; B25J 13/06; B25J 19/023; B25J 5/02; B25J 9/1602; B25J 9/1628; B25J 9/163; B25J 9/1656; B25J 9/1661; B25J 9/1679; B25J 9/1684; B25J 15/0014; B25J 19/021; G06T 7/10; G06T 7/12; G06T 7/50; G06T 3/0031; G05B 2219/40079; G05B 2219/40537; B65B 25/001; B65B 25/22; B65B 43/46; B65B 35/16; B65B 5/105; B65B 35/36; B65G 47/90
  See application file for complete search history.

(56) References Cited

U.S. PATENT DOCUMENTS

| | | |
|---|---|---|
| 11,577,401 B2 | 2/2023 | Sinnet et al. |
| 11,745,348 B2 | 9/2023 | Bhageria et al. |
| 2016/0059412 A1 | 3/2016 | Oleynik |
| 2017/0290345 A1 | 10/2017 | Garden et al. |
| 2018/0050451 A1* | 2/2018 | Takanishi ............... B25J 9/1697 |
| 2018/0250810 A1* | 9/2018 | Sirkett ................. H04N 1/1008 |
| 2020/0054175 A1 | 2/2020 | Roy et al. |
| 2020/0086485 A1* | 3/2020 | Johnson ................ B25J 9/1633 |
| 2021/0069904 A1* | 3/2021 | Duan .................... B25J 9/1653 |
| 2021/0171283 A1* | 6/2021 | Deacon ................... B62J 27/00 |
| 2021/0187741 A1* | 6/2021 | Marthi ...................... G06T 7/74 |
| 2022/0016758 A1* | 1/2022 | Whitiker ................ B25J 9/1697 |
| 2022/0048707 A1* | 2/2022 | Matl .................... B65G 47/915 |
| 2022/0072707 A1* | 3/2022 | Fan .......................... G06T 7/73 |
| 2022/0177241 A1* | 6/2022 | Brinkmeyer ........... B65G 61/00 |
| 2022/0371833 A1* | 11/2022 | Ikemoto ................ B65G 43/08 |
| 2022/0410381 A1* | 12/2022 | Stoppi ................... B25J 19/023 |
| 2023/0027984 A1* | 1/2023 | Rodrigues ............. B25J 13/089 |
| 2023/0278229 A1 | 9/2023 | Brown et al. |
| 2023/0398689 A1 | 12/2023 | Brown et al. |

FOREIGN PATENT DOCUMENTS

| | | |
|---|---|---|
| WO | 2020188262 A1 | 9/2020 |
| WO | 2020261601 A1 | 12/2020 |
| WO | 2021044053 A1 | 3/2021 |

* cited by examiner

SYSTEM AND/OR METHOD FOR ROBOTIC FOODSTUFF ASSEMBLY

CROSS REFERENCE TO RELATED APPLICATIONS

This application claims the benefit of U.S. Provisional Application No. 63/229,420, filed 4 Aug. 2021, and U.S. Provisional Application No. 63/336,030, filed 28 Apr. 2022, each of which is incorporated herein in its entirety by this reference.

TECHNICAL FIELD

This invention relates generally to the food industry field, and more specifically to a new and useful robotic foodstuff assembly system and/or method in the food industry field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
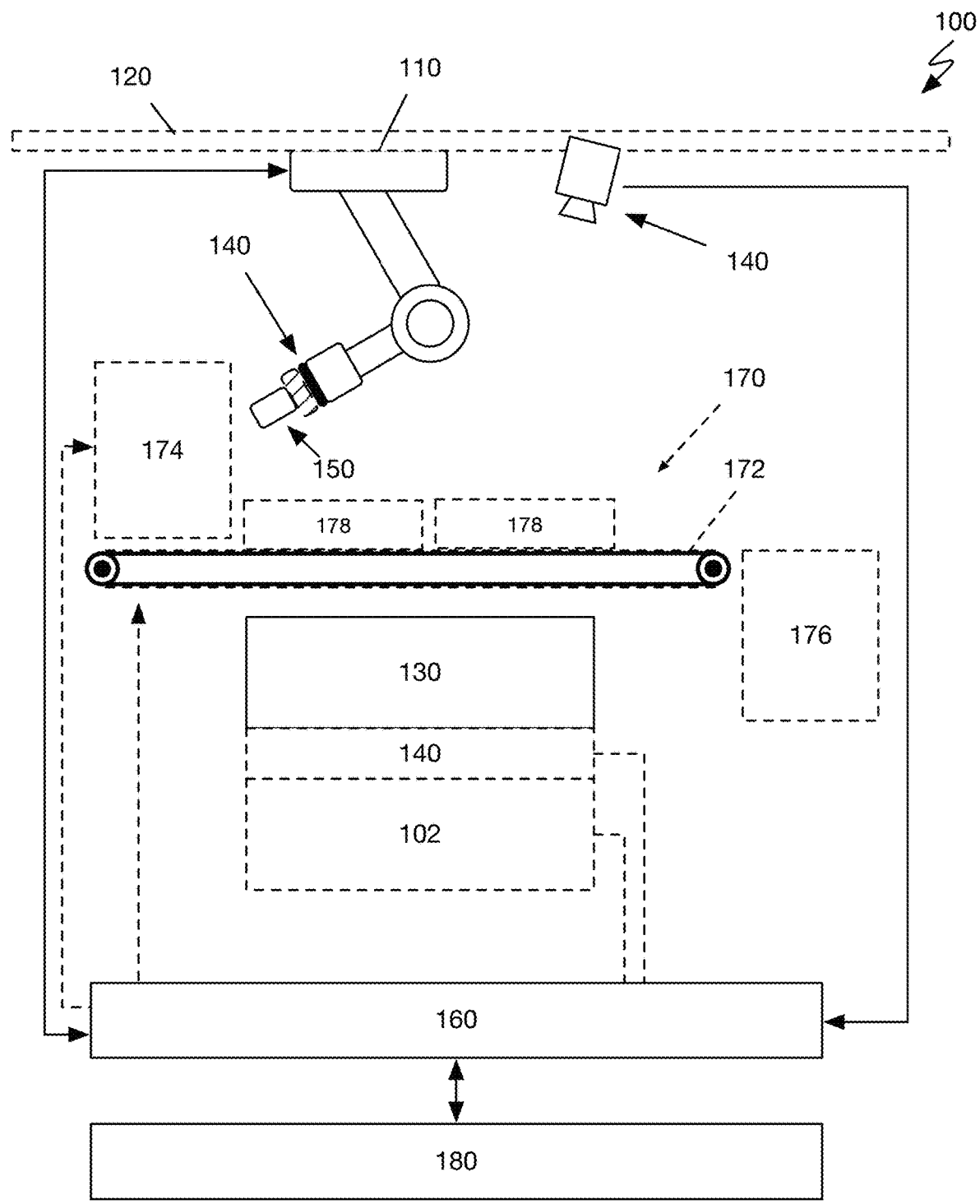
FIG. 1 is a schematic representation of a variant of the foodstuff assembly system.

The foodstuff assembly system 100, an example of which is shown in FIG. 1, can include: a robot arm 110, a frame 120, a set of foodstuff bins 130, a sensor suite 140, a food utensil 150, and a computing system 160. The system can optionally include: a container management system 170, a human machine interface (HMI) 180. However, the foodstuff assembly system 100 can additionally or alternatively include any other suitable set of components. The system functions to enable picking of foodstuff from a set of foodstuff bins and placement into a container (such as a bowl, tray, or other foodstuff receptacle). Additionally or alternatively, the system can function to facilitate transferal of bulk material (e.g., bulk foodstuff) into containers, such as containers moving along a conveyor line.

In a first variant, the system can be integrated into an industrial line or high-throughput application (e.g., airline food catering prep, etc.), such as in place of a human line worker.

In a second variant, the system can be implemented in a restaurant setting, such as a 'fast casual', 'ghost kitchen' or low-throughput application (e.g., without continuous operation; universities, K-12, prisons, hotels, hospitals, factories, stadiums, entertainment venues, festivals, etc.), in place of a prep table.

Figure 2:
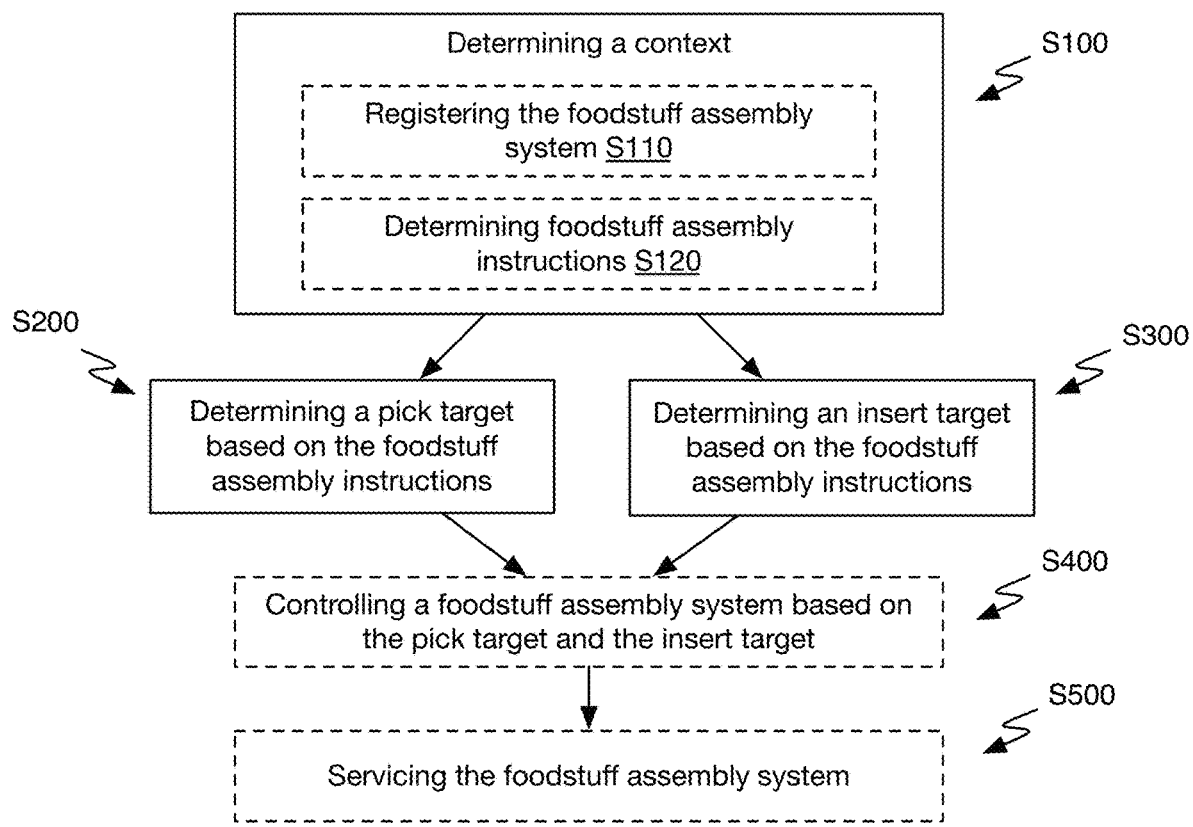
FIG. 2 is a diagrammatic flowchart representation of a variant of the method.

The method, an example of which is shown in FIG. 2, can include: determining a context S100, determining a pick target based on the foodstuff assembly instructions S200, determining an insert target based on the foodstuff assembly instructions S300; optionally controlling a foodstuff assembly system based on the pick target and the insert target S400; and optionally servicing the foodstuff assembly system S500. However, the method can additionally or alternatively include any other suitable set of components. The method functions to enable picking of foodstuff from a set of foodstuff bins and placement into a food container (such as a bowl, tray, or other foodstuff receptacle).

The term "substantially" as utilized herein can mean: exactly, approximately, within a predetermined threshold or tolerance, and/or have any other suitable meaning.

The terms "pick target" and/or "insert target" as used herein can refer to a physical point in space (e.g., within an image scene), a virtual point corresponding to the physical point, a 3D point in space, a 2D image feature in an image, a point (e.g., voxel or set thereof) in a depth image (e.g., 2.5D), and/or any other suitable grasp point. Likewise, a "pick target" and/or an "insert target" can be defined in and/or referenced relative to joint/cartesian coordinate frame (e.g., spatial domain) or a sensor coordinate frame (e.g., image coordinate frame, pixel position; a planar projection of spatial domain, etc.). It is understood that conversion between sensor coordinate frames and spatial coordinate frames is known and understood in the field of endeavor, and thus they may be considered interchangeable as may be convenient.

The term "task space" as utilized herein preferably refers to a mathematical set of effector and/or food utensil poses (e.g., available in a particular arrangement), but can be otherwise suitably used or referenced. The term "workspace" preferably refers to a physical volume associated with all reachable/available poses (e.g., points) for the system and/or robot arm thereof. For example, the workspace of a robot arm can be defined entirely based on the geometry of joints and/or intrinsic kinematic constraints of the arm (e.g., a manufacturer specification, etc.). Similarly, the workspace of a foodstuff assembly system which includes a robot arm can be further restricted by constraints imposed by other system components (e.g., frame geometry, joint boundaries imposed by control software, collision constraints, etc.). Accordingly, the restricted workspace of the foodstuff assembly system can refer to the physical volume in which the robot operates based on the (effective) task space of the robot in a particular configuration.

1.1 System Variants.

In a variants, a foodstuff assembly system for transferring bulk foodstuff into containers on a conveyor line includes: a frame; a sensor suite comprising a set of cameras mounted to the frame and a plurality of weight measurement sensors mounted to the frame, each weight measurement sensor of the plurality configured to support a base end of a respective foodstuff bin of the set of foodstuff bins; a robot arm mounted within the frame, a base of the robot arm mounted at a first mounting height above a height of the superior surface, the robot arm comprising a utensil actuator at a distal end of the robot arm; a food utensil mechanically fastened to an actuation output of the utensil actuator; a controller communicatively coupled to each sensor of the sensor suite and the robot arm, wherein the controller is configured to, based on image data from the set of cameras, control the robot arm and thereby manipulate the food utensil to: pick a bulk amount of bulk foodstuff from within the set of foodstuff bins based on a topography of the bulk foodstuff; and place the bulk amount of bulk foodstuff into a container on the conveyor line.

In some variants, a geometry of the robot arm can define an arm workspace of a first volume, wherein the frame defines a robot workspace of a second volume, wherein the second volume is less than half of the first volume.

In some variants, the robot arm includes a plurality of joints, wherein at least one joint of the robot arm extends above a top plane of the frame in one or more configurations.

In some variants, a surface normal vector of the base of the robot arm defines a zenith angle between zero degrees and 150 degrees.

In some variants, the controller is configured to control the robot arm while maintaining at least one element of the arm in a substantially vertical orientation in an operational configuration.

In some variants, the foodstuff assembly system includes a wash-down suit enclosing the robot arm between the base and the distal end.

In some variants, the bulk amount of bulk foodstuff is a predetermined volume of bulk foodstuff or a predetermined mass of bulk foodstuff.

In some variants, the food utensil is passive and is configured transform relative to the actuation output of the utensil actuator in response to an actuation of the utensil actuator.

In some variants, the food utensil includes a linkage and a plurality of scoops

In some variants, the set of cameras includes: a first camera mounted to the frame at a second mounting height and oriented toward the superior surface, wherein the second mounting height is greater than the first mounting height.

In some variants, the foodstuff assembly system further includes: a human-machine interface (HMI) mounted to the frame opposite the base of the robot arm.

In some variants, the controller is further configured to: based on a set of weight measurements from a weight measurement sensor of the plurality, determine a validation parameter associated with the pick amount; and provide feedback associated with the validation parameter to a user at the HMI.

In some variants, the frame is freestanding, wherein an attitude of the frame is adjustable and/or wheeled.

In some variants, a width of the frame is between 18 and 36 inches.

In some variants, the food utensil is mechanically fastened to the actuation output with a set of fasteners comprising a quick release pin.

In some variants, the controller is further configured to pick the bulk amount of bulk foodstuff from within the set of foodstuff bins at a location selected based on a success probability and a temporospatial analysis.

Figure 22:
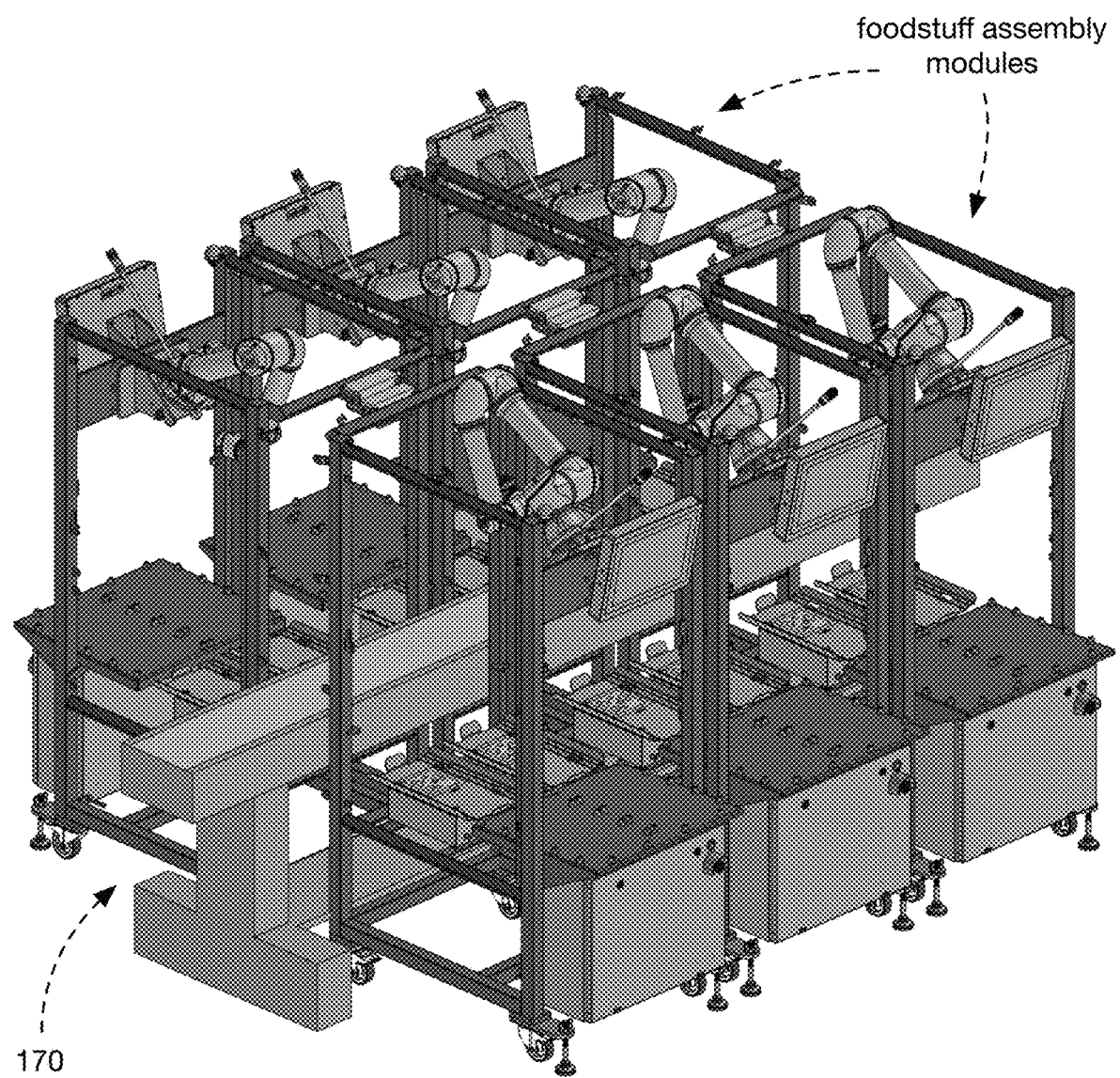
FIG. 22 is an orthographic view of a variant of the foodstuff assembly system.

In other variants, non-exclusive with the first set, the system includes (e.g., an example is shown in FIG. 22): a plurality of foodstuff assembly modules arranged along a conveyor line, each foodstuff assembly module of the plurality includes: a frame configured to removably retain a plurality of removable foodstuff bins supported by the frame; a robot arm mounted to the frame above the plurality of removable foodstuff bins; a food utensil mechanically mounted to the robot arm; a sensor suite mounted to the frame; a human-machine interface (HMI) mounted to the frame; and a controller communicatively coupled to the sensor suite and the robot arm, the controller configured to control the robot arm based on data from the sensor suite to pick an adjustable bulk amount of foodstuff from the removable foodstuff bins, based on a topography of the foodstuff, using the food utensil; wherein the HMI is configured to determine the adjustable bulk amount of foodstuff, wherein each foodstuff assembly module of the plurality is configured to operate independently of a remainder of the foodstuff assembly modules of the plurality.

In some variants of the second set, for each foodstuff assembly module of the plurality, the robot arm is side-mounted or top-mounted to the frame.

In some variants, the frame of each module is free-standing and attitude adjustable.

In some variants, for each foodstuff assembly module of the plurality, the robot arm includes a plurality of joints and at least one joint of the robot arm is configured to extend above the frame.

In some variants, for each foodstuff assembly module of the plurality, a geometry of the robot arm defines a robot workspace of a first volume, wherein the frame defines a task space of a second volume, wherein the second volume is less than half of the first volume.

1.2 Method Variants

In variants, a method for transference of bulk foodstuff into a container on a conveyor includes: determining a context of a robotic foodstuff assembly system; and based on the context, facilitating transfer of the bulk foodstuff from the set of foodstuff bins into containers on the conveyor, which includes repeatedly: sampling image data with the imaging system; based on the image data, determining a foodstuff model associated with a foodstuff bin of the set of foodstuff bins; determining a pick target based on the foodstuff model and the context; based on the image data and the context, dynamically determining an insert target; and controlling the foodstuff assembly system based on the pick target and the insert target.

In some variants, the context includes a set of foodstuff assembly instructions which includes a target pick amount.

In some variants, the foodstuff model models a topography of bulk foodstuff within foodstuff bin, wherein determining the pick target includes: for each of a set of candidate coordinate positions, determining a respective pick-depth value which satisfies the target pick amount based on a footprint of the food utensil and the topography of the bulk foodstuff.

In some variants, the context includes a set of foodstuff assembly instructions including a target pick amount. In some variants, the foodstuff model models a topography of bulk foodstuff within a foodstuff bin of the set of foodstuff bins, wherein determining the pick target includes: for each of a set of candidate coordinate positions, determining a respective pick-depth value which satisfies the target pick amount based on a footprint of the food utensil and the topography of the bulk foodstuff.

In some variants, determining the pick target further includes: selecting the pick target from the set of candidate coordinate positions based on the respective pick-depth using heuristics.

In some variants, determining the pick target includes: determining a plurality of pick candidates based on the foodstuff model; and dynamically selecting the pick target from the plurality of pick candidates based on a spatiotemporal optimization, wherein the spatiotemporal optimization is based on the context.

In some variants, the context includes a cycle time, wherein the pick target is selected from the plurality of candidates based on a combined optimization of the estimated cycle time and a distance between the pick candidates and the insert target.

In some variants, the bulk foodstuff is cohesive.

In other variants, non-exclusive with the first set, the method includes: with a cameras oriented towards a foodstuff bin, sampling a first set of depth-image data; based on the first set of depth-image data, generating a model of bulk foodstuff within the foodstuff bin; after generating the model, maintaining the model over a second time period, which includes: sampling a second set of depth-image data with the camera; and updating the model based on the second set of depth-image data under a monotonically-decreasing-height constraint; contemporaneously with maintaining the model, repeatedly: selecting a pick target based on the model and a target pick amount; determining control instructions for a robot based on the pick target; and executing a pick with a food utensil of a robot based on the control instructions.

In some variants, the method can further include repeatedly generating a pick depth heatmap based on the model and the target pick amount, wherein the pick target is selected based on the pick depth heatmap.

In some variants, the pick depth heatmap is generated using a pretrained neural network.

In some variants, selecting the pick target includes: for each of a set of candidate coordinate positions, determining a respective pick-depth value, wherein the pick target is selected from the set of candidate coordinate positions based on a roughness minimization.

In some variants, the robot is a line assembly robot defining an operation cycle, wherein the pick is executed for each respective operation cycle of the line assembly robot, wherein the pick target is selected prior to the respective operation cycle of the robot. In some variants, a duration of the operation cycle is less than 5 seconds. In some variants, the method further includes: after selecting the pick target, refining the pick target or the control instructions for a pick target during an interval prior to execution of the pick. In some variants, the pick target is selected based on a spatiotemporal optimization of the respective operational cycle.

In some variants, executing the pick with the robot at least partially occludes a field of view of the camera.

In some variants, the foodstuff model models a topography of bulk foodstuff within the foodstuff bin.

In some variants, determining the pick target includes: for each of a set of candidate coordinate positions, determining a respective pick-depth value which satisfies the target pick amount based on the food utensil and the topography of the bulk foodstuff.

In some variants, the method further includes: after the second time period, determining satisfaction of a refill condition, and in response to determining satisfaction, providing a refill notification via a human-machine interface (HMI); and subsequently, automatically determining satisfaction of a refill event, and in response to determining satisfaction of the refill event, regenerating the model.

In some variants, the pick target is selected based on a success probability generated by a trained neural network.

2. Benefits.

Variations of the technology can afford several benefits and/or advantages.

First, variations of this technology can provide a modular architecture which can be flexibly reconfigured to adapt to a variety of food assembly applications. Variants can allow for the addition of modules (e.g., each providing one or more robotic arms) to scale throughput in various settings while maintaining or decreasing the size of the required workforce, which can be particularly advantageous when labor resources are finite or difficult to scale (e.g., during a labor supply shortage). Variants of the system can utilize interchangeable food utensils to accommodate different types of ingredients (e.g., with different materials properties, such as different: textures, packing density, shape, compressibility/deformability, etc.) and/or different quantities of ingredients during assembly. In variants, the food containers (e.g., hotel pans) can be reconfigured or swapped to change the types of ingredients and/or relative amounts of ingredients available (e.g., for a particular module). As an example, a line change operation can involve replacing a food container and/or changing a food utensil with minimal resulting operational downtime. Additionally, variants can enable flexible food placement at arbitrary positions within a food container (e.g., millimeter accuracy), which can improve aesthetics of assembly and/or conformance to a repeatable foodstuff arrangement. Variants can additionally or alternatively adapt detecting/tracking (e.g., using deep learned models) to operate in conjunction with various conveyor manufacturers, conveyor heights, conveyor widths, conveyor appearance (e.g., color), conveyor slope, conveyor rate/speed, foodstuff container type (e.g., dimensions, appearance, etc.; which may be beneficial for scalability to a variety of assembly contexts), lighting conditions, and/or other assembly context differences.

Second, variations of this technology can reduce human involvement in food assembly by performing assembly operations with a robotic arm. In particular, a single user can operate and/or manage a plurality of robotic arm modules (e.g., three, five, more than five) to scale throughput while maintaining or decreasing the size of the required workforce. In variants, the system can additionally enable facile human interactions related to cleaning (e.g., allows rapid wipe-down/washdown and/or separate dishwasher cleaning of passive utensils), servicing (e.g., modularity can limit service downtime to a single unit), and monitoring (e.g., wireless monitoring and/or software updates), which can further reduce the number of humans required for a food assembly, processing, and/or servicing the system. In variants, the system can support software monitoring of foodstuff without (continuous) active involvement of a human, which can include monitoring of parameters such as: food temperature (or temperature of a heating/cooling well), time since food cooking/preparation (e.g., duration in a hotel pan), and/or remaining amount of food in a food container.

Third, variations of this technology can increase consistency of food assembly (e.g., when compared to a human or a dispensing system) by utilizing a food assembly system with feedback sensing (e.g., which can increase yield). Such variants can ensure high accuracy (e.g., pick mass/volume/quantity within a threshold tolerance, such as within 10% of a predetermined amount) and repeatability (e.g., minimal variability across different robotic arms, particularly when compared to different human users) of placed food amounts, which can provide cost savings (e.g., minimizing excess food provisions; increase yield) and reduce food waste/spillage.

Fourth, variants of this technology can provide a persistent model or estimate of a container pose and/or a foodstuff profile within the system, which can enable substantially continuous operation of the robot arm (e.g., without pauses for sensing when the robot arm obstructs various perception sensors) and/or control/trajectory planning when the perception of the foodstuff bin and/or container is occluded (e.g., by the robot arm). For example, variations can facilitate operational cycle times of less than 5 seconds (e.g., 3 seconds; in a high-throughput setting), in which a sensor field of view may be partially occluded by the robot arm during a majority (e.g., all) frames. In a second example, picking based on 3D models and/or point clouds may minimize the impact of lighting variable lighting conditions on system operation (e.g., particularly during substantially continuous operation of the arm, where shadows/occlusions can impact imaging).

Fifth, variations of this technology can reduce the footprint (e.g., width, parallel to a direction of conveyor motion, etc.) of robotic assembly systems along a conveyor line. For example, throughput scalability along a conveyor line may be evaluated as a function of throughput per unit width, which may be the driving constraint for the number of assembly operations that may be completed by humans and/or machines for a particular assembly line (of finite length) at a particular conveyor speed.

However, variations of the technology can additionally or alternately provide any other suitable benefits and/or advantages.

3. System.

The foodstuff assembly system 100, an example of which is shown in FIG. 1, can include: a robot arm 110, a frame 120, a set of foodstuff bins 130, a sensor suite 140, a food utensil 150, and a computing system 160. The system can optionally include: a container management system 170, a human machine interface (HMI) 180. However, the foodstuff assembly system 100 can additionally or alternatively include any other suitable set of components. The system functions to enable picking of foodstuff from a set of foodstuff bins and placement into a container (such as a bowl, tray, or other foodstuff receptacle). Additionally or alternatively, the system can function to facilitate transferal of bulk material (e.g., bulk foodstuff) into containers, such as containers moving along a conveyor line.

In variants, the foodstuff assembly system can be modular (e.g., examples are shown in FIGURES SA-B), such that multiple foodstuff assembly systems can cooperatively operate to increase throughput (e.g., in an assembly line) and/or versatility (e.g., in a fast casual setting; number of ingredients, utensils, etc.) of the collective. In a first example, such as in a fast-casual kitchen, duplicative modules can operate with the same set of foodstuff (ingredients) and/or food utensils, and the number of modules can be scaled to increase the throughput. In a second example, system modules can include different ingredients and/or food utensils, and can operate cooperatively to assemble a combination of ingredients (e.g., where the combination is not spanned by the set of ingredients within any individual module). Preferably, components such as the frame and/or computing system are separate/distinct between modular instances (e.g., can operate fully independently), but can additionally or alternatively be shared across multiple modules, connected, and/or can be otherwise suitably implemented. However, the foodstuff assembly system can alternatively be implemented without modularity and/or may be otherwise suitably configured.

The foodstuff assembly system and/or exposed external components thereof are preferably configured to operate in a food production/assembly environment, and can be: constructed from food safe materials (e.g., stainless steel, food safe delrin, food safe titanium, food safe coatings, etc.), configured for wash down operations (e.g., ingress protected, such as in compliance with IP67, IP67+, etc.), and/or otherwise configured to operate in a food production/assembly environment. Additionally or alternatively, components which are configured to contact foodstuffs during nominal operation (e.g., during each operational cycle; food utensils and foodstuff bins; etc.) can be removable and/or interchangeable (e.g., for remote cleaning; dishwasher cleanable and/or cleanable with a clean out of place [COP] solution, etc.).

The robot arm functions to position and/or articulate a food utensil to pick foodstuff within the foodstuff bin(s). The robot arm can additionally or alternatively function to place food within food containers (e.g., bowls, microwave trays, etc.). The robot arm can be articulated by autonomous control and/or can be configured to automatically execute control instructions, however the system can alternatively be otherwise suitably controlled and/or otherwise suitably enable food utensil articulation.

The robot arm is preferably a collaborative robot arm, but can additionally or alternatively be an industrial robot arm and/or any other suitable robot arm. Alternatively, variants can interchangeably utilize any other suitable robotic actuation system(s) such as a gantry system (e.g., belt actuated, ball and screw, linear tubular motor, etc.), delta robot (or delta robot arm), and/or any other suitable robot, robot arm, or robotic system. The robot arm can include any suitable number of joints which enable articulation of the utensil (or another end effector) in a single degree of freedom (DOF). The arm preferably includes 6 joints (e.g., a 6-axis robot arm), but can additionally or alternatively include three joints, seven joints, more than seven joints, and/or any other suitable number of joints. In some variants, the robot arm may be dimensionally oversized and/or over-articulated relative to the effective task space, which may facilitate higher speed actuation, more favorable kinematics, and/or greater control versatility in different contexts.

The robot arm is preferably mounted to the frame above a top plane of the food containers and/or above the foodstuff bin, which can enable the arm to be return to a pose which is offset from the food containers and/or foodstuff bin (i.e., allowing a user to access foodstuff with minimal restrictions). More preferably, a base joint of robot arm is mounted to an upper portion of the frame and angled towards the foodstuff bin (e.g., directed vertically downward; joint axis defines an angle of 30 degrees, 45 degrees, 60 degrees, 90 degrees, and/or any subrange bounded therein relative to a gravity vector; relative to horizontal; etc.). In a specific example, the robot arm can be mounted with a surface normal vector of the base of the robot arm defining a zenith angle between zero degrees (e.g., surface normal directed vertically upward; robot arm directed vertically downward) and 150 degrees (e.g., robot arm inclined by 30 degrees). In a second specific example, the robot arm can be mounted on an incline, angled towards the food container and/or conveyor region (e.g., such at an angle of about 45 degrees). However, the robot arm can be top-mounted, wall-mounted/ side-mounted and/or base-mounted/floor-mounted (e.g., with a base joint directed upwards). However, the robot arm can be otherwise suitably mounted.

In variants, the robot arm can be mounted to the frame: on the same side as a conveyor and/or adjacent to a conveyor region (e.g., adjacent a portion of the robotic system proximal to the conveyor); opposite a conveyor and/or a conveyor region; symmetrically or asymmetrically about a midsagittal plane; and/or with any other suitably arrangement. In a specific example, the robot arm can be mounted opposite a human machine interface (e.g., on a rear portion of the robotic assembly system, distal the conveyor).

The robot arm, including elements and/or joints thereof, can be surrounded by the frame (e.g., within a bounding box of the frame; within a guarded perimeter of the frame; bounded in a horizontal plane by a set of guards or physical user protections; within an open-sided frame; etc.) in one or more configurations (e.g., power-off state). Additionally or alternatively, the robot arm and/or one or more joints/ elements thereof can be configured to articulate above the frame and/or extend through the frame (e.g., through a top end of the frame, through an aperture/orifice at the top of the frame, etc.). In a specific example, the robot arm comprises a plurality of joints, wherein at least one joint of the robot arm extends above a top plane of the frame in one or more configurations.

Figure 12:
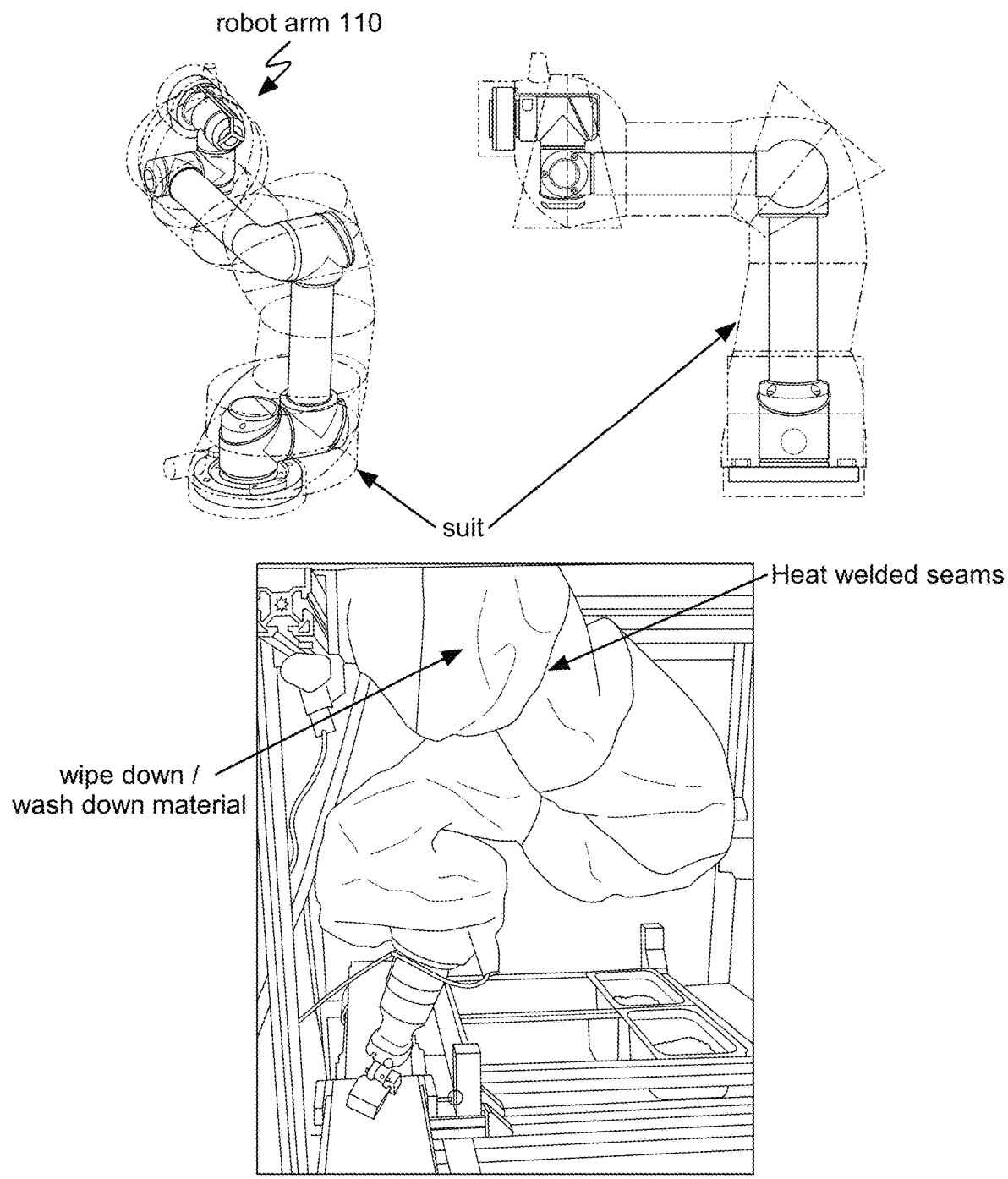
FIG. 12 includes examples of a robot arm with a suit in one or more variants of the system.

The robot arm can optionally include and/or can be used with a suit (a.k.a. jacket) which functions to enable cleaning of the robot arm. Additionally or alternatively, the suit can function to protect the arm, actuators, sensors, and/or other system components from particulate ingress or soiling. The suit can be disposable (e.g., enabling cleaning by replacement of the suit), removable (e.g., manually removed for cleaning, such as via a machine wash), and/or cleanable by wipe down and/or wash down processes. The robot arm can be constructed of any suitable polymers, plastics, rubbers, metals, and/or any other suitable materials, which are preferably food safe and/or include a food safe coating. The suit is preferably sealed against the robot arm, meeting or exceeding IP67 standards (e.g., IP69), but can be otherwise suitably implemented. In a first variant, an example of which is shown in FIG. 12, the robot arm can be enclosed by a single suit which is formed with heat welded or sonically welded seams which allow the robot arm to transform without interference within a full workspace (and/or restricted system workspace as defined by the foodstuff bin, frame, etc.) of the robot arm. The suit can optionally be made of a nonwoven material, lack textured external fasteners (e.g., lack buttons, Velcro, etc.), and/or be otherwise configured. In some variants, the suit can include integrated connectors (e.g., tubing connectors, push connect fittings, etc.) to facilitate wiring and/or tubing routing to distal actuators (e.g., food utensil actuators, etc.). However, the robot can otherwise exclude a suit or other covering and/or be used without a suit or covering (e.g., such as in secondary applications, line operations which do not involve food, etc.).

However, the system can include any other suitable robot arm and/or robotic actuation system(s).

Figure 6:
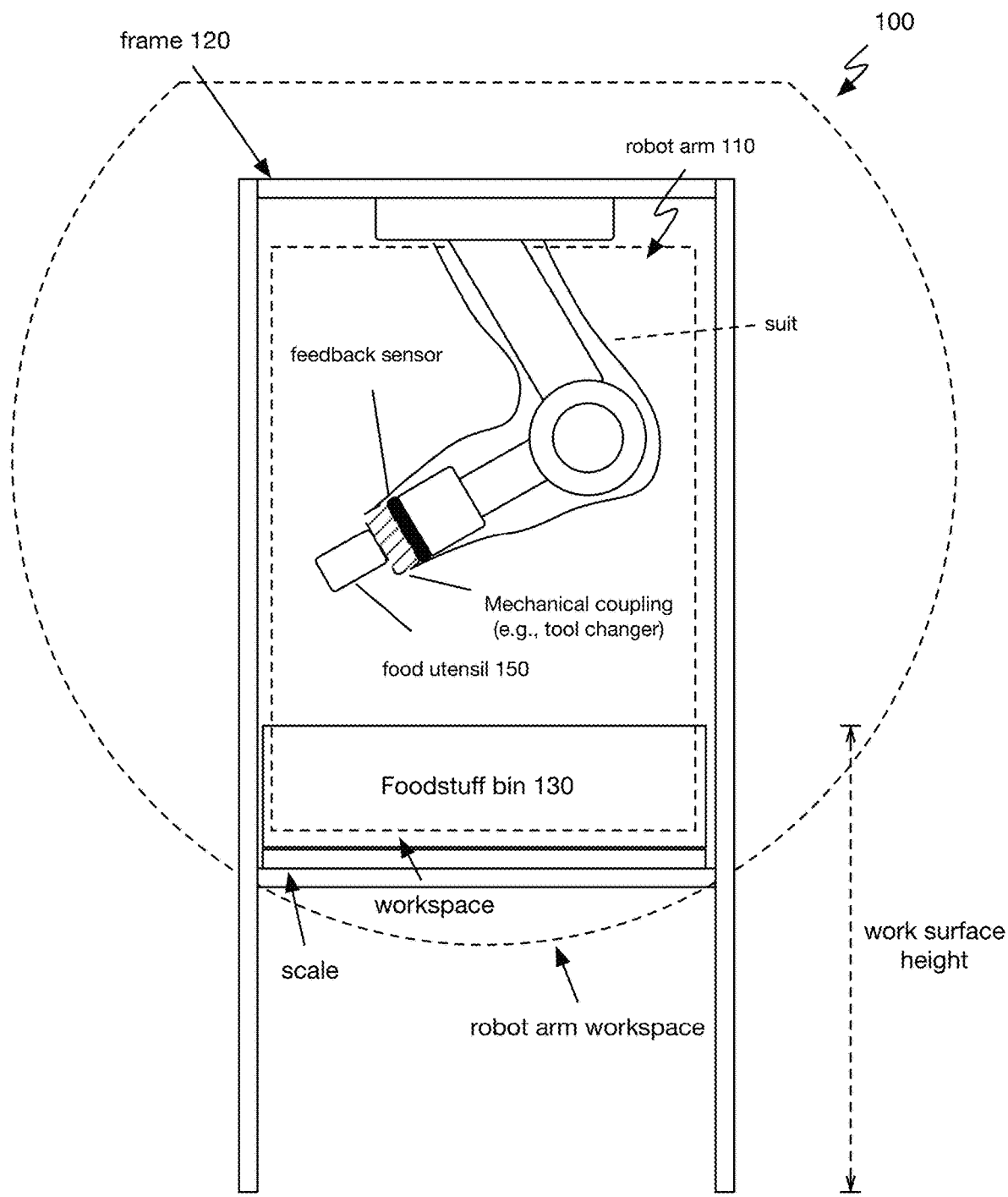
FIG. 6 is a schematic example of a variant of the foodstuff assembly system.
Figure 7:
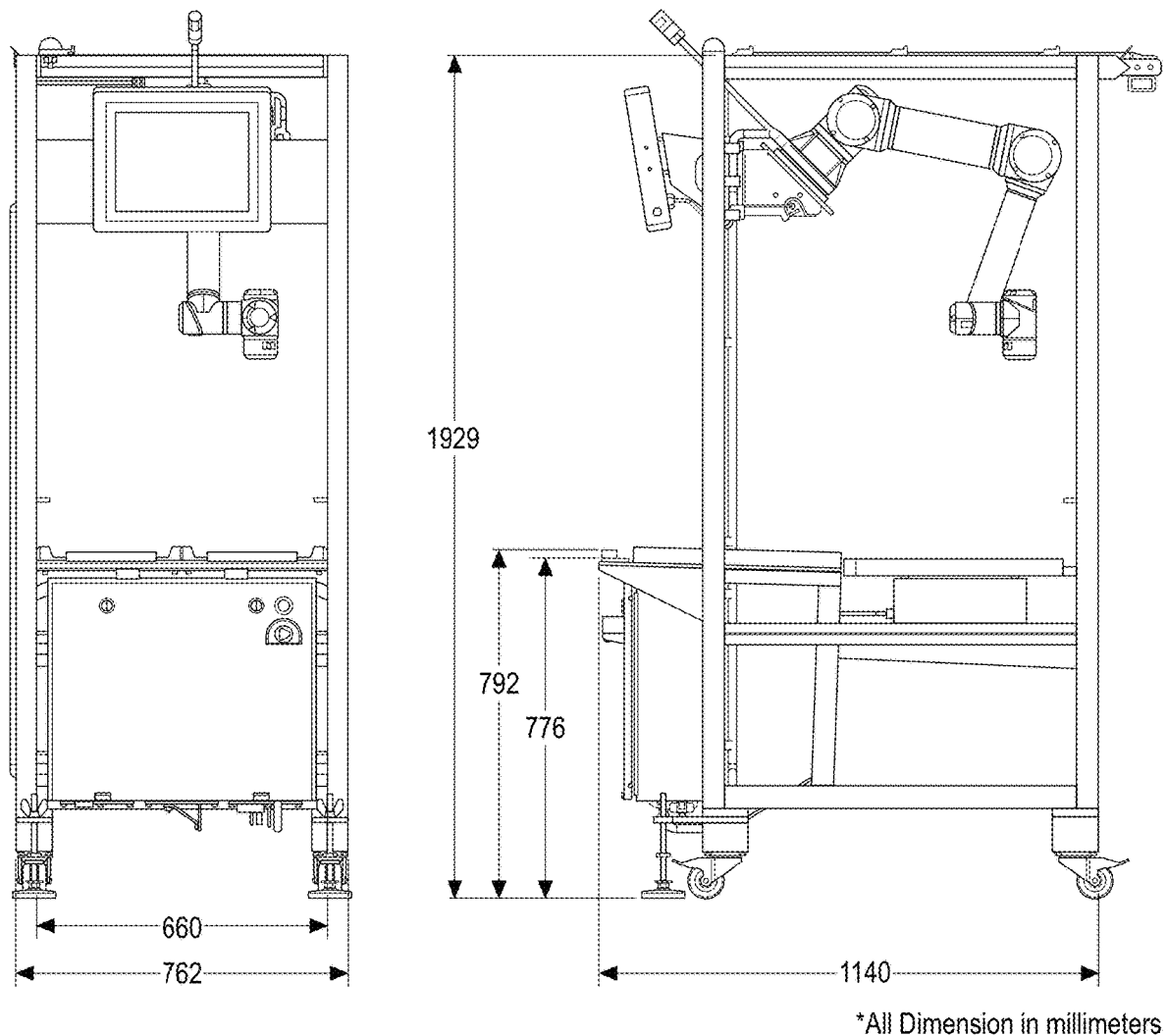
FIG. 7 is a layout drawing of a variant of the foodstuff assembly system with example dimensions.
Figure 8:
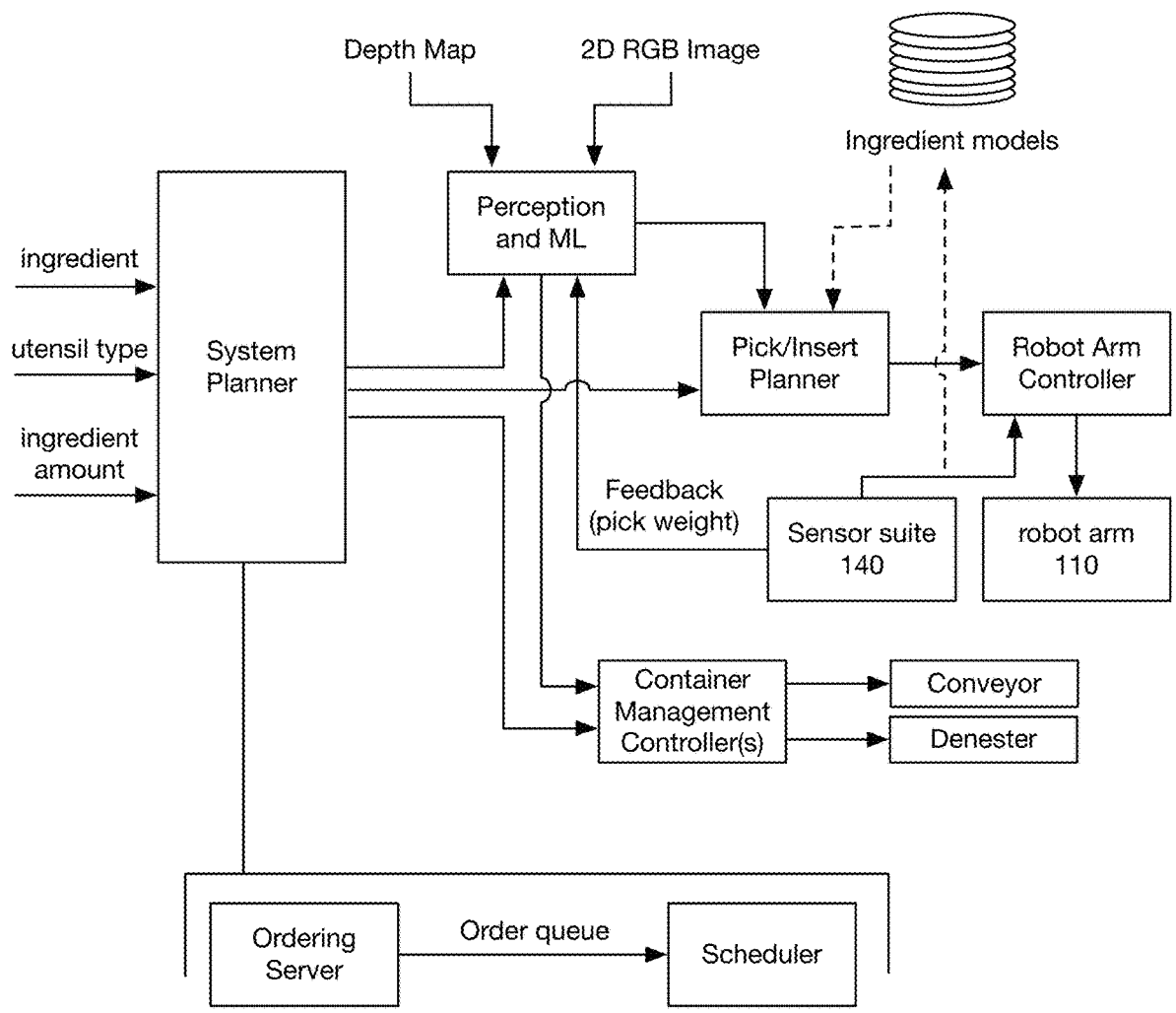
FIG. 8 is a schematic example of an architecture of the computing system in variants of the system and/or method.

The frame functions to structurally support the robot arm. The frame can additionally function to position the foodstuff bin relative to the robot arm. The frame can additionally or alternatively function to dampen vibrations from the robot arm. The frame can additionally or alternatively function as a food assembly workstation for a human (e.g., kitchen and/or line worker). The frame can structurally support, position, and/or align the bin and/or containers within a workspace of the robot arm. The frame can define an open, partially enclosed, or fully enclosed workspace of the system. In variants, it can be advantageous to reduce the footprint and/or dimensions of the physical structure of the frame (e.g., which may highly restrict or tightly constrain the intrinsic workspace of the robotic arm; while respecting the workspace/task space associated with transformations of the arm trajectories between a foodstuff bin region and a food container region (an example is shown in FIG. 6). In such cases, the size of the frame can be sized to conform to the physical constraints of a kitchen or industry line environment, such as defining: a width less than a predetermined threshold dimension (e.g., width of standard doorway, width of a standard worksurface; 24 inches, 36 inches, etc.), width greater than and/or defined based on a foodstuff bin width (e.g., combined width of the foodstuff bins with clearance for removal in one or more predetermined directions; about twice the width of a standard hotel pan, etc.), area less than a predetermined threshold area (e.g., half of a standard worksurface table area, 24 inches×36 inches, etc.), and/or a height within a predetermined threshold (e.g., foodstuff bin height within a range of standard worksurface heights; full height less than doorframe height, etc.). In variants, the frame width can be: less than 18 inches, 18 inches, 24 inches, 26 inches, 28 inches, 30 inches, 32 inches, 36 inches, greater than 36 inches, any open or closed range bounded by the aforementioned values, and/or any other suitable width. In a specific example, the frame can be about 30 inches wide by about 76 inches tall.

Figure 21A:
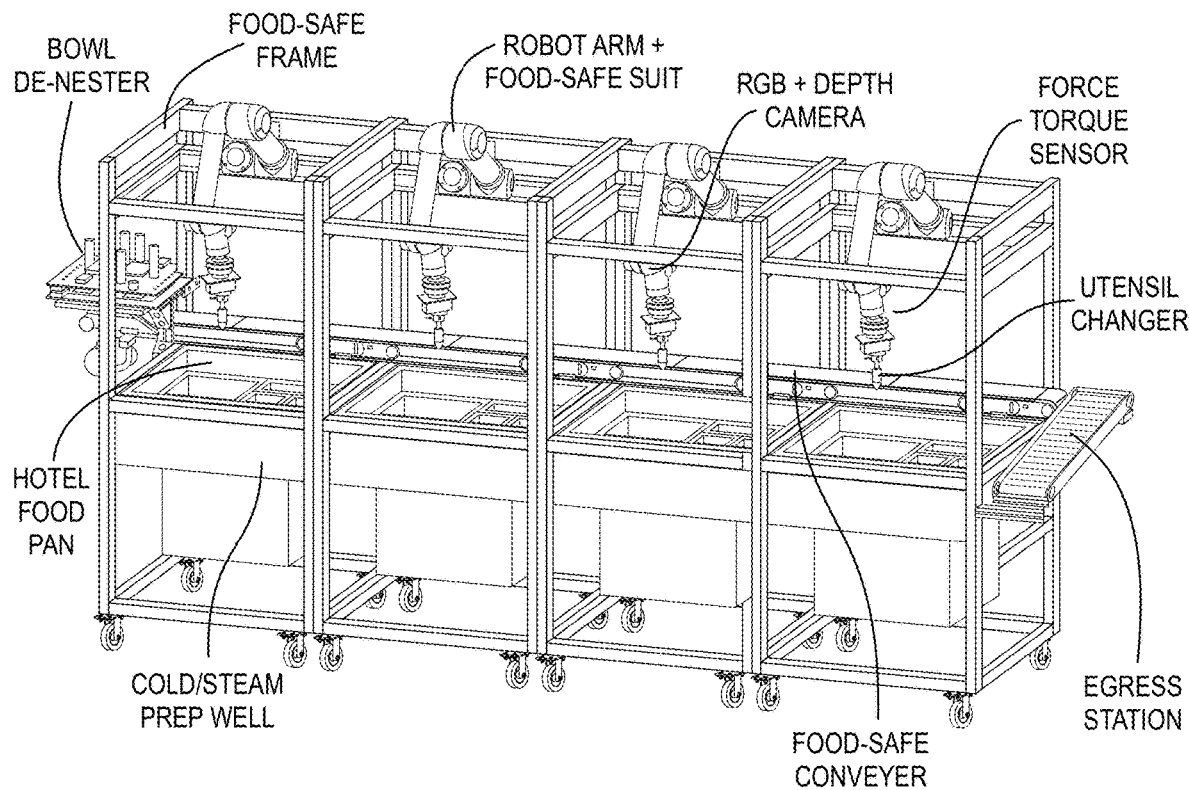
FIG. 21A-21B are orthorhombic views of a first and second variant of the foodstuff assembly system, respectively.
Figure 21B:
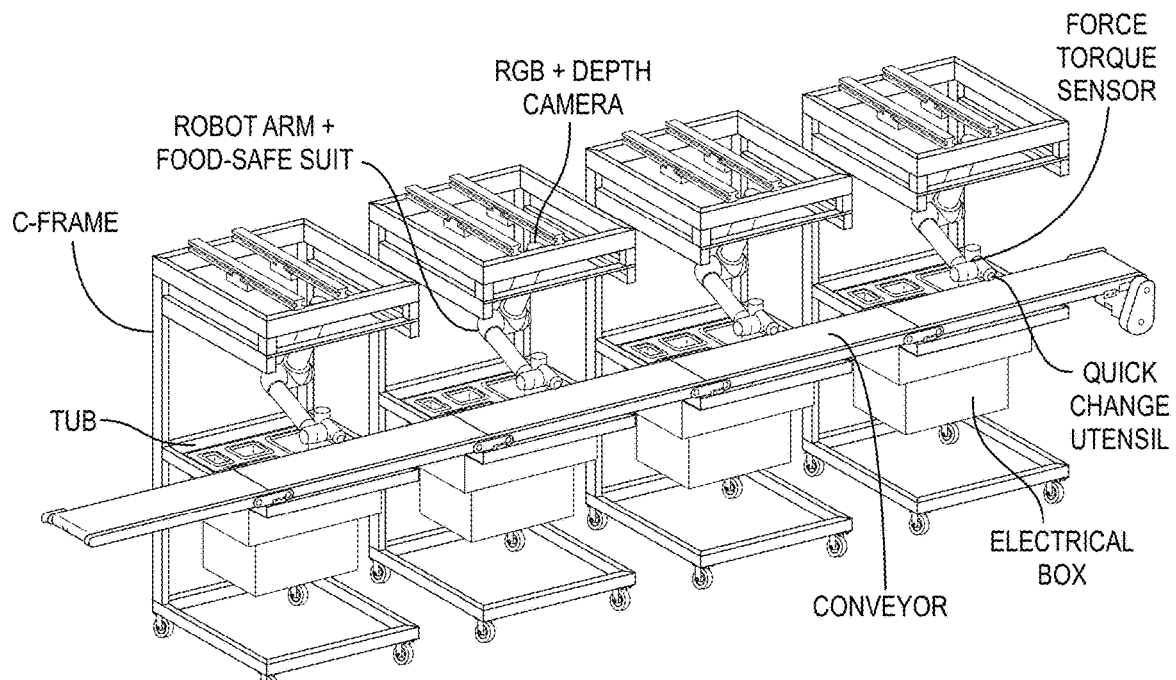

The frame can be self-supporting (e.g., free-standing), rigidly mounted (e.g., fixed to the floor), suspended (e.g., to a superstructure, such as a roof), wall mounted, and/or otherwise configured. The frame can be unitary or modular. In variants, multiple modules of the foodstuff assembly system can be rigidly connected and/or aligned to one another with various mounting hardware (an example is shown in FIG. 21A), alignment features, and/or spanning members. Alternatively, the system can be mechanically isolated and/or physically separate from other modules (e.g., in an industrial line setting; an example is shown in FIG. 21B), and/or can be otherwise suitably configured.

The frame is preferably constructed of a food safe material (e.g., a stainless steel weldment; wipe-down/washdown material) and/or includes a food safe coating or other suitable protective coating (e.g., food safe powder coat, food safe anodized coating, unfinished stainless steel, etc.). In a specific example, the frame can be constructed from T-slot (e.g., 80/20) or other reconfigurable framing materials. In variants where the frame is free-standing, the frame can include any suitable stiffening and/or damping elements to mitigate vibrations resulting during actuation of the robot arm. However, the frame can be otherwise constructed.

Figure 13A:
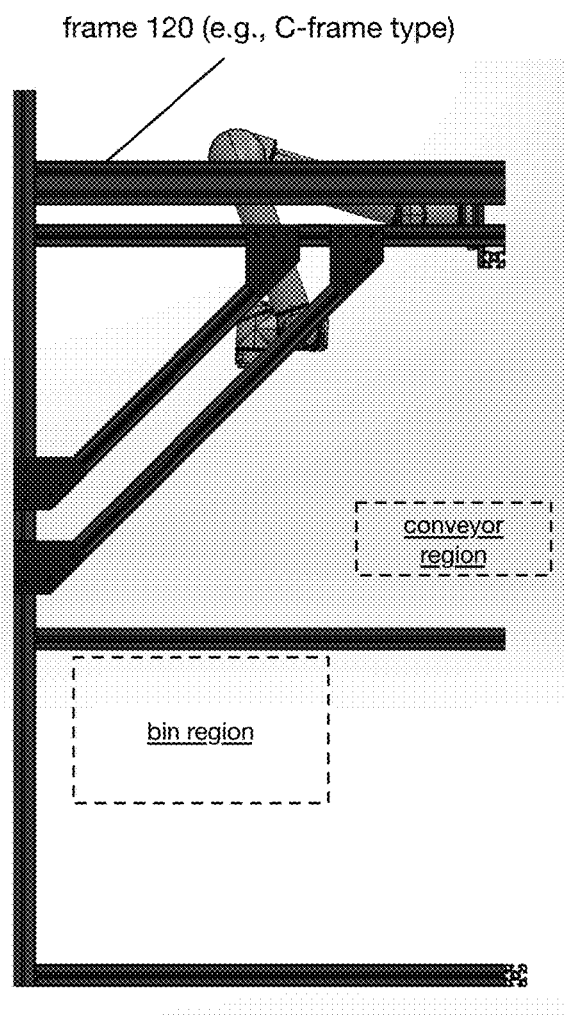
FIG. 13A-13C are side views of a first, second, and third variant of a frame and robot arm mounting configuration, respectively.
Figure 13B:
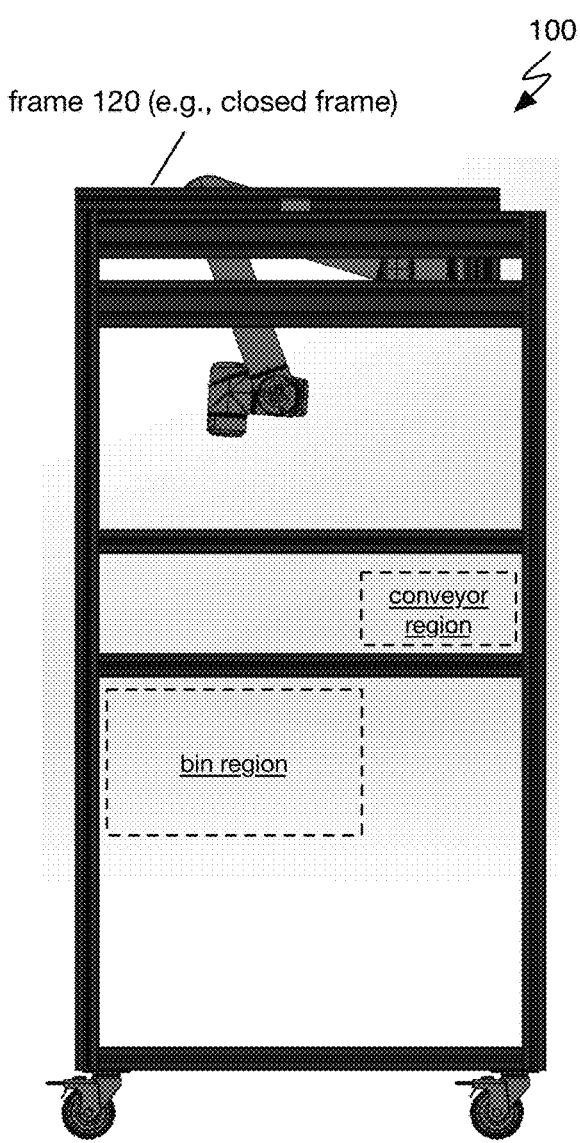
Figure 13C:
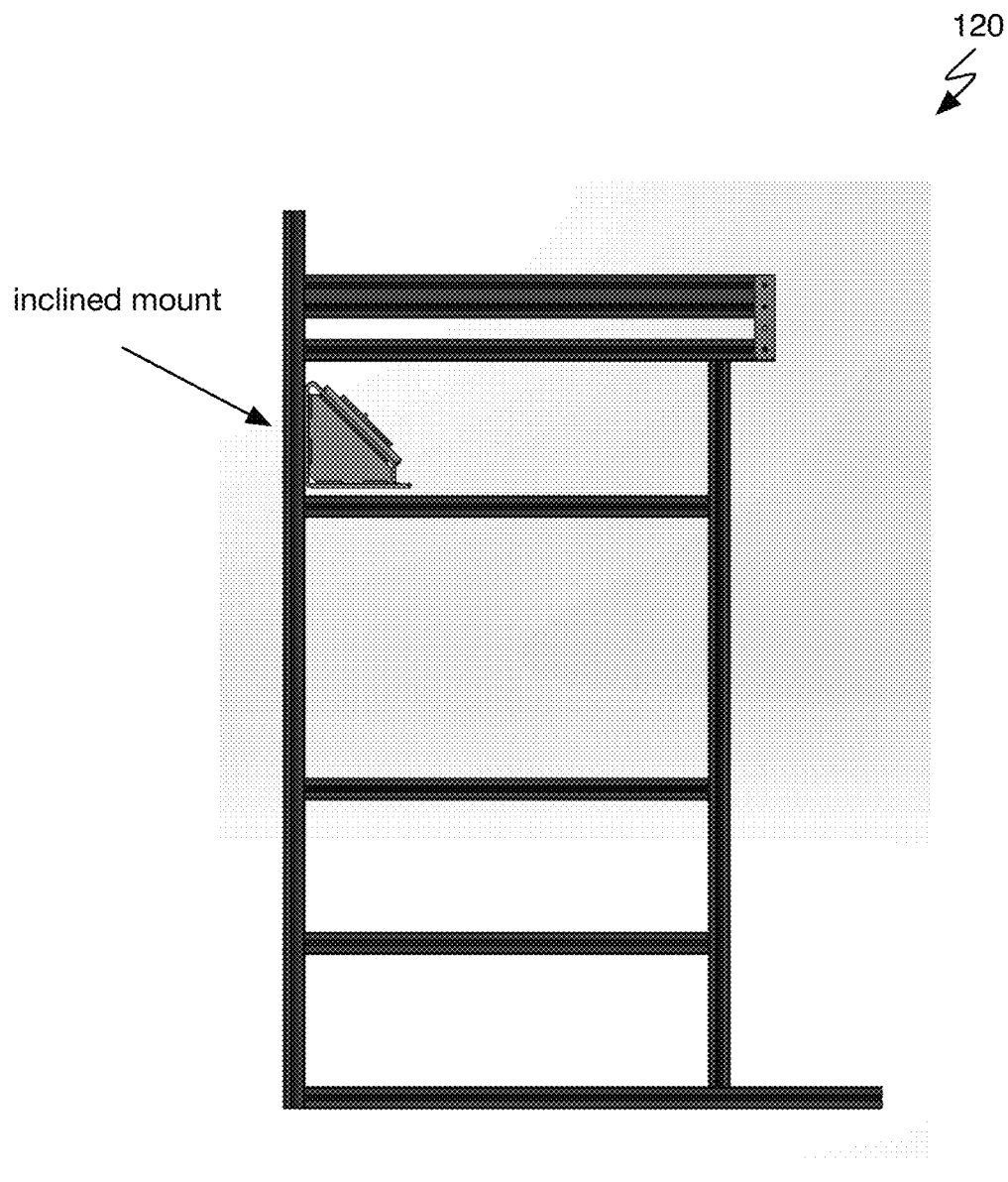

The frame can be static (examples are shown in FIGS. 13A and 13C), movable (e.g., wheeled, having a set of casters, etc.; an example is shown in FIG. 13B), adjustable (e.g., height adjustable, attitude adjustable, etc.), leveled (e.g., via leveling feet, such as rubberized mounting feet), and/or can be otherwise configured. In a first set of variants, the frame can be attitude adjustable, which may facilitate stability on non-horizontal ground surfaces (e.g., to facilitate water drainage, etc.) and/or accommodation of various conveyor configurations in a line settings. For example, a height and/or attitude of the frame structure and/or one or more elements thereof may be (manually) adjustable/variable to conform to floors and/or conveyors which are curved and/or angled (e.g., in pitch and/or yaw).

In some variants, superior surfaces the frame and/or members thereof may be curved and/or angled to a horizontal (gravity-relative) plane, which may facilitate water drainage (e.g., during wash-down) and/or reduce aggregation of liquid/solids on superior surfaces of the system. Additionally or alternatively, support surfaces of the frame (e.g., configured to support foodstuff bins) may be offset from frame structures and/or arranged on standoffs (e.g., offset by at least a predetermined clearance, such as a hand/finger clearance; to facilitate wipe-down and/or wash-down operations). As an example, the frame can include standoffs between each pair of adjacent wash-down parts (e.g., stainless steel members of the frame and/or support structure), which may allow for washing, hosing, and/or manual cleaning between them.

In variants, the base end of the robot arm can be mounted to a 'simply supported' member/section of the frame (e.g., such as the top of a closed box/square frame, an example of which is shown in FIG. 13B). Alternatively, the base end of the robot arm can be mounted to a cantilevered section/member of the frame, such as the top section of a C-frame (an example is shown in FIG. 13A). In a first variant (e.g., 'industrial line' variant), frame can be a C frame which extends above and/or below a conveyor line. In a second variant, the periphery of the frame can enclose a conveyor line (e.g., in a side view cross section).

However, the system can include any other suitable frame.

The set of foodstuff bins functions to retain foodstuff ingredients (or other bulk materials) for assembly (e.g., to fill an order or a predetermined configuration). Foodstuff bins can include: hotel pans, food trays, NSF food safe containers, and/or other suitable containers. There can be a single foodstuff bin (e.g., single hotel pan) or multiple foodstuff bins (e.g., in an array or grid, a pair of foodstuff bins). Food containers can be identical or vary in size/shape according to the corresponding ingredient housed therein. The foodstuff bins can be removable and/or interchangeable (e.g., for cleaning and/or ingredient servicing), however the foodstuff bins can alternatively be fixed relative to the frame and/or serviced in-situ (e.g., adding ingredients and/or cleaning in place). Preferably, the foodstuff bins are arranged in a predetermined configuration (e.g., known positions within an imaging coordinate frame), but can otherwise be reconfigurable and/or customizable (e.g., configured differently to fill different types of order at different times, etc.). The foodstuff bins are preferably arranged within the frame within a bin region, defining a bin region with deterministic bounds (e.g., laterally, vertically, etc.) within the workspace of the robot arm and/or bin imaging coordinate frame. The foodstuff bins are preferably structurally supported by the frame and housed within a vertical footprint of the frame, but can additionally or alternatively extend beyond the frame (e.g., while supported by the frame, while externally supported) or be externally supported (e.g., by a separate platform or external infrastructure).

A top plane of the foodstuff bins is preferably at a standard worksurface height (e.g., allowing a user to act in place of the robot arm, for a standing human, for a seated human, etc.; 3 ft, 4 ft, etc.), however a bottom plane of the foodstuff bins can alternatively be at a standard worksurface height, the bins can (vertically) span a standard worksurface height, and/or the bins can be otherwise positioned at any other suitable height.

In variants, the foodstuff assembly system can optionally include and/or be used with a prep well thermal conditioning system 102, which functions to thermally condition ingredients housed within the foodstuff bins. A prep well thermal conditioning system can be configured to provide heating and/or cooling depending on the nature of the ingredients, in accordance with various regulatory requirements, health standards, and/or user preferences (e.g., maintaining ice cream at or below freezing, maintaining hot ingredients above room temperature, maintaining refrigerated ingredients below room temperature, etc.). However, the foodstuff bins can alternatively be used without a prep well thermal conditioning system—such as when the ingredient throughput rate of the foodstuff assembly system exceeds a threshold (e.g., removing the necessity of heating/cooling based on the expected temperature change of ingredients before assembly), or when not necessitated based on the nature of the foodstuff (e.g., cereal).

Foodstuff bins can retain and suitable foodstuff or ingredients to facilitate execution of the method. The foodstuff can be: solid, liquid, gel, and/or have any other suitable physical state. The foodstuff can be bulk foodstuff and/or any other suitable foodstuff. In some variants, the foodstuff may be cohesive, adhesive, wet, dry, granular (e.g., particulate, etc.), deformable, brittle, and/or have any other suitable material properties. For example, cohesive bulk foodstuff may not settle (e.g., at an angle of repose) after picking an amount of foodstuff with the foodstuff utensil, which may yield surface roughness (e.g., at millimeter to centimeter scales) at the superior surface of the bulk foodstuff (a.k.a., foodstuff terrain) and/or topographic roughness of the bulk foodstuff. In a specific example, picking sticky rice with a food utensil may commonly yield cavities or divots resembling the exterior surface of a food utensil after picking. A single unit of a granular (e.g., particulate) foodstuff can be substantially smaller than the contact area of the food utensil (e.g., less than 50%, 40%, 30$, 20%, 10%, 5%, 1%, etc. of the food utensil contact area), or be otherwise defined. However, any suitable bulk materials may be housed or retained within the bins.

Examples of foodstuff that can be used include: diced, chopped, or other size-reduced foods (e.g., chopped tomato, broccoli, chicken, beef, etc.), comminuted foods (e.g., flours, sugars, etc.), granular foods (e.g., rice, lentils, beans, etc.), leafy foods (e.g., cabbage, lettuce, etc.), viscous foods (e.g., pudding, sticky rice, etc.), and/or any other suitable types of foodstuff.

However, the system can include any other suitable set of bins.

The sensor suite can include imaging sensors, feedback sensors, and/or any other suitable sensors.

The sensor suite can include imaging sensors which preferably function to capture measurements (e.g., images) of the foodstuff bin and/or food containers (e.g., the foodstuff scene), but can provide any other functionality. The imaging sensors can include one or more: foodstuff bin cameras (e.g., oriented toward the foodstuff bin), food container cameras (e.g., oriented toward food containers and/or container management system), stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensors. The sensors can be arranged into sensor sets and/or not arranged in sets. The imaging systems can determine one or more RGB images, depth images (e.g., pixel aligned with the RGB, wherein the RGB image and the depth image can be captured by the same or different sensor sets). Imaging sensors are preferably calibrated within a common coordinate frame (i.e., sensor coordinate frame) in a fixed/predetermined arrangement relative to a joint coordinate frame of the robot arm, but can be otherwise suitably configured.

In some variants, imaging sensors can optionally be used in conjunction with supplemental lighting systems (e.g., internal lighting systems mounted to the frame, dynamic lighting systems, static lighting systems, etc.) to facilitate operation in various/variable ambient lighting conditions (e.g., which may improve consistency of RGB imaging data across varied lighting conditions, etc.). Alternatively, the system can be used with external lighting sources (e.g., natural lighting, existing lights within a production facility, etc.), and/or any other suitable lighting systems, and/or can altogether exclude internal lighting systems.

Feedback sensors of the actuation feedback system preferably function to enable control of the robot arm (and/or joints therein) and/or picking/placement via the utensils (or another end effector), but can additionally or alternatively be used to determine the outcome (e.g., success or failure) of a pick. Feedback sensors can include one or more of a: force-torque sensor, load cell, utensil state sensor (e.g., to determine the state of the utensil, such as: engaged, disengaged, open, close; an orientation of utensil actuators; etc.), pressure sensor, strain gage, load cell, inertial sensor, positional sensors, displacement sensors, encoders (e.g., absolute, incremental), resolver, Hall-effect sensor, electromagnetic induction sensor, proximity sensor, contact sensor, and/or any other suitable sensors. However, the sensors can be otherwise configured.

Sensors of the sensor suite can be integrated into the robot arm, tool-changer, food utensils, foodstuff bin (e.g., above, below, to the side, etc.), and/or any other component of the system, or can be otherwise mounted to the frame (e.g., above foodstuff bin and/or food containers, etc.), mounted to the robot arm, mounted to the food utensils, and/or otherwise suitably arranged.

In variants (e.g., 'line variant'), feedback sensors can include a weight sensor (e.g., scale) arranged at a base of the foodstuff bin and configured to measure a weight of foodstuff within the foodstuff bin. In such variants, a weight of picked foodstuff and a corresponding mass/volume can be inferred from a change in weight of the foodstuff container (and/or foodstuff therein) for an individual pick. Likewise, an average pick weight can be determined by evaluating the change in container weight across multiple picks, and/or estimated remaining foodstuff amount (e.g., mass, volume, count, etc.) can be determined based on the measured weight at any time.

In a second variant (e.g., 'fast-casual variant'), feedback sensors can include a force-torque sensor and/or load cell configured to measure a weight of food which is supported by and/or contained within a food utensil.

However, the system can include any other suitable sensors and/or feedback mechanisms.

The food utensil functions to pick foodstuff from within the foodstuff bin and/or transfer foodstuff into a foodstuff container. Food utensils can be impactive, ingressive, astrictive, contigutive, and/or any other suitable type of utensil effector. Food utensils can be directly actuated (e.g., the food utensil can include an integrated actuator which connects to the robot arm and/or computing system to affect transformation of the food utensil; examples are shown in FIGS. 15A, 15B, 16, and 17) or indirectly via a mechanical interface (e.g., food utensils may be articulated by a mechanical transformation of a food utensil interface at the distal end of the robot arm and/or tool changer; examples are shown in FIGS. 14A-K, 18, 19, and 20). Accordingly, the food utensil can be driven by any suitable actuators mounted to the robot arm (or tool changer) or integrated therein, which can be actuated: electrically (e.g., servo or motor actuation), pneumatically, hydraulically, unactuated (e.g., passive deformation based on motion of robot, rigid body, etc.), and/or otherwise actuated.

Figure 15A:
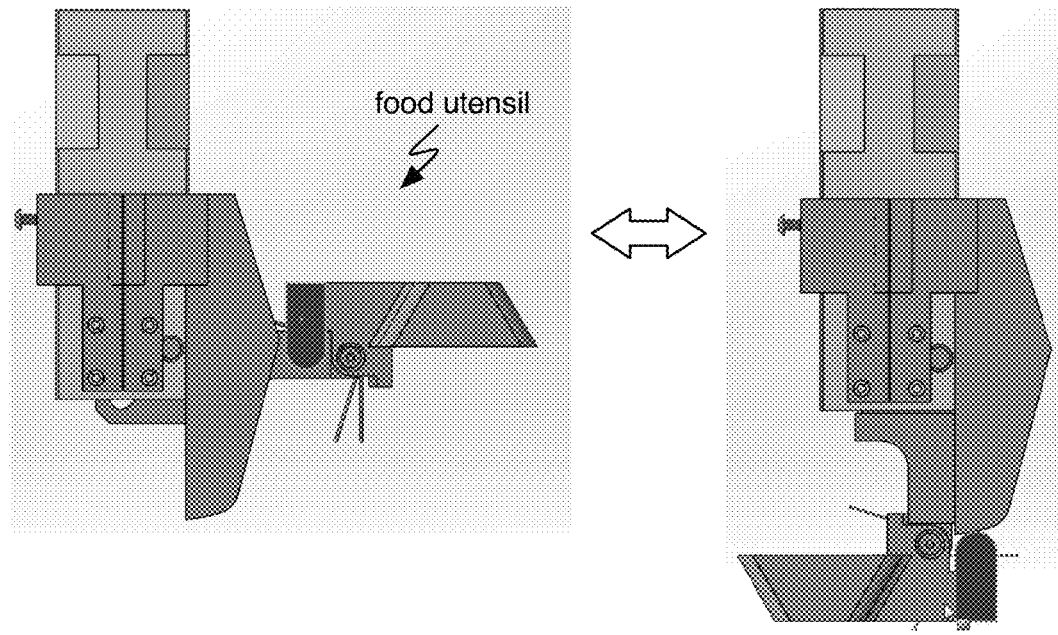
FIGS. 15A-15B are example illustrations of food utensils in one or more variants of the system and/or method.
Figure 15B:
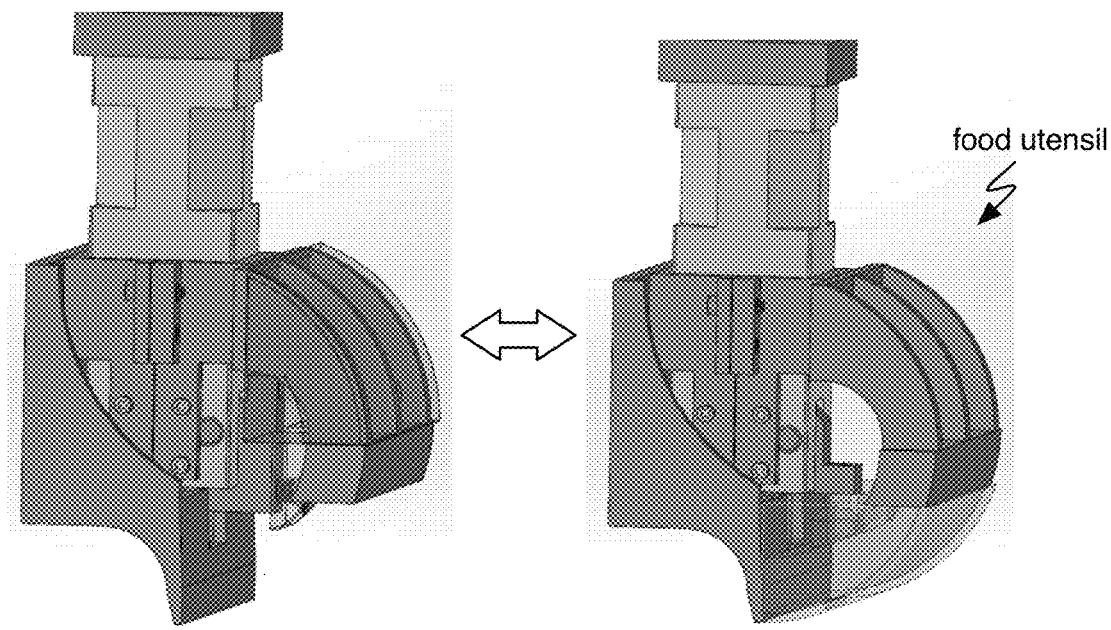
Figure 16:
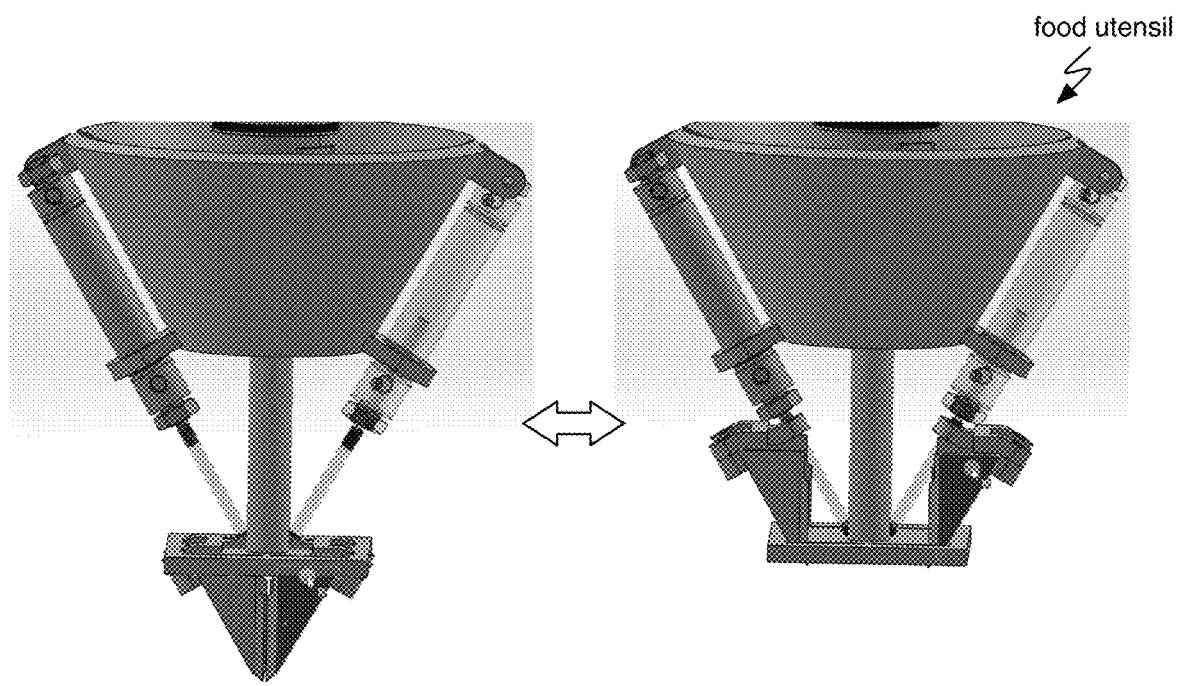
FIG. 16 is an example illustration of a food utensil in one or more variants of the system and/or method.
Figure 17:
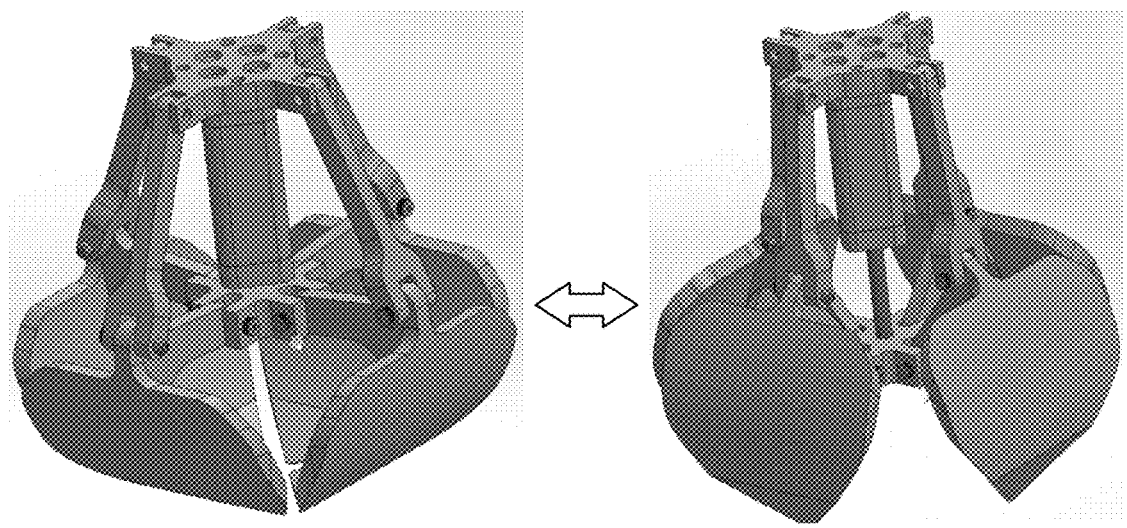
FIG. 17 is an example illustration of a food utensil in one or more variants of the system and/or method.
Figure 18:
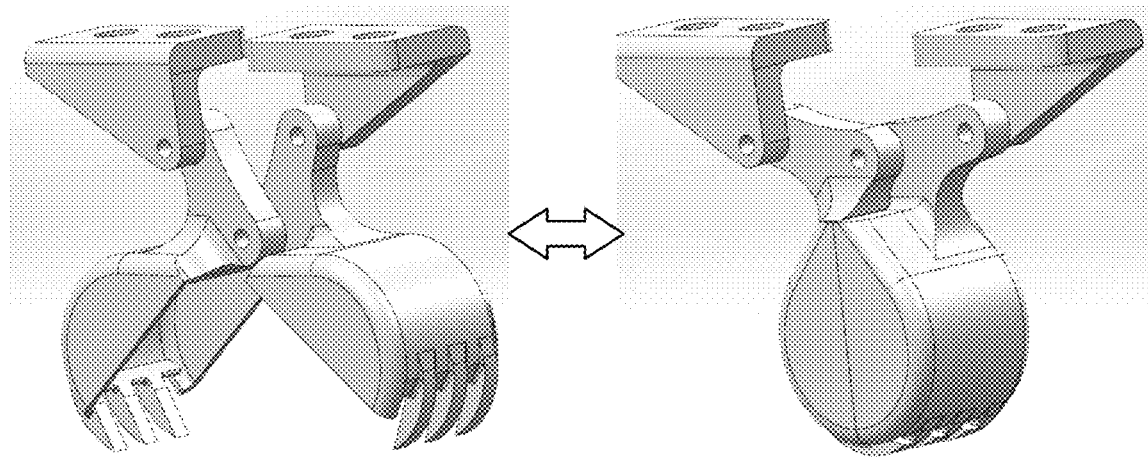
FIG. 18 is an example illustration of a food utensil in one or more variants of the system and/or method.
Figure 19:
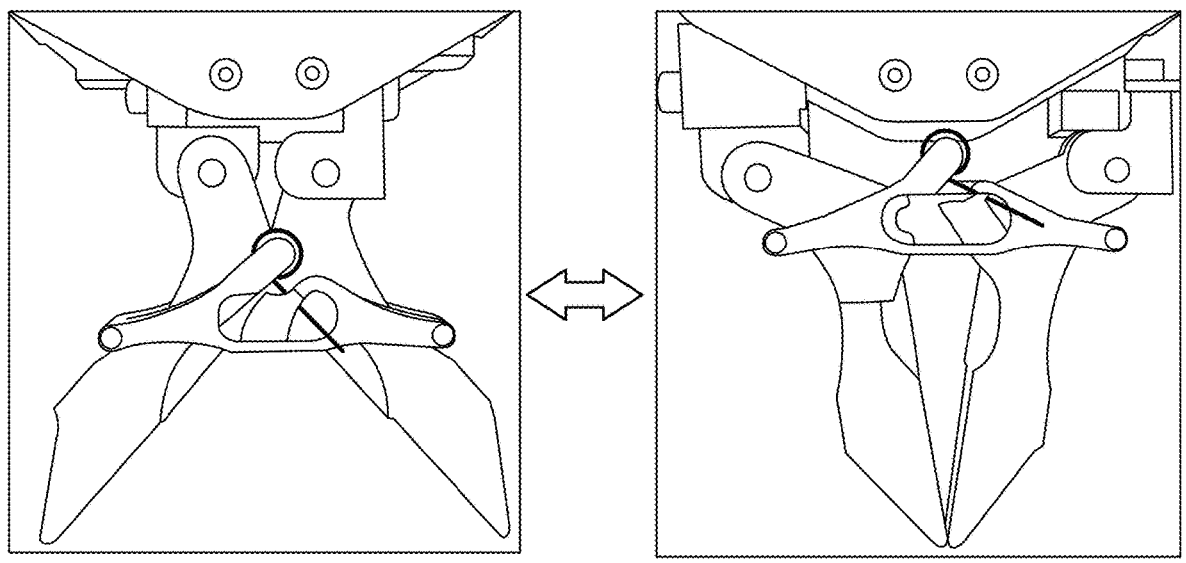
FIG. 19 is an example illustration of a food utensil in one or more variants of the system and/or method.
Figure 20:
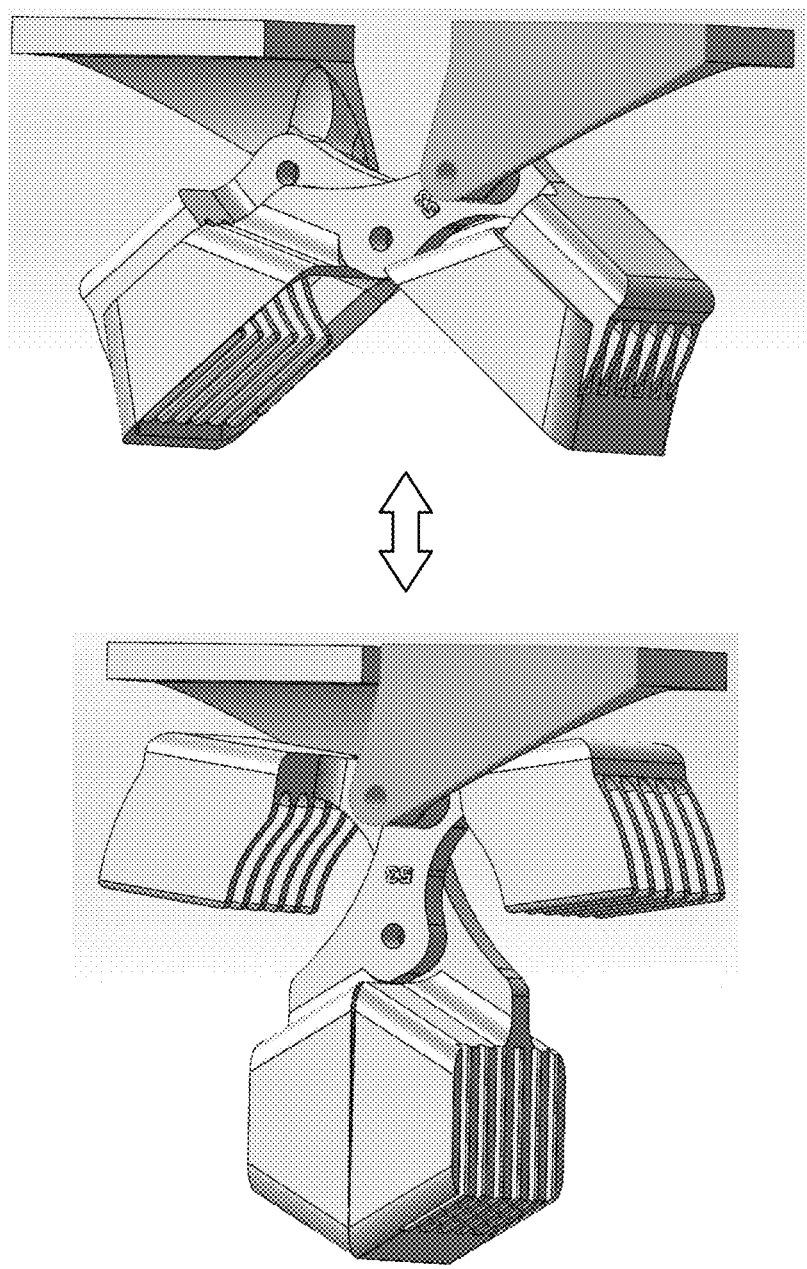
FIG. 20 is an example illustration of a food utensil in one or more variants of the system and/or method.

The food utensils preferably include a plurality (e.g., a pair) of bodies which contact foodstuff and transform relative to robot arm, however the food utensil can alternatively include a single body which transforms relative to the robot arm, and/or can be entirely static relative to the robot arm. Food utensils preferably receive a linear input at each body which is transformed into an angular rotation about an axis of a pin/joint of the utensil, however the food utensils can additionally or alternatively be configured to transform linearly, receive a rotational input (e.g., examples are shown in FIGS. 15A and 15B) and/or can be otherwise suitably actuated.

In one set of variants, food utensils can include mechanical linkages which functions to (passively) transform the food utensil relative to the robot arm (and/or an actuator output thereof) based on a mechanical actuation input from the mechanical interface. The mechanical linkages can include revolute (a.k.a. hinged) joints, but can additionally or alternatively include prismatic (a.k.a. sliding) joints, spherical joints, cylindrical joints, universal joints, planar joints, and/or any other suitable joints. The mechanical linkages can be coupled and/or formed into a unitary kinematic chain, multiple kinematic chains, open kinematic chains, closed kinematic chains, and/or arranged in any other suitable configuration(s). The set of mechanical linkages can include one or more: lever mechanism (e.g., hinged linkage), scissor linkage, 3-bar linkage, 4-bar linkage (e.g., parallelogram linkage), 5-bar linkage, 6-bar linkage, planar linkage, spatial linkage, Scott Russell linkage, crank-rocker linkage, slider-crank, drag-link mechanism, and/or any other suitable linkage(s). The set(s) of mechanical linkages is preferably substantially symmetric (e.g., in a projected plane, mirror symmetry, etc.), but can alternatively be asymmetric. In a first example, a single linkage can be symmetrically connected to opposing scoops (e.g., hinged at a central pivot) and generate symmetric transformations. In a second example, a pair of joints constraining a distal element of a scissor linkage can be a revolute joint and a pin-in-slot joint (e.g., which may be kinematically modelled as a revolute joint in combination with a sliding joint), respectively. However, any suitable types and/or arrangements of mechanical linkages can be used. However, the utensil can include any other suitable set of mechanical linkages.

Figure 14A:
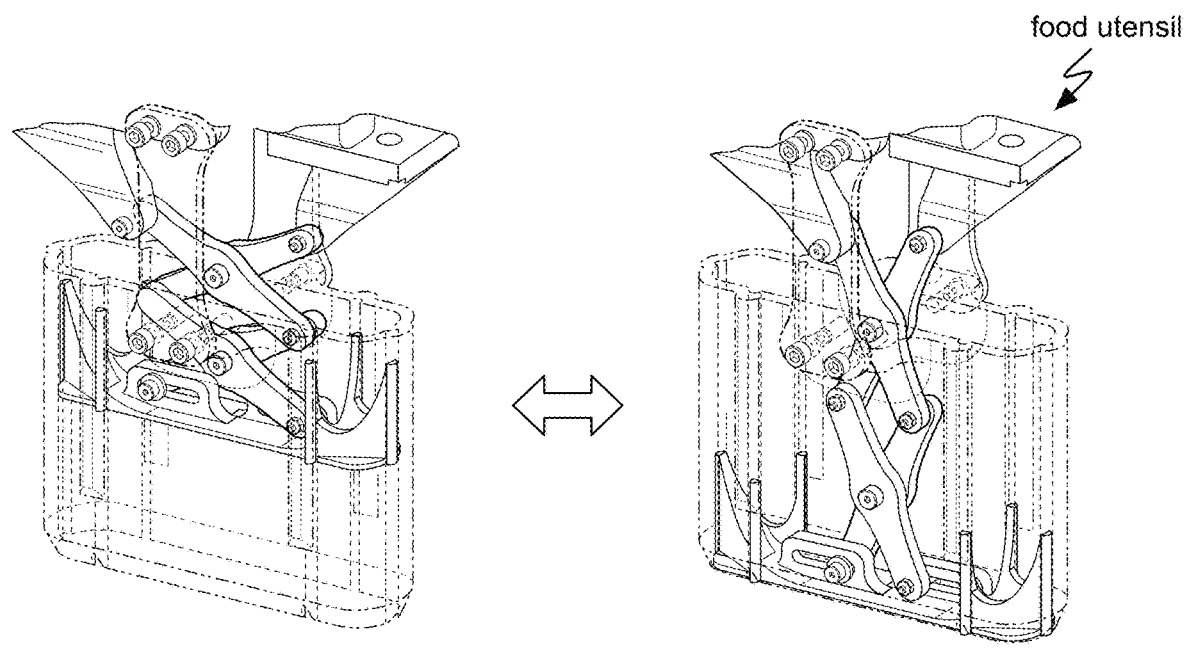
FIGS. 14A-14K are example illustrations of food utensils in one or more variants of the system and/or method.
Figure 14B:
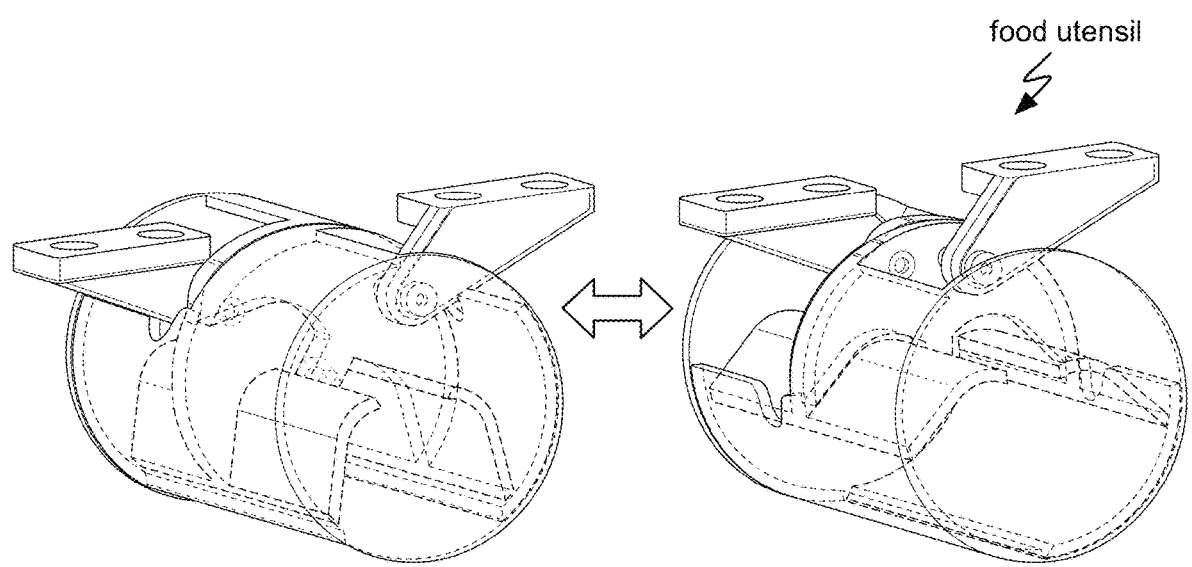
Figure 14C:
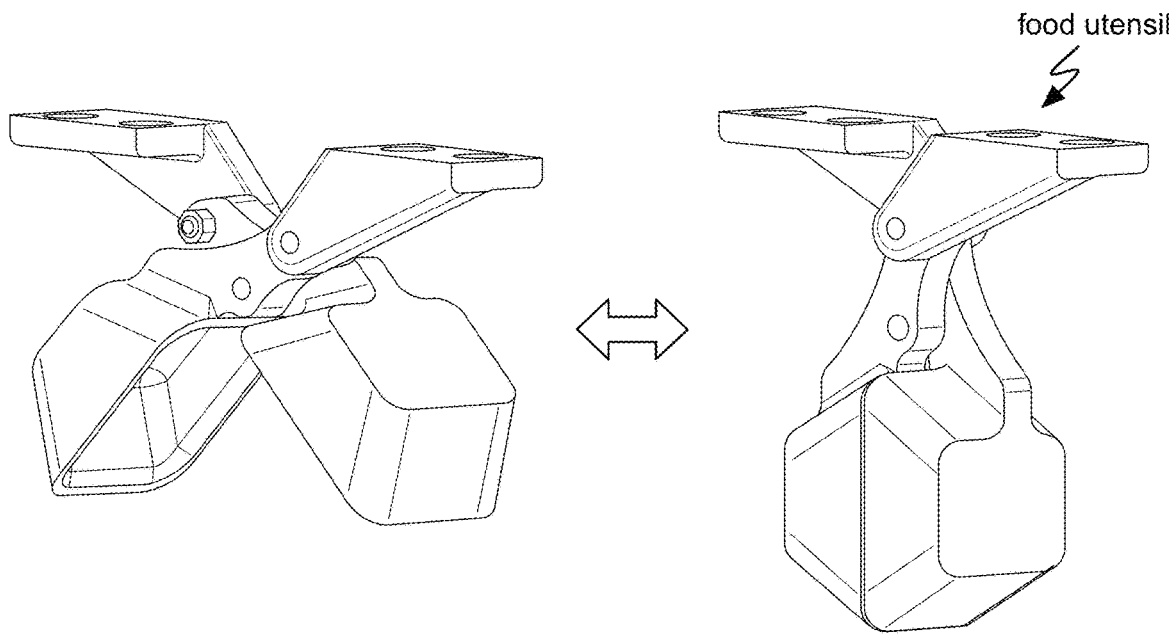
Figure 14D:
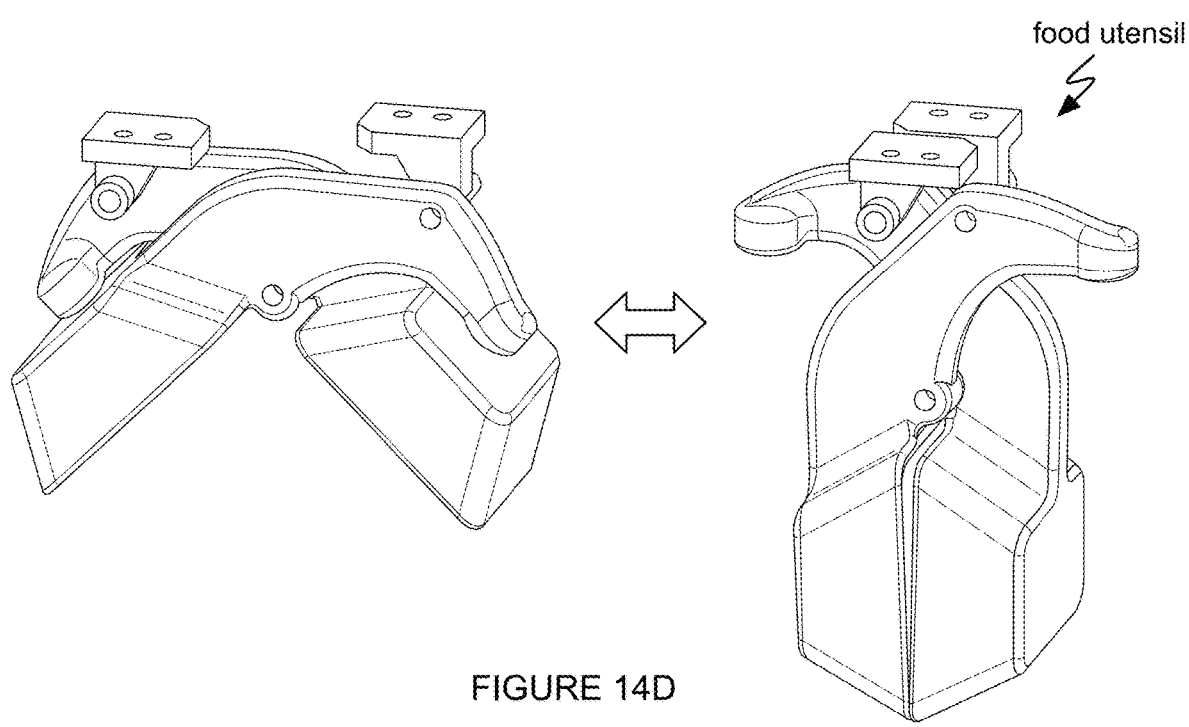
Figure 14E:
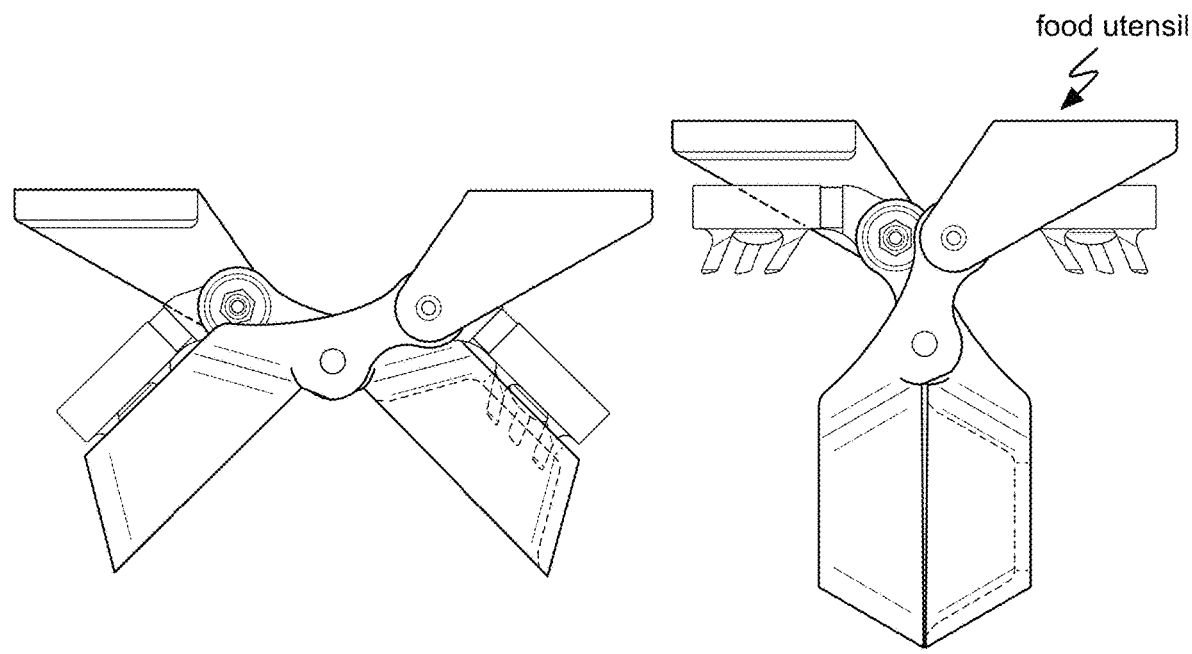
Figure 14F:
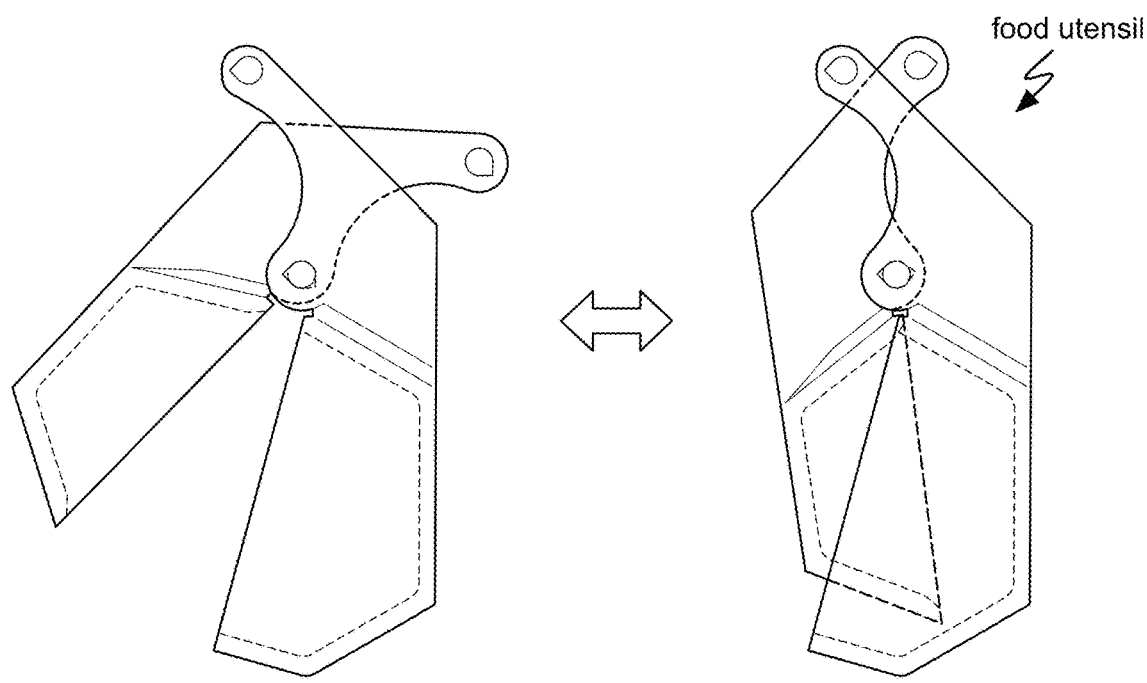
Figure 14G:
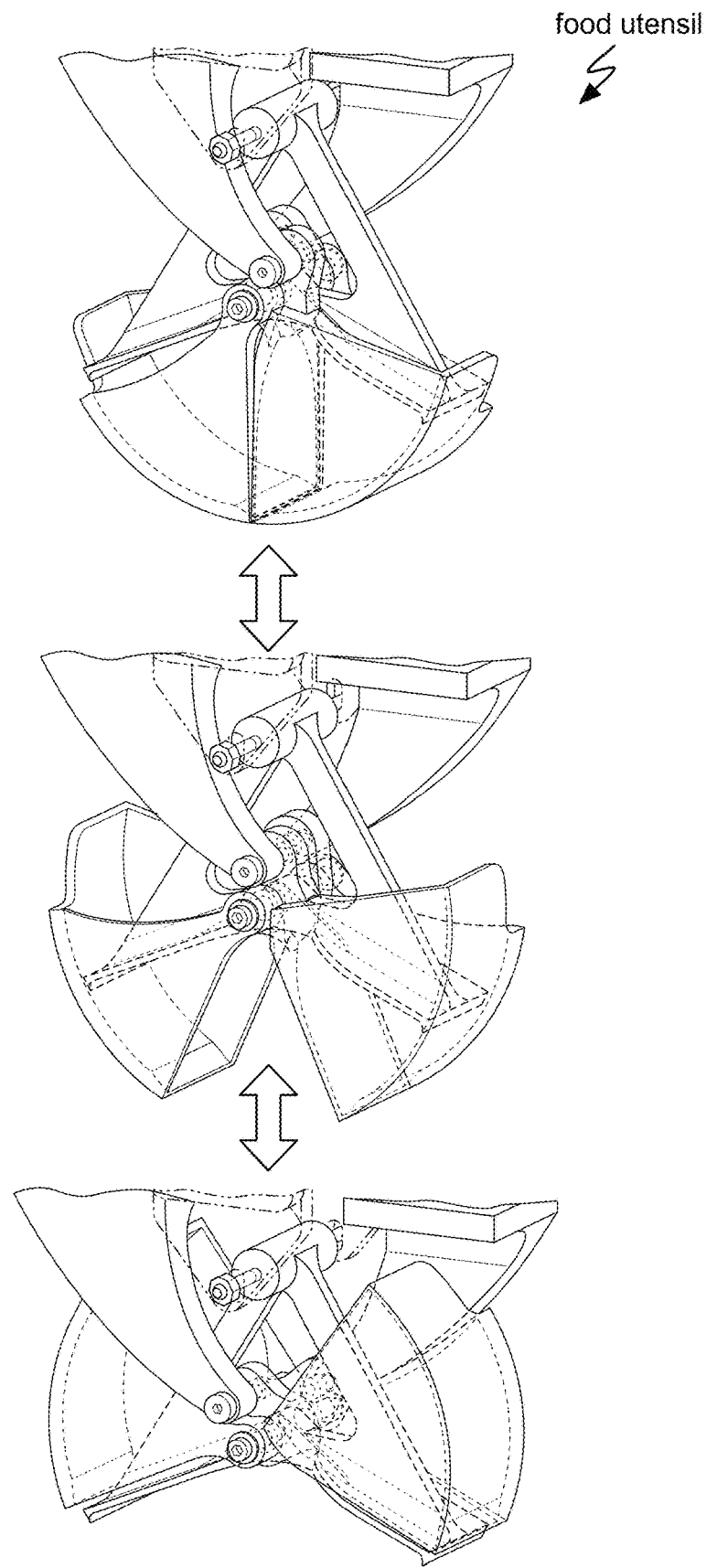
Figure 14H:
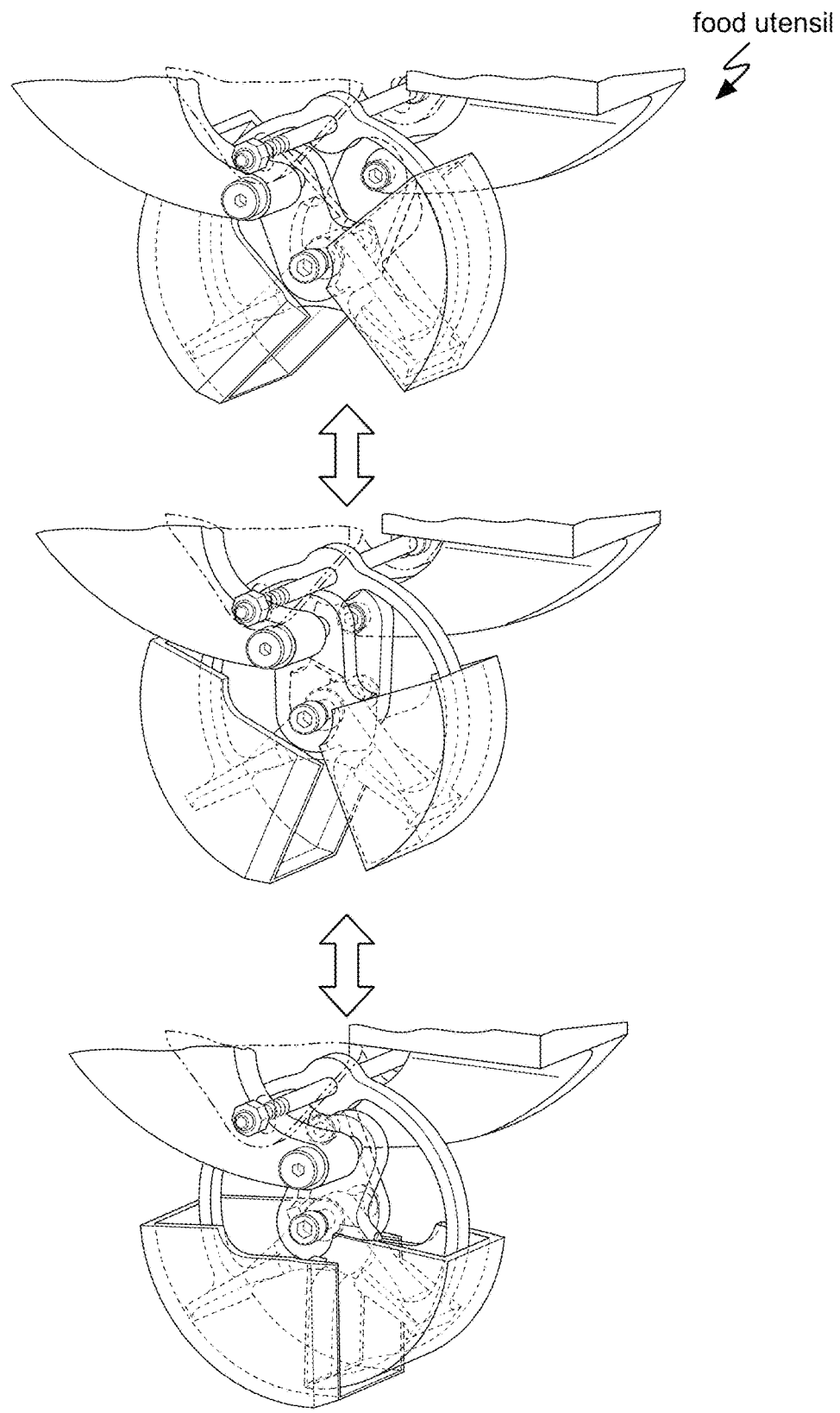
Figure 14I:
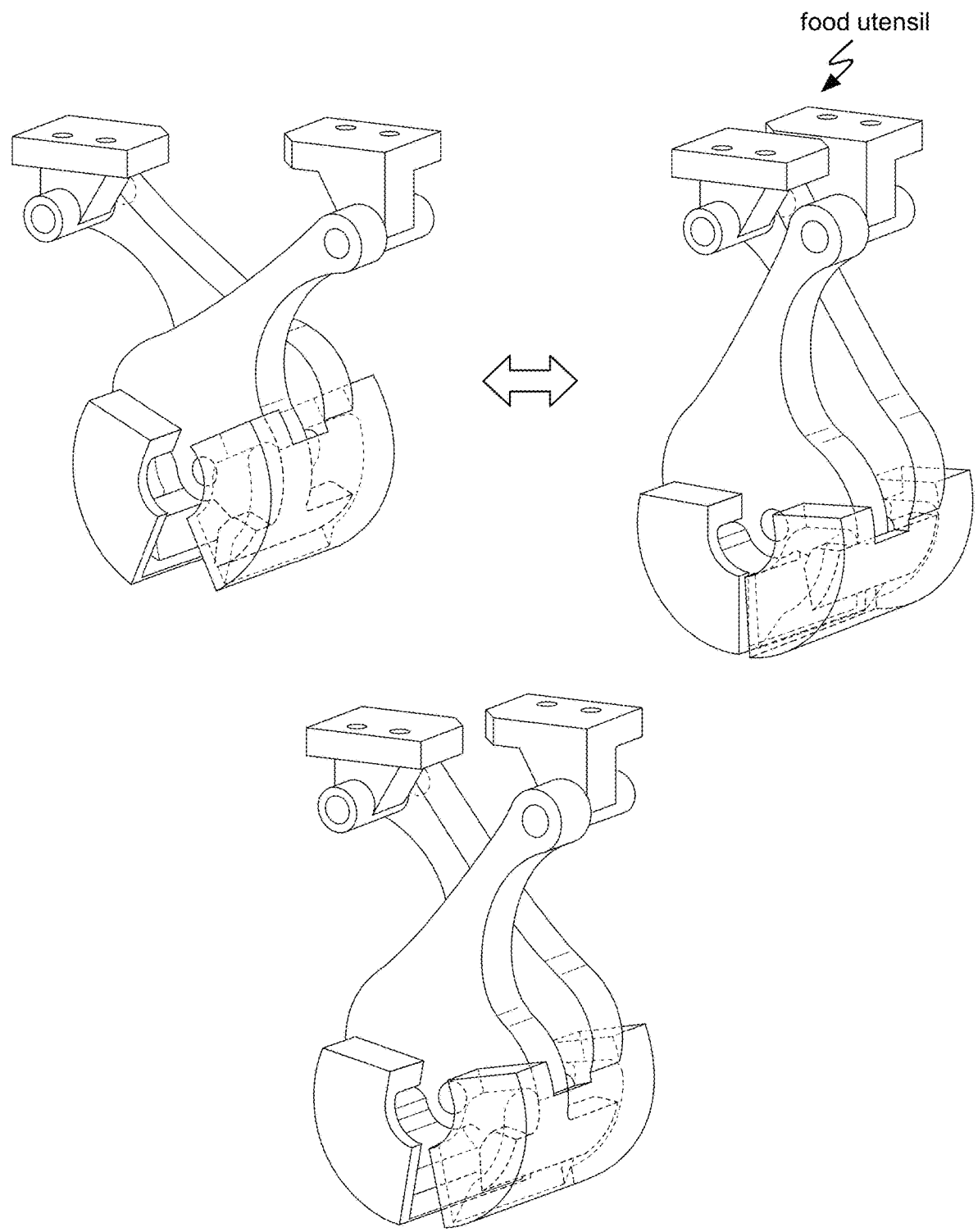
Figure 14J:
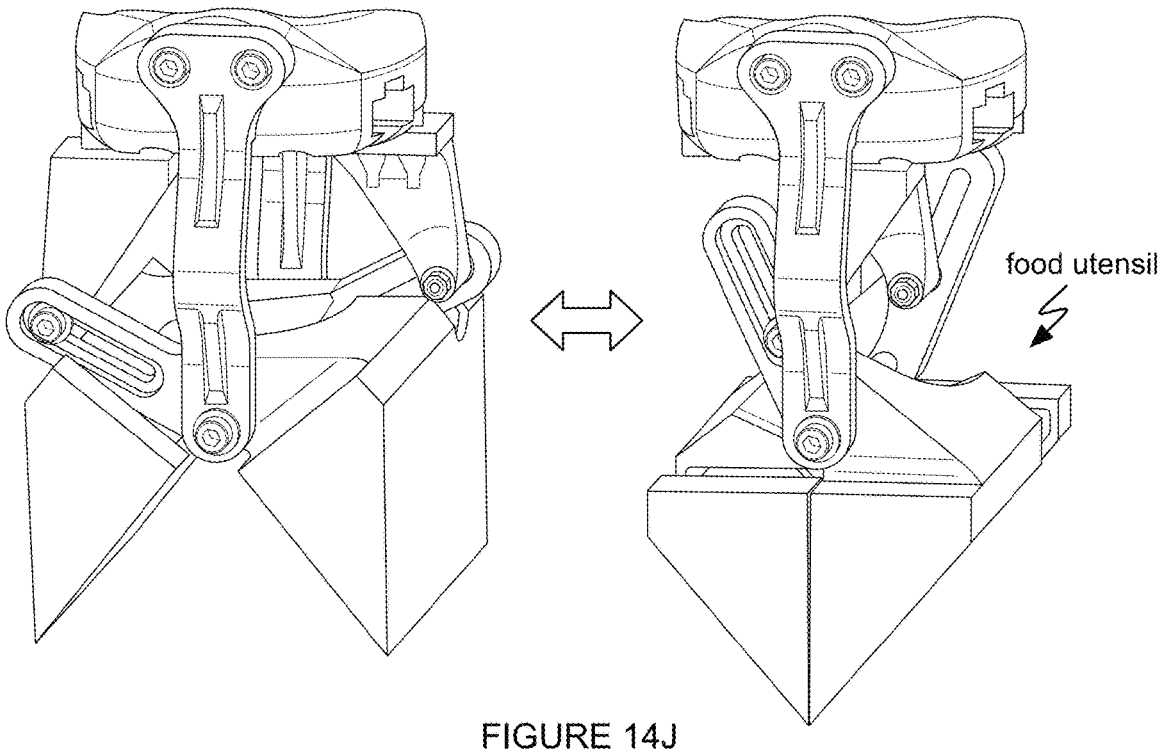
Figure 14K:
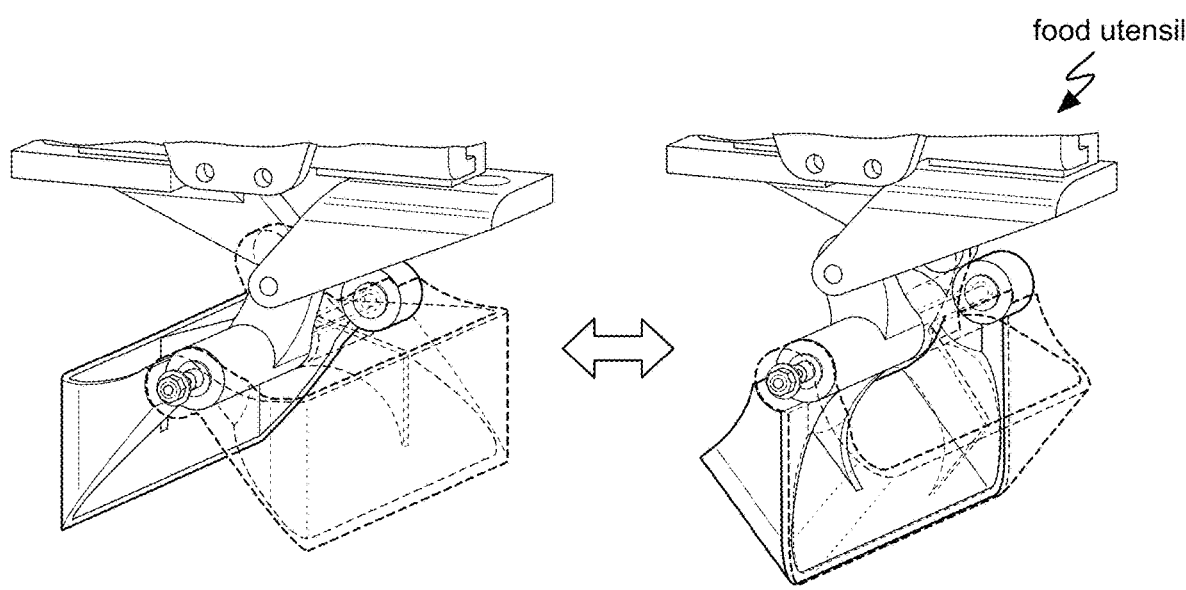

Examples of food utensils are shown in FIGS. 14A-K, FIGS. 15A-B, and FIG. 16. Food utensils can pick foodstuff from the foodstuff bin by: punching (an example is shown in FIG. 14A), pushing (an example is shown in FIG. 14B), chomping (an example is shown in FIG. 14F), stabbing (an example is shown in FIG. 14J), excavating/scooping (an example is shown in FIG. 15A), pressing (an example is shown in FIG. 15B), and/or any other suitable picking techniques. Food may be places and/or evacuated from the food utensil by: clapping (e.g., mechanical impact at a side of a utensil opposing the foodstuff; an example of a clapping digger is shown in FIG. 14D), scraping (an example is shown in FIG. 14I), ingression (e.g., an example is shown in FIG. 14E), gravitation release, and/or any other suitable placement techniques.

The food utensil(s) can be mechanically connected an actuator of the robot arm (e.g., an end effector of the robotic arm; at a mechanical interface) by a set of fasteners which can include: an automatic tool changer (e.g., a pneumatic tool changer, CNC-style tool changer, etc.), manual tool changer (e.g., quick release pin mechanism), threaded fasteners, snap-fit connectors, twist-lock connectors, quick-release mechanisms, quick release pins, slotted mating connections, and/or any other suitable mechanical connections/fasteners.

Food utensil(s) are preferably collaborative utensils and/or can be configured to operate in a collaborative environment (e.g., with various user protections; without pinch points; with physical user protections/guards, etc.), but can additionally or alternatively be configured to operate in an industrial setting (e.g., without human protections), and/or can be otherwise configured. In some variants, the food utensil(s) can be constructed from metal (e.g., food safe titanium, stainless steel) and/or are detectable by a metal detector, which may de-risk failure scenarios in various assembly contexts (e.g., component chips/pieces can be identifiable in a failure case). Additionally or alternatively, food utensils and/or components thereof can be colored (e.g., blue) and/or patterned (e.g., checkered, etc.) to contrast the appearance foodstuff ingredients and/or foodstuff containers, which may likewise facilitate separate identification of food utensil components (e.g., or chips/pieces in a failure scenario) and foodstuff ingredients/containers. However, food utensils can be otherwise configured.

However, the system can include any other suitable food utensils. Alternatively, the system can be configured to operate with any other suitable end-effectors, tools, or bulk picking utensils (e.g., in various bulk assembly contexts, etc.).

The computing system can function to perform one or more steps of the method, but can additionally or alternatively provide any other suitable functionality. The computing system can be local to the module/system (e.g., housed within an electrical enclosure, such as with water and/or particulate ingress protections, etc.), remote, and/or otherwise located. The computing system can include one or more modules (e.g., system planner, perception module(s), pick planner, insert planner, controller, etc.). The computing system can include a system planner which can execute S100 (and/or S120 thereof). The computing system can include a perception module which can maintain a model of the foodstuff bin(s). Additionally or alternatively, a perception module can function to generate a container pose estimate according to S300. The computing system can include a pick planner which functions to select a pick target according to S200. The computing system can include an insert planner which functions to determine an insert target according to S300. However, the computing system can include any other suitable modules.

The controller can function to control the robot arm, the one or more sensors, and/or any other system component. The controller can be wirelessly connected, electrically connected, and/or otherwise connected to one or more components of the system. The control module can include a motion planner, which functions to determine control instructions for the robot arm to execute a grasp attempt for a grasp location. The motion planner can employ any suitable control scheme (e.g., feedforward control, feedback control, etc.). The control instructions can include a trajectory for the robot arm in joint (or cartesian) coordinate space, and/or can include any other suitable control instructions (e.g., CNC waypoints, etc.).

However, the system can include any other suitable computing system.

The optional container management system 170 functions to transform food containers (e.g., 'bowls') within the food assembly system. The container management system can include: a conveyance system 172, a container denester 174, an egress station 176, and/or any other suitable components.

The conveyance system functions to transform food containers through the workspace of the robot arm. The conveyance system can be integrated into the food assembly system and/or can be separate (e.g., industrial conveyor line). The conveyance system is preferably a conveyor (e.g., belt, roller conveyor, etc.), however can include any other suitable rotary or linear conveyance systems. There can be a single conveyance system for the foodstuff assembly system, multiple conveyance systems per frame/arm module or food container, or no conveyance system (e.g., for a C-frame which may be used adjacent to an industrial line, where a human transforms the container, etc.).

In a first variant, the conveyance system can be contained within the frame (e.g., in a sagittal plane cross section) and span a full width of the frame (e.g., frontal cross section).

In a second variant, the foodstuff assembly system can be used in conjunction with a separate conveyance system within an industrial line.

The container denester functions to transfer food containers 178 onto the conveyance system and/or store food containers (e.g., in a nested and/or stacked configuration). Preferably, the container denester engages the bottom two food containers housed therein, but can additionally or alternatively engage only the bottom container, a plurality of containers, every container, and/or any other suitable number of containers. The container denester preferably relies on gravitational dispensing (e.g., container weight), but can additionally or alternatively continuously control and/or retain containers while transferring them to the conveyance system (e.g., auger, etc.).

In an example, the container denester can engage the lip at the upper periphery of containers via alternating engagement of a pair of food container retention mechanisms, which can serially dispense food containers. With a first mechanism engaging a bottom (lowest) food container, a second mechanism can engage the next adjacent (stacked) food container. The first engagement mechanism can then be released to dispense the bottom food container, transferring it to the conveyance system. The first engagement mechanism can then engage the next adjacent food container by deploying the first mechanism in the engaged position and subsequently releasing the second mechanism.

The container denester can engage any suitable portions of the food containers, such as the base, sides, and/or a lip (e.g., at an upper periphery of the food container) at any suitable positions. In an example, the container denester can engage the containers at a plurality of points (e.g., three, four, six, etc.) surrounding a center of mass of the container and/or symmetric about the center of the container.

The container management system can optionally include an egress station, which functions to house food containers outside of the frame and/or workspace of the robotic assembly system. As an example, the container management system can include a set of angled rollers which passively support food containers (e.g., with completed/assembled orders) in the order that they are completed. However, the egress station can be actively actuated or otherwise suitably implemented, or may otherwise not be included as a part of the system (or on individual modules therein).

However, the system can include any other suitable container management system and/or exclude a container management system.

The optional human machine interface (HMI) functions to receive human inputs which can be used by the computing system to determine foodstuff assembly instructions and/or control instructions for the foodstuff assembly system. The HMI can be local (e.g., at the foodstuff assembly system) or remote (e.g., wired and/or wirelessly connected to the foodstuff assembly system). The HMI can be centralized (e.g., all inputs received at a single endpoint, such as a touchscreen display) or distributed (e.g., multiple order systems, safety switches, etc.).

The system preferably includes one HMI per modular foodstuff assembly system (e.g., one HMI mounted each independent module frame), which may facilitate receipt of different/unique foodstuff assembly instructions, independent module servicing, and/or provision of separate user feedback (e.g., validation parameters, etc.) at distinct modules.

In a specific example, the HMI is preferably arranged distal to a conveyor (or conveyor region) of the system. For example, the HMI can be mounted opposite the base of a robotic arm (e.g., opposing the robotic arm across a thickness of a frame member; where the robotic arm is side-mounted at a rear end of the foodstuff assembly system, with the front defined relative to a to the conveyor, etc.). However, the HMI can be remote from the system or frame (e.g., in a separate instrument panel, one a phone, be accessible via a cloud service, etc.); be mounted: adjacent the robotic arm (e.g., on the same wall, on an adjacent wall, etc.), on top of the system, below the robot workspace, and/or at any other position on the system; and/or be otherwise arranged relative to the system. The HMI can interact with one or more systems.

However, the system can include any other suitable HMI and/or exclude a human machine interface.

However, the system can include any other suitable components.

4. Foodstuff Assembly Method.

The method, an example of which is shown in FIG. 2, can include: determining a context S100, determining a pick target based on the foodstuff assembly instructions S200, determining an insert target based on the foodstuff assembly instructions S300; optionally controlling a foodstuff assembly system based on the pick target and the insert target S400; and optionally servicing the foodstuff assembly system S500. However, the method can additionally or alternatively include any other suitable set of components. The method functions to enable picking of foodstuff from a set of foodstuff bins and placement into a food container (such as a bowl, tray, or other foodstuff receptacle). The method can be repeated for different pick/place instances, different foodstuffs, and/or otherwise repeated.

4.1 Foodstuff Assembly Context.

Determining a context functions to establish operational constraints and/or objectives to facilitate planning (e.g., S200 and S300) and control (e.g., S400) of the foodstuff assembly system. Additionally or alternatively, the determining the context can function to facilitate reconfiguration of the system to a variety of use cases, operational, environments, and/or ingredients. Determining the context can include registering the foodstuff assembly system S110, determining foodstuff assembly instructions S120, and/or any other suitable elements.

The context can include: foodstuff assembly instructions, conveyor parameters (a.k.a., parameters of a conveyance system), registration parameters, throughput parameters, and/or any other suitable information/parameters pertaining to the foodstuff assembly context. In a specific example, the context can include a conveyor parameter (e.g., a conveyor speed) and/or a throughput parameter inferred/estimated based on the conveyor motion (e.g., cycle time; throughput rate, etc.; current insertion interval); registration parameters; and foodstuff assembly instructions (e.g., received from an HMI; which can include a target foodstuff amount and/or insertion layout; etc.); and/or any other suitable information. In an illustrative example, the context for foodstuff assembly may change based on: system servicing and/or manual inputs by an operator; variance in conveyor line operation; variation in the arrangement of the foodstuff assembly system (e.g., relative to the conveyor, relative to other foodstuff assembly modules along the conveyor, relative to human workers along the conveyor, etc.), changes in the foodstuff assembly instructions, and/or based on other influences or contextual factors.

The context can be determined once (e.g., for a single iteration of the method, for repeated iterations of the method and/or multiple iterations/cycles of S200, S300, and S400), repeatedly, periodically, prior to planning and/or control, in response to system servicing (e.g., in response to a refill event and/or cleaning event), and/or with any other suitable timing. For example, the context can be determined once for a time interval (e.g., upon initialization of the system), where conveyor parameters and/or ingredient parameters are substantially constant over the interval. In a second example, the context can be repeatedly determined (e.g., for each iteration of the method), such as in environments with a variable conveyor speed.

The context and/or parameters thereof can be determined autonomously, automatically, dynamically, manually (e.g., based on a set of user inputs at the HMI), locally (e.g., at a controller of the foodstuff assembly system), remotely (e.g., at an offboard control system, etc.), and/or can be otherwise suitably determined.

However, the context can be otherwise suitably determined.

4.1.1 Conveyor Registration.

Registering the foodstuff assembly system Sino to a particular foodstuff assembly context functions to define a relationship between the foodstuff assembly system (e.g., robot workspace; sensor coordinate frame; etc.) and a conveyance system. Additionally or alternatively, system registration can be used to facilitate container identification, tracking, trajectory planning, and/or any other suitable method steps. For example, vertical positions used for trajectory planning (and vertical pose estimates of containers) may rely on the registered height of a conveyance system). In particular, an important relationship to facilitate consistent and/or aesthetically appealing ingredient placement may be the geometry (e.g., height) of superior surface of the conveyance system relative to the robot (e.g., robot workspace and/or sensor coordinate frame), which may be unobservable in some configurations (e.g., if obstructed or obscured by a container). As an example, the superior surface of the container interior may be a less accurate source of vertical information than the superior surface of the conveyance system (e.g., as it may be obscured by ingredients, may widely vary based on the height of ingredients within the container, may vary based on the type of container, etc.). As a second example, container tracking and/or insertion planning S200 may be performed in 2D (e.g., based on a substantially top-view image of the container, without vertical/Z information), independently of a vertical position of the container.

Further, in various configurations a surface normal of the conveyor can be misaligned from a vertical-axis of the robot coordinate frame and/or the conveyor may define a non-horizontal container trajectory (e.g., linear but out-of-plane with horizontal, non-linear/arcuate, etc.) which may be accommodated by registering the pose of the conveyor. In a first example, the floor (or other supporting surface for the robotic assembly system) may be angled, slanted, or tilted relative to a gravity vector to facilitate drainage. In a second example, a conveyance system may be angled (in pitch, yaw, or roll relative a direction of translation), curved (e.g., about Z axis, defining an arcuate path), or have any suitable 3D surface within the workspace of the robot (e.g., saddle-shaped, convex surface, concave surface, etc.).

System registration can be used to identify/register parameters of the conveyance system, which can include: superior surface pose, height (e.g., relative to a workspace of the robot and/or coordinate frame of the robotic system, etc.), shape/geometry, color, speed, calibration, and/or any other suitable parameters of the conveyance system. However, any other suitable parameters can be identified/registered. Parameters can be registered: once (when initially configured for a particular context), repeatedly, periodically, automatically (e.g., in response to a trigger event, such as: in response to a placement accuracy metric falling below a predetermined threshold, in response to the system being moved, after servicing, etc.), in response to a user input (e.g., via an HMI, based on an operator input), and/or with any other suitable timing/frequency. Registration is preferably performed in-situ for a particular context of the robot, with a static and/or moving conveyance system (e.g., with or without containers arranged thereon).

In a first set of variants, registration is preferably performed using a perception output associated with the superior surface of the conveyance system. The perception output is preferably a point cloud which can be generated using container tracking sensors (e.g., posed imaging data, such as RGB-d, LIDAR, etc.) which is pre-processed to confine the points to the superior surface of the conveyor system. In a first example, a user can manually select a conveyor region for registration from an RGB(-d) image based on the color and/or visual appearance of the conveyance system. In a second example, the perception system can automatically identify and segment out a conveyor region based on a previous/prior registration parameter (e.g., color and/or shape) of the conveyance system. In a third example, point cloud data associated with containers can be removed/eliminated using a container tracker (e.g., 2D tracker, 3D tracker; based on the same or different set of sensor data; etc.). The perception output can be a single frame of sensor data (e.g., single RGB-d image and/or LIDAR point cloud) or a plurality of frames (e.g., fused point cloud, etc.). However, the registration can utilize any other suitable perception outputs.

The conveyance parameters are preferably extracted from the (pre-filtered) perception output (e.g., depth image data, RGB-depth data, etc.), but can alternatively be manually determined (e.g., a conveyor color can be manually selected from within an image by a user, for example; a geometry can be manually provided—such as a 2D flat/planar conveyor vs a 3D conveyor), or otherwise determined. The conveyor parameters can be modeled in 1D (e.g., only a height parameter), 2D (e.g., as a posed plane), 3D (e.g., as a posed surface), and/or can be otherwise suitably modeled/parameterized. In a first variant, the conveyor parameter(s) can be determined by fitting a model to the point cloud (e.g., fitting a plane to the point cloud; using linear least squares fitting, point-to-plane ICP surface registration, using regression techniques; etc.). In a second variant, the conveyor height can be extracted by a statistical evaluation of the point cloud (e.g., mean/median conveyor height etc.). However, the conveyor surface and/or parameters thereof can be otherwise suitably extracted.

The conveyor pose registration can be used to: adjust an extrinsic matrix, adjust the world frame (e.g., for ingredient placement), adjust the ingredient placement instructions (e.g., adjust the waypoints or endpoints, etc.), limit the number of candidate placement positions, and/or can be otherwise used.

In some variants, the conveyor parameters can optionally include a speed parameter estimate (e.g., conveyor belt speed), which can be registered by tracking visual features of the conveyor belt and/or containers thereon across multiple sensor frames, which may be used for planning and/or control over time horizons where the conveyor operates at a substantially uniform/fixed speed. As an example, the speed of a belt can be characterized by tracking the motion of a container using the perception system (e.g., a 2D or 3D container tracker thereof) across multiple container imaging frames. Alternatively, the speed parameter can be unregistered (e.g., where the speed of the conveyance system varies, where the speed is dynamically determined during runtime to facilitate trajectory planning/control), dynamically estimated, and/or otherwise accommodated.

In some variants, the conveyor speed can optionally be used to determine a throughput parameter estimate, such as a cycle time, insertion frequency, and/or interval parameter estimate, which may be used for planning and/or control. Alternatively, throughput parameters can be received as part of the foodstuff assembly instructions (e.g., via an HMI) or may not be utilized. For example, a throughput of the conveyor (and/or foodstuff assembly system) may be about 44 containers per minute (or a cycle time of about 1.4 seconds). In a second example, a foodstuff assembly system throughput can vary between about 20-30 containers per minute (e.g., depending on a distance between the pick target and the insertion target; or a cycle time of about 2-3 seconds). In a third example, a cycle time can be less than 5 seconds.

However, the foodstuff assembly system can be otherwise suitably registered for (and/or calibrated to) any suitable context(s).

4.1.2 Foodstuff Assembly Instructions.

Determining foodstuff assembly instructions S120 functions to determine ingredient parameters for pick and/or insert planning. Additionally or alternatively, determining foodstuff assembly instructions can function to determine an insertion arrangement for various ingredients. Ingredient parameters (e.g., predetermined or dynamically determined) can include: inherent parameters, assembly parameters, and/or other parameters. Inherent parameters can include: ingredient type (e.g., rice, tomato, etc.), ingredient prep state (e.g., chopped, diced, sliced, etc.), a food utensil class (e.g., clapper, scraper, digger, puncher, etc.), ingredient material properties (e.g., density, roughness, angle of repose, deformation properties, etc.), and/or other parameters. In variants, these can be predetermined (e.g., at ingredient preparation time, received at an HMI) and/or dynamically determined (e.g., estimated based on feedback from the sensor suite, etc.). Assembly parameters can include: ingredient amount (e.g., mass, weight, volume, etc.), ingredient arrangement within a food container (e.g., grid position, compartment index within a set of predetermined container compartments, position within food container coordinate frame, etc.), container offsets, pick depth offsets (e.g., for a particular ingredient, for a particular utensil), utensil orientation (e.g., during picking and/or insertion/placement, predetermined pose parameters, etc.), utensil offsets (e.g., in any axis, etc.), picking/insertion behaviors (e.g., picking motion, insertion motion, jiggling movement, etc.) and/or any other parameters. In variants, these can be determined programmatically, by a user selection, and/or otherwise determined.

In a first variant, foodstuff assembly instructions can be predetermined, such as in the case where a module of the foodstuff assembly system repeatedly performs the same operation within an assembly line. As an example, the pick and place planning in the first variant can be performed based on a binary ingredient determination (e.g., whether an ingredient should or should not be placed within a particular food container). The amount, placement position, and utensil for the repeated operation can be predetermined (e.g., accessed from a local memory, etc.).

In a second variant, the foodstuff assembly instructions can be automatically determined using a system planner, which receives orders, translates them into a schedule of operations (e.g., ingredient pick/insert operations), each operation associated with a set of ingredient parameters, which can then be used for pick and insert planning. For example, foodstuff assembly instructions can be received from an API (e.g., for a food delivery company), a POS system, an order aggregator, and/or any other suitable endpoint.

In a third variant, foodstuff assembly instructions can be manually determined (e.g., received via HMI).

However, the foodstuff assembly instructions can be otherwise suitably determined.

4.2 Pick Target Planning.

Figure 3:
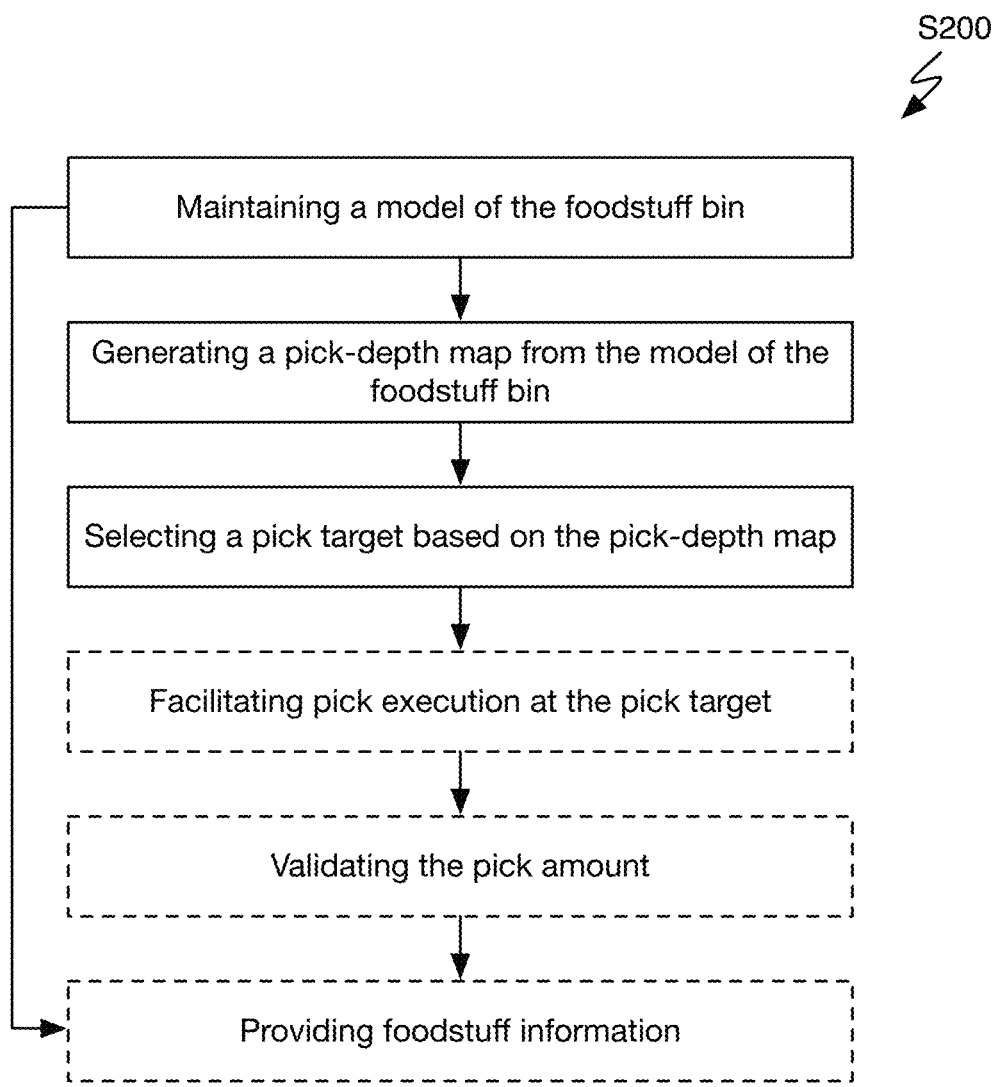
FIG. 3 is a diagrammatic flowchart representation of picking in a variant of the method.

Determining a pick target based on the foodstuff assembly instructions S200 functions to determine a pick target within the foodstuff bin to be used for motion planning and control. Determining a pick target S200, an example of which is shown in FIG. 3, can include: optionally determining (and/or maintaining) a model of the foodstuff bin; generating a pick-depth heatmap from the model; selecting a pick target based on the pick-depth heatmap; optionally facilitating pick execution at the pick target; optionally validating the pick amount; and optionally providing foodstuff information. However, determining a pick target can include any other suitable elements.

Determining (and/or maintaining) a model of the foodstuff bin functions to provide a persistent estimate of the surface of the ingredients (e.g., a superior surface) within the foodstuff bin. It can be particularly advantageous to maintain such a model to enable pick target selection and/or motion planning while the robot arm occludes bin imaging sensors of the sensor suite, which can eliminate planning delays. As an example, the model can be seen a "memory" (or "topographic memory") constructed from a plurality of historical frames (e.g., most recent N frames) and/or a previously generated model, which can maintain a persistent awareness of the topography (e.g., surface profile, shape, geometry, etc.) of foodstuff within the foodstuff bin. Alternatively, picking can occur based on perception of a single sampling frame (e.g., single depth image; without use of a model), such as immediately following a refill event, during a period when the robot arm does not occlude an imaging system field of view, in response to a satisfaction of a model regeneration event, prior to an initial generation of a model, and/or with any other suitable timing.

The model can be generated using a set of image(s) from the bin imaging sensor(s) and/or updated with any suitable timing/frequency. The images are preferably captured by the bin imaging sensors, and depict a physical scene which includes (spans) an interior of the foodstuff bin. The field of view of the image scene preferably spans the lateral dimensions of the foodstuff bin(s), but can be entirely bounded within an interior of a container, can extend up to the periphery (e.g., sides) of the container (e.g., include pixels associated with the container periphery), can extend beyond a periphery of a container (e.g., include pixels not associated with the container), and/or any other suitable images. The images can include 2D RGB images, depth images, and/or any other suitable images (e.g., lidar, etc.) or image data.

In variants where the physical scene includes a plurality of foodstuff bins, the images can be segmented at the container boundaries and a separate model can be generated for each foodstuff bin. In an example, the image scene is captured with a predetermined field of view in an imaging coordinate frame and/or can be automatically/dynamically cropped to a predetermined area of interest (e.g., area within bin), and/or otherwise suitably transformed. Alternatively, multiple bins and/or multiple types of ingredients can be modeled together, and subsequently segmented (e.g., during target selection) by ingredient type/region.

The model is preferably a topographic model, such as a topographic map, spanning an interior region of the foodstuff bin (an example of which is shown in FIG. 6), but can additionally or alternatively be any suitable 3D surface, height map, depth map, point cloud, and/or other suitable representation. The model preferably excludes overhangs (e.g., which may not be directly observable from a top view image), but can additionally or alternatively model overhung sections of ingredients and/or tag overhung sections (e.g., to be avoided during pick point selection). However, any other suitable model can be determined. The measurements (e.g., images, point clouds, etc.) can be transformed into a model using any suitable image processing and/or filtering techniques (e.g., stereoscopy, photogrammetry, point cloud processing, etc.). The model is preferably generated using a combination of images (e.g., at least three), but can be generated from a single image. The model can include: a set of point clouds, a set of heights (e.g., a z-value for each pixel in the image, for each subregion in the workspace, for each of a set of x, y points, etc.), a surface, and/or have any other suitable topological representation. In examples, the model can be generated by: fitting a surface over a set of points (e.g., uppermost points), by using a space filling curve, by generating a mesh over the points, by estimating the surface normal for each of a set of points and inferring the surface based on the surface normal, and/or any other suitable surface reconstruction technique.

After initial generation of the model, the model can be updated based on subsequent images/frames of data to maintain a persistent awareness of the surface topography based on the prior state and/or a new model of the topography can be supplemented (e.g., to fill in occluded regions) with values from a prior model. In some examples, particularly in cases where a robot arm is mounted at a vertical position between a height of the foodstuff bin and a camera and the foodstuff bin is arranged longitudinally between the base of the robot arm and a container (or other insertion target), the robot arm may frequently traverse the field of view of the imaging sensors, which may at least partially occlude image frames of the foodstuff bin for a particular cycle. For example, the robot arm may at least occlude imaging sensors and/or images during most (all) portions of a pick/place cycle. As a result, persistent state awareness and/or modeling (independently of the robot arm operational trajectories) may be particularly advantageous, since the surface of the foodstuff may be only partially observable within individual image frames. The model can be updated: continuously, periodically, repeatedly (e.g., between picks), after each pick, after a refill/human servicing event, in response to satisfaction of an update threshold (e.g., more than a predetermined number of detections at a coordinate position deviating from the model), and/or with any other suitable timing. However, the model can additionally or alternatively be regenerated periodically (e.g., after each pick), in response to a pick amount deviating from a target pick amount, contemporaneously with picking (e.g., from a different foodstuff bin), contemporaneously with robot arm operation, contemporaneously with placement, and/or in response to any other suitable event.

In variants, when the model is updated, the height (or depth) at each position of the model is constrained to be monotonically decreasing in height (monotonically increasing in depth) as a function of time (e.g., between refill events; over a time period prior to model regeneration; for model updates; etc.). The monotonically decreasing condition can require: all regions of the foodstuff to monotonically decrease, the average height of the detected foodstuff to monotonically decrease, require a new model to be generated if the condition is violated, and/or include any other monotonically decreasing condition. However, any other suitable condition, or no condition, can be applied.

Additionally or alternatively, the model can optionally be regenerated (e.g., not based on previous images and/or historic model states) in response to determination of a regeneration event, such as a satisfaction of a threshold deviation from the specified ingredient amount, power-reset, detection of a refill event, manual input by a user at the HMI, validation parameter (e.g., pick mass of a single pick, standard deviation of prior N picks, etc.) exceeding a deviation threshold, in response to a surface smoothing operation (e.g., manual smoothing of ingredients by a human, automatic smoothing with a foodstuff utensil, etc.), and/or any other suitable regeneration event.

In variants, images can be filtered to remove arm detections and/or other occlusions (e.g., human hand), such as by segmenting out regions of an image with height/depth measurements in excess of a predetermined threshold (e.g., above a top plane of the foodstuff bin, above a previous surface height of the model, etc.). In variants, the images can additionally or alternatively be filtered based on the color image, such as segmenting out pixels which deviate from a color of the foodstuff by more than a predetermined threshold (e.g., color distance within sRGB space, etc.), segmenting out objects detected using an object detector (e.g., robot arm, food utensil, etc.), and/or otherwise removing extraneous height/depth measurements.

However, the model can be otherwise suitably maintained.

The method can include generating a pick point map, which can include pick point values for each of a set of pick points (e.g., points within the bin, etc.). The pick point values can be: a pick depth, a probability of pick success (e.g., probability of selecting the target ingredient amount), a pick score (e.g., calculated based on an optimization, heuristic, etc.) and/or values for any other suitable parameter. In variants, descriptions and characterizations of pick-depth maps discussed herein can be equally applicable to the pick point map.

Generating a pick-depth map (e.g., heatmap, probability map, pick score map, etc.) from the model functions to determine pick depths which satisfy the foodstuff assembly instructions (e.g., ingredient amount).

The values for the pick-depth map (e.g., pick point values) are preferably determined based on the amount (e.g., volume and/or mass) of foodstuff as specified by the foodstuff parameters. For a given foodstuff surface topography of the foodstuff bin, varying the pick depth at a given coordinate position in a lateral (cartesian) plane can result in a different volume pick (e.g., for some food utensils) and/or a greater probability of a successful pick (e.g., within a threshold deviation from a predetermined foodstuff amount).

The pick-depth map can be absolute (e.g., height/depth in the sensor coordinate frame) or relative based on: a height of the model surface (e.g., topographic map height) at a coordinate position/pixel, a height of a top plane of the bin, a predetermined pick waypoint, and/or any other suitable reference. The pick-depth map preferably includes a single depth parameter value for each coordinate position and/or pixel within a 2D array, but can additionally or alternatively include a pick probability score (e.g., computed based on the surface gradient of the foodstuff within the footprint of the food utensil, proximity to a full depth or base of the container, proximity to a side of the container, etc.) and/or any other suitable information.

Pick-depth values are preferably determined as a continuous map or a full area of the bin region, but can alternatively be determined for a subset of the bin region (e.g., area accessible to a food utensil, based on a collision avoidance constraint, etc.), discontinuous/discretized (e.g., for a set of individual points, etc.), and/or can be otherwise suitably determined.

Figure 11A:
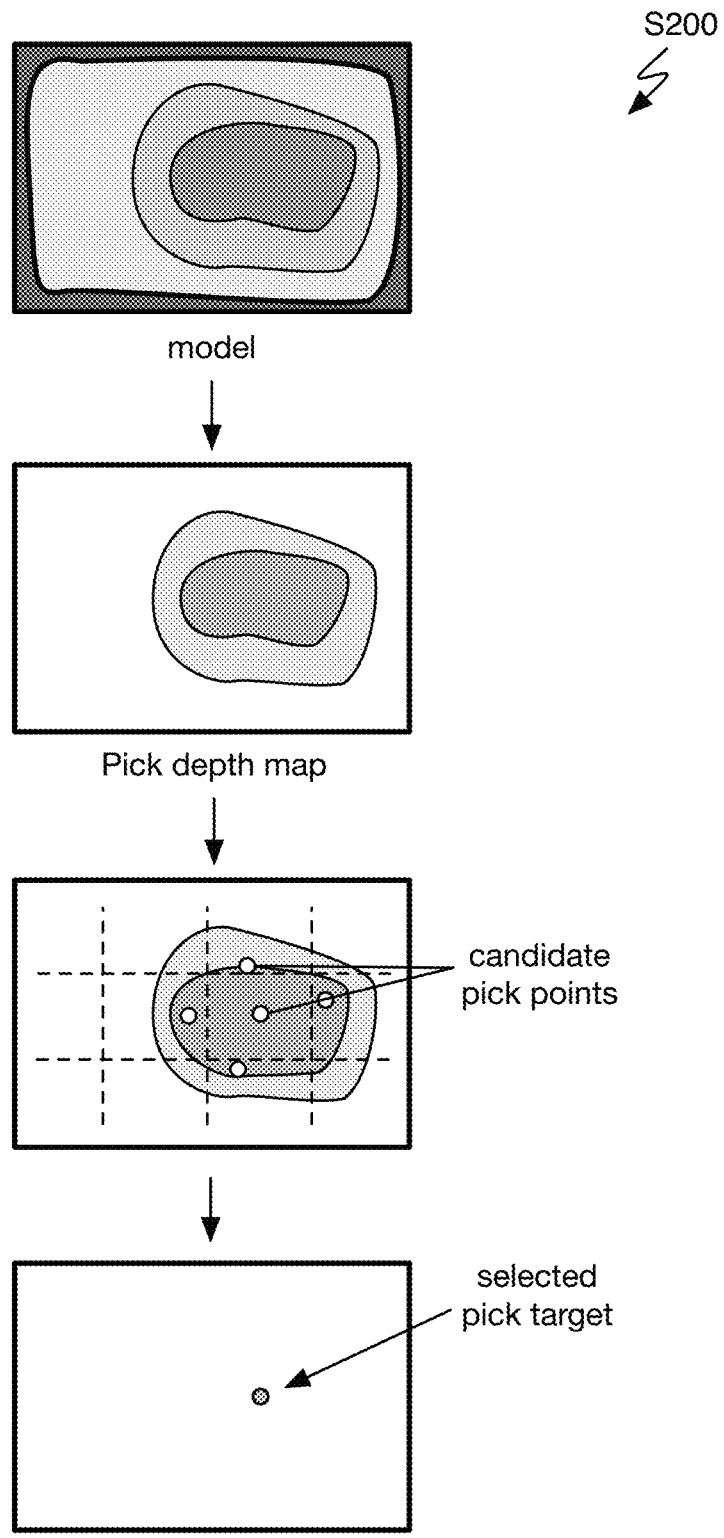
FIG. 11A is a flowchart illustration of pick target selection in a variant of the method.
Figure 11B:
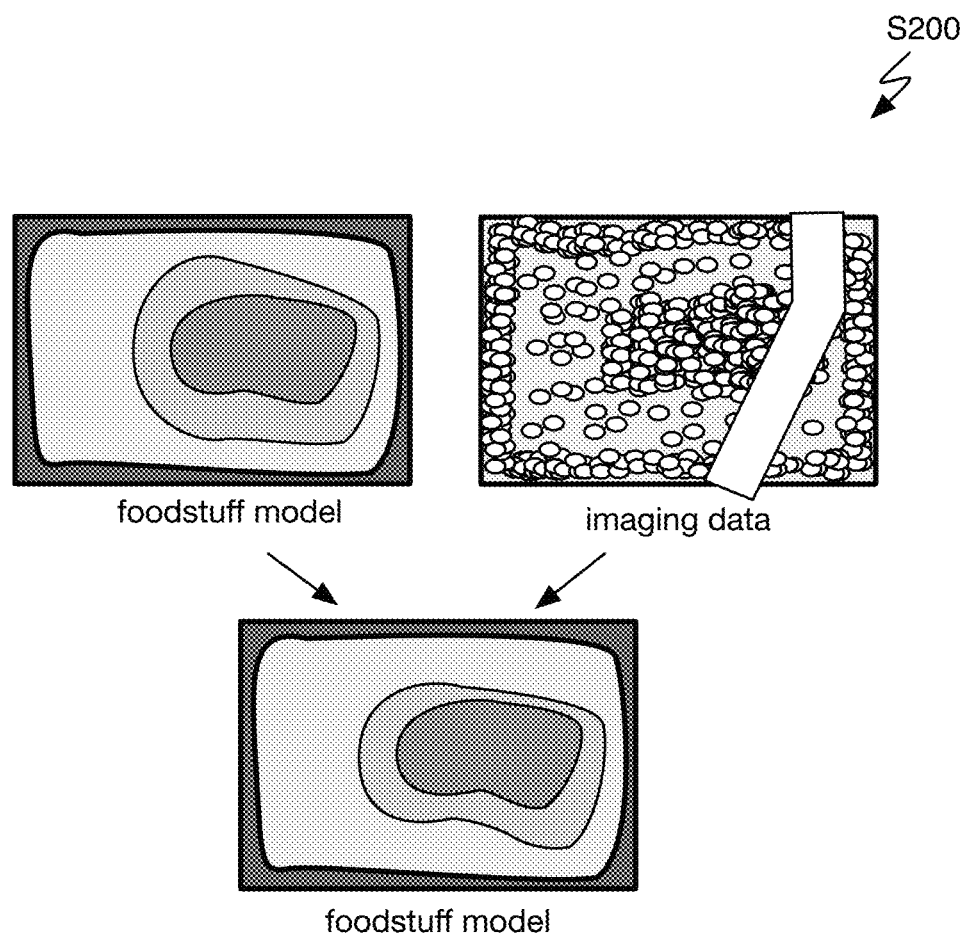
FIG. 11B is a diagrammatic illustration of maintaining a model in a variant of the method.
Figure 11C:
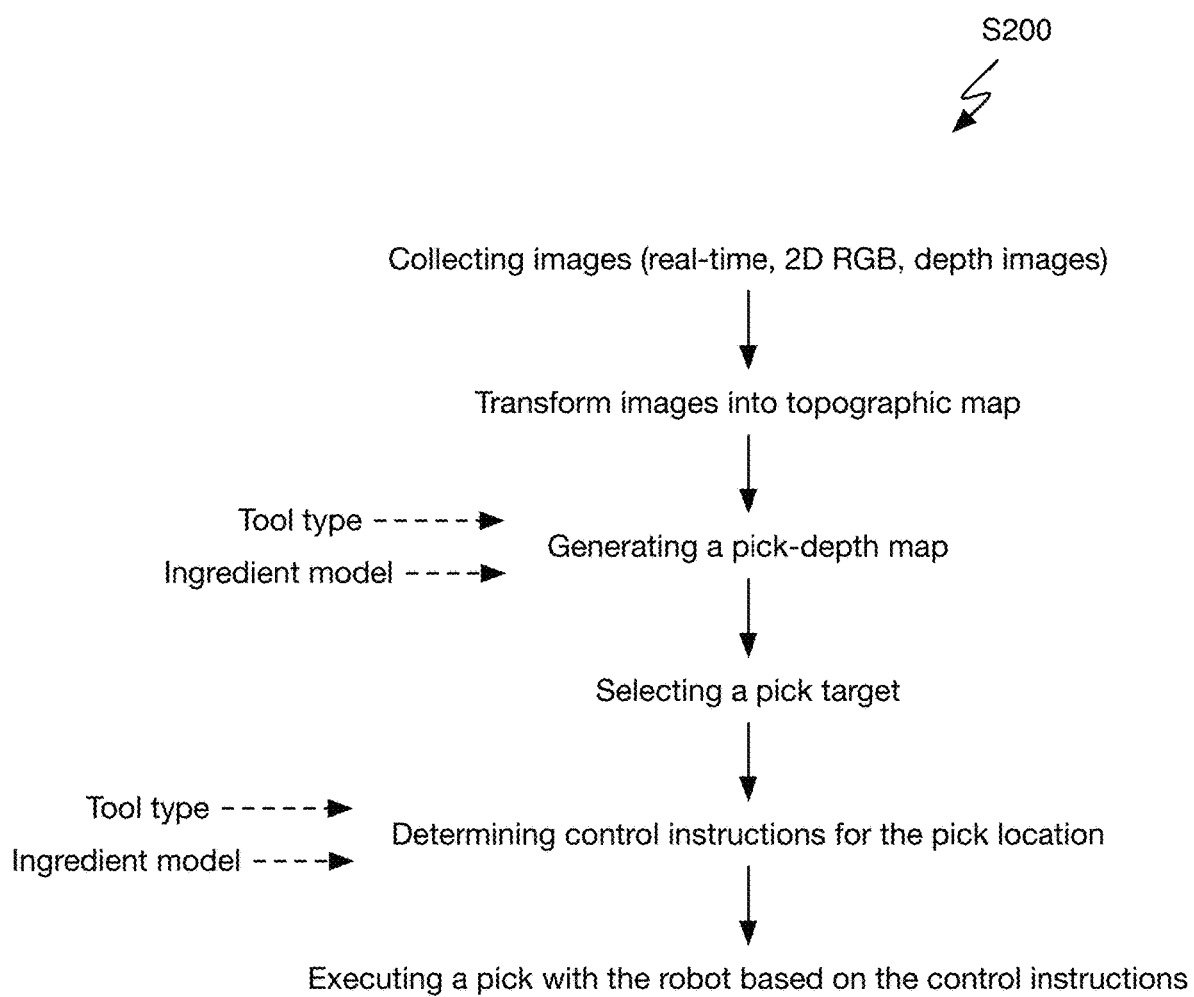
FIGS. 11C-11D are flowchart examples of picking in a first and second variant of the method, respectively.
Figure 11D:
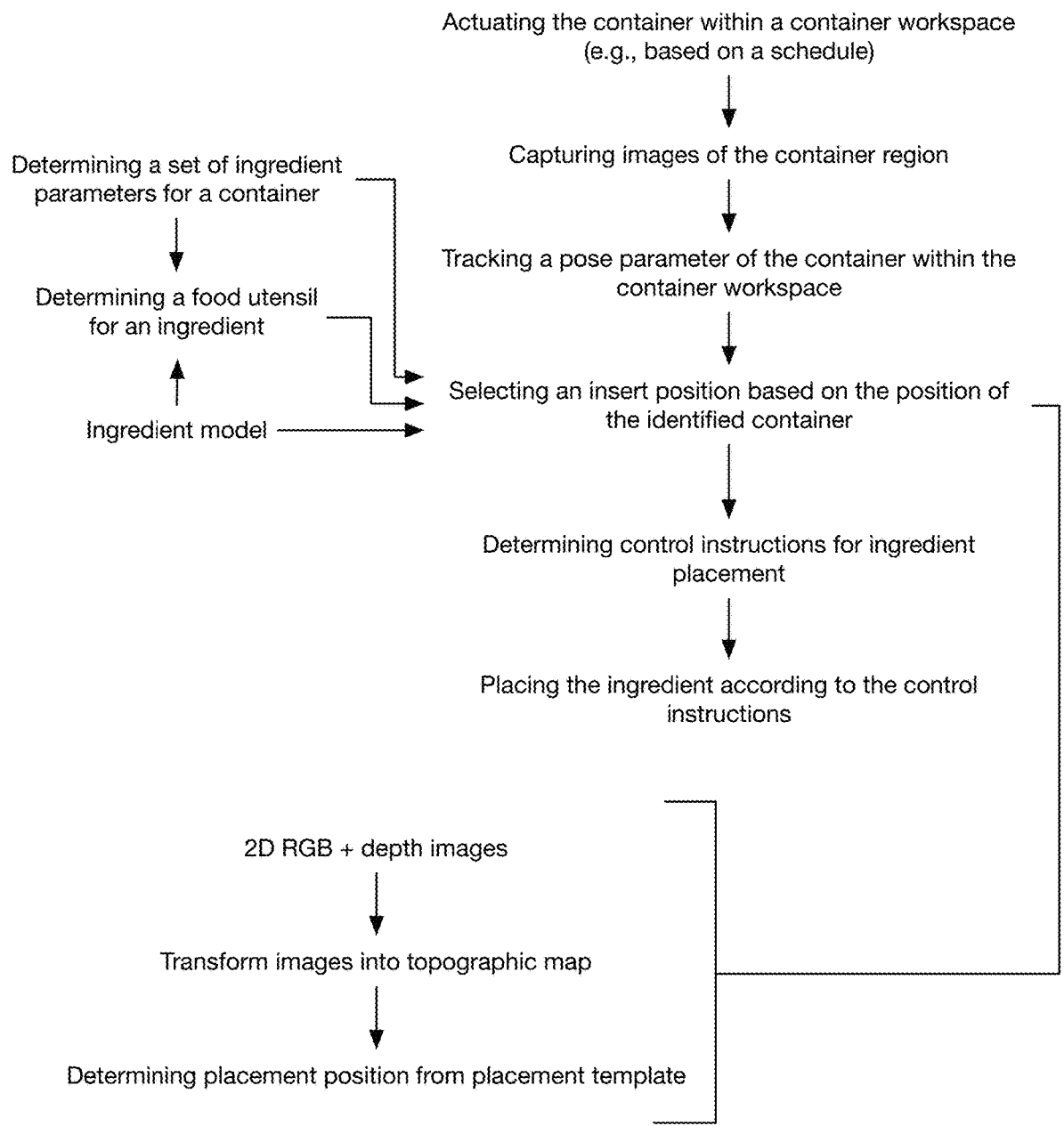

In variants, the pick depth at a particular position can be determined based on the footprint of the food utensil (e.g., maximum footprint, swept volume across actuation stroke, footprint of tool when closed/deployed, etc.; 2D projection of the tool footprint into lateral plane, 2D sensor coordinate frame, etc.). In such variants, a volume regression can be used to determine the pick-depth which minimizes a deviation between volume of foodstuff enclosed by the food utensil, based on the surrounding geometry of the model (within the footprint of the food utensil at the pixel), and the target foodstuff amount as specified by the foodstuff parameters. In an example, the foodstuff parameter may specify a target foodstuff mass—which may be advantageous for direct measurement feedback and/or pick validation (e.g., using a force torque sensor or load cell at the end of the robot arm; using a weight scale beneath the foodstuff bin which can measure a change in mass before and after the pick)—and thus may require conversion between foodstuff mass (or weight) and volume. Where the ingredient density is assumed to be constant/fixed over a particular time horizon (e.g., fixed for a particular foodstuff bin, fixed for a particular day), this conversion can be modeled as linear (e.g., via an ingredient model; an example is shown in FIG. 11B), and thus may be incorporated into the regression analysis by conventional techniques. However, regression analysis can be performed using an ingredient model(s), which can be linear, non-linear, and/or any other suitable ingredient model.

In alternative variants, the pick-depth map can be determined using a pretrained neural network (e.g., CNN, FCN, fully connected, etc.), artificial neural network (ANN), a feed forward network, a clustering algorithm, and/or any other suitable neural network or ML model. In such variants, the pick-depth heatmap can be computed directly from the model of the surface profile of the foodstuff bin and the foodstuff parameters, namely the type of food utensil, an ingredient model (e.g., ingredient density, etc.), the foodstuff amount (e.g., volume, mass, etc.), and/or any other suitable foodstuff parameters. In such variants, model-based pick-depth heatmaps can be generalized (e.g., for a set of foodstuff tools) and/or trained for a specific tool geometry. However, the pick-depth heatmap can be otherwise suitably determined.

In other variants, the pick depth map can be determined using a convolution of the tool shape over the model.

In other variants, the pick point map can include a set of pick scores (e.g., pick preference scores), wherein the pick scores can be calculated based on: proximity to the current or anticipated robot pose, pick speed, model height at that point, estimated resultant topology (e.g., with higher scores for flatter resultant topologies, higher scores for resultant topologies with more candidate picks, etc.), whether the system is lagging behind or is faster than the cycle time, a collision score (e.g., with a bin edge), and/or otherwise calculated.

However, the pick-depth map can be determined using a picking simulation, a heuristic, a regression, be the model itself, and/or otherwise determined.

Figure 9:
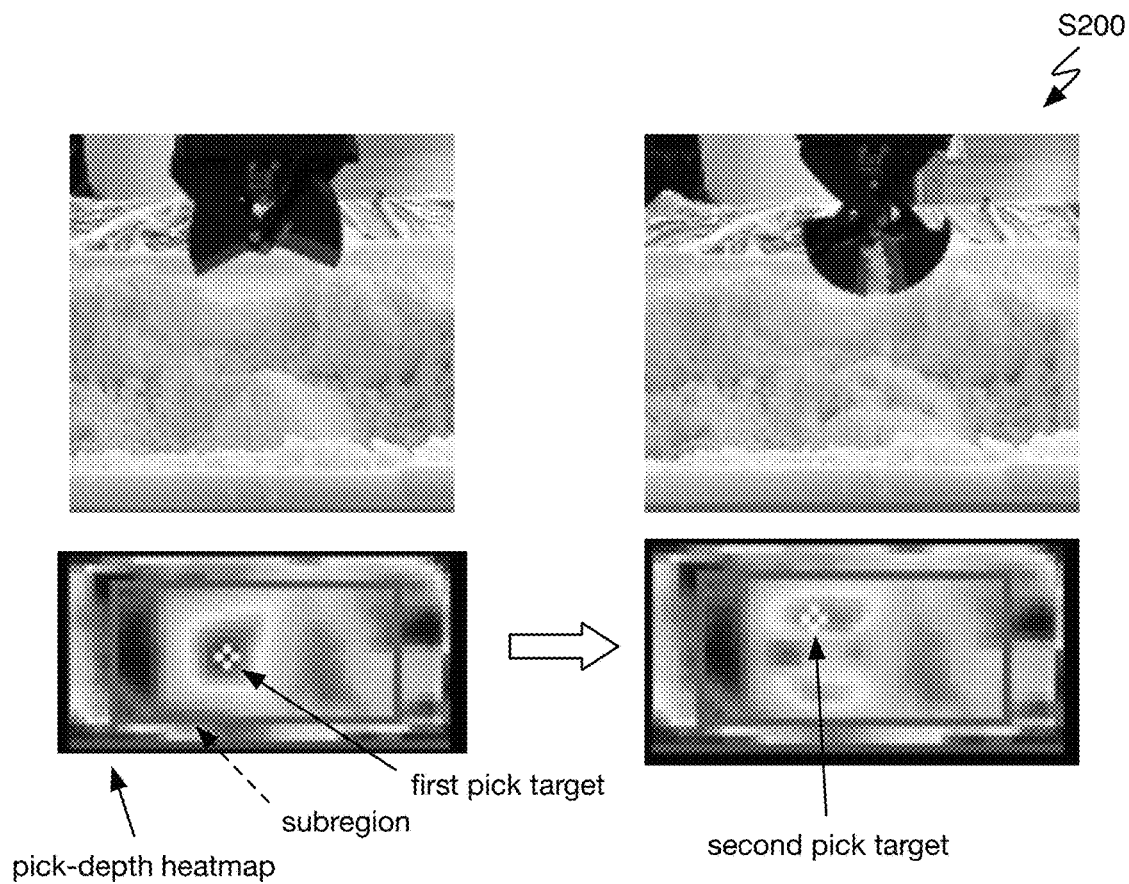
FIG. 9 is an example of a heatmap for picking in variants of the method.

The pick-depth map can be computed over the entire interior of the bin and/or a subset therein. In variants, it may be advantageous to compute the pick depth up to the periphery of the container (e.g., even if such pick points would result in collisions with the container walls), as the resulting gradients in pick depth can be used to select and/or evaluate pick points in subsequent processing steps. An example is shown in FIG. 9 (e.g., see peripheral region of heatmap). In alternative variant, the pick-depth heatmap may be computed only for valid pick points, such as for pick-points offset from the walls of the foodstuff bin by a predetermined threshold distance (e.g., half of a width of the food utensil, based on the pick footprint, etc.), which may reduce computational complexity.

In variants, the pick-depth map can include null/invalid pixels or 2D coordinate positions which will not satisfy the foodstuff parameters (e.g., where the volume of foodstuff below the surface is insufficient for a standard pick trajectory; at the periphery of the container). In such instances, these pixels can be blacklisted in any suitable manner, or otherwise provided a depth value in excess of a threshold (e.g., depth value below a base of the container, which may be filtered out by subsequent processes).

The pick-depth map can be determined continuously, repeatedly, periodically (e.g., with a frequency greater than a pick frequency, with a frequency equal to the pick frequency), between consecutive picks, contemporaneously with controlling the robot arm (e.g., during picking, placement, traversal between a pick point and an insert target, and/or any other suitable control operations), contemporaneously with planning, during a prior picking iteration, in response to completion of a pick, in response to a food utensil change, and/or with any other suitable timing/frequency. More preferably, the pick-depth heatmap is computed more than once per pick—such that the pick-depth heatmap is persistently available to enable pick target selection (e.g., of a future pick point) simultaneously with execution of a pick (e.g., n+1 pick point selected during execution of pick n). However, the pick-depth heatmap can additionally or alternatively be determined in response to updating the model of the foodstuff bin, in response to completion of a pick, and/or with any other suitable timing.

However, the pick-depth heatmap can be otherwise determined.

Selecting a pick target based on the pick-depth heatmap functions to determine a pick target for executing a pick within the foodstuff bin (e.g., based on the foodstuff parameters).

In some variants, selecting a pick target can include: determining a plurality of candidate pick points and selecting the pick target from the plurality of candidate pick points. The plurality of candidate pick points can be determined, recomputed, and/or updated with a different frequency than selection of a pick target. As an example, the plurality of candidate pick points can be determined in response to generation of the pick-depth heatmap and/or multiple times during a pick/insert sequence, whereas the pick target can be selected in response to the determination of foodstuff assembly instructions (e.g., in S100) and/or exactly once per pick. Alternatively, the pick target can be determined each time the pick-depth heatmap is generated (or updated) and/or with any other suitable timing.

In a first variant, candidate pick points can be determined as local maximum points within the foodstuff bins (e.g., via a gradient ascent approach for the pick-depth heatmap) or within a subregion therein. In an example, the heatmap can be subdivided into a grid or other set of predetermined subregions (e.g., 9 grid regions) and the candidate pick points can be taken as the minimum pick-depth pixel/point within each grid region, maximum height pixel, and/or the pick point having the highest success probability.

In a second variant, the candidate pick points can be taken at local maximal points within the pick-depth heatmap (e.g., each, less than highest n local maximums, such as highest 6 local maximums).

In a third variant, the candidate pick points can include all points within the bin. In a fourth variant, the candidate pick points can be all points within a predetermined distance of the current end effector (e.g., food utensil) pose. In a fifth variant, the candidate pick points can be all points above a predetermined height (e.g., above the bin height, above the median or mean foodstuff height, etc.).

Alternatively, candidate pick points can be determined based on a pick probability or score associated with the pixel of the heatmap, taken at the pick depth at a set of predetermined 2D coordinate positions, and/or can be otherwise suitably determined.

In variants of the system with a plurality of foodstuff bins, preferably at least one candidate pick point is determined for each type of ingredient and/or for each foodstuff bin. In such variants, it can be advantageous for a candidate pick point to be determined prior to the determination (e.g., receipt) of the foodstuff assembly instructions and/or to be computed by a parallel process. As an example, a candidate pick point for a foodstuff bin containing a first ingredient can be selected as the pick target in response to receipt of a foodstuff assembly instruction associated with the first ingredient. However, for foodstuff bin region(s) lacking sufficient foodstuff to achieve the target pick amount and/or in cases where no points satisfy a minimum success probability threshold, no candidate pick point(s) may be returned. In such cases, the candidate pick points and/or pick target can be used to provide feedback to human operators via the HMI and/or can be used to trigger refill notifications (or refill events). For example, if the size of the set of candidate pick points is less than a predetermined threshold number (e.g., 4, 3, 2, 1, etc.), and/or in cases where no pick target can be selected (e.g., based on collision constraints, foodstuff availability, success probability, etc.), the system may automatically trigger a refill notification (e.g., '10 seconds until empty', '1 pick remaining', 'empty').

The pick target can be selected from a set of candidate pick points and/or directly determined from the pick-depth heatmap based on the context (e.g., foodstuff parameters) determined in S100 using a set of rules or heuristics, and/or otherwise selected. For example, the pick target can be selected based on a proximity to an edge of the object container, gradient of the foodstuff surface within the food utensil footprint, minimum pick-depth, a set of collision constraints, a success probability maximization, a path-length minimization, a cycle-time optimization, a combination of the above, and/or any other suitable parameters or constraints. In a first example, the pick target can be selected so as to minimize deviations in the topography (e.g., pick peaks, avoid troughs). In a second example, the pick target can be selected to maximize the foodstuff removal from the container. In a third example, the pick target can be selected from a subregion of the container (an example is shown in FIG. 9) to avoid edge collisions. In a fourth example, the pick target can be the point with the highest score within the pick point map.

In some variants, the pick target can additionally or alternatively be selected based on a spatiotemporal optimization and/or a spatiotemporal analysis associated with the context. For example, optimizing for a combination of the remaining time left to fulfill foodstuff insertion into a container on a moving conveyor (e.g., remaining time that the container will remain in the workspace of the foodstuff assembly system) and length of a trajectory in space and/or time may allow the foodstuff assembly system to 'catch up' if it lags behind a cycle time for one or more placement cycles and/or to correct for upstream fulfillment errors, such as by inserting foodstuff into an extra container missed by an upstream worker or upstream system. In a second example, it may be advantageous to select a pick target with a lower probability of success (e.g., slightly suboptimal pick target; where another candidate pick point exists with higher success probability) in order to perform foodstuff insertion into a container which would be otherwise unreachable. In a first set of variants, the pick target can be selected based on a spatiotemporal optimization, which can be based on one or more of: a traversal distance associated with the pick target, a current pose of the robot arm, an insertion target, a conveyor speed, a throughput parameter, a remaining interval to fulfill an insertion for a particular insert target, the context (e.g., a conveyor pose information, conveyor parameters, conveyor speed), and/or any other suitable information. In a second set of variants, the spatiotemporal optimization can be performed using a temporal map, which discretizes an insertion delay across the foodstuff bin area and/or at each candidate pick location. For example, the insertion delay for an instantaneous robot arm pose can be estimated and/or pre-mapped for a particular point (or pixel region), which can be used to optimize the pick selection based on the available time. The spatiotemporal optimization/analysis can be determined prior to S200 (e.g., predetermined for a particular context, pre-computed, etc.), dynamically computed based on the context and the set of candidate pick points, and/or otherwise performed. However, any other suitable spatiotemporal (or temporospatial) optimization can be performed, or excluded in some implementations (e.g., where the line is controlled in response to foodstuff insertion, in a fast casual setting, etc.).

However, the pick target can be otherwise selected based on any other suitable optimizations (e.g., energy maximization), rules, or heuristics. The pick target is preferably selected and/or communicated to a motion planner of the controller based on the determination of foodstuff assembly instructions.

However, the pick target can be otherwise suitably determined.

S200 can optionally include facilitating pick execution at the pick target, such as by communicating the pick target to a controller and/or motion planner therein which executes a pick at the pick target according to S400. However, the pick target can alternatively be unused (e.g., where pick target may be determined multiple times before execution of a pick), or otherwise implemented.

S200 can optionally include validating the pick amount, such as by determining a difference between a measured value of the ingredient amount (e.g., measuring the mass and/or weight of picked foodstuff using the feedback sensors) and the ingredient amount as specified by the foodstuff assembly instruction. In variants, where the difference exceeds a predetermined threshold the foodstuff can be discarded or returned to a foodstuff bin (a.k.a., dumped), and the pick can be executed for a second pick target. In a specific example, after picking from a first foodstuff bin, foodstuff can be dumped into a different foodstuff bin of the foodstuff assembly system which houses the same type of foodstuff when the pick amount cannot be validated (e.g., which may avoid disrupting the surface of the foodstuff within the first foodstuff bin and/or rendering the foodstuff model obsolete). Alternatively, the foodstuff can be dumped into the originating bin.

S200 can optionally include providing foodstuff information which can be used to update ingredient models and/or inform servicing of the foodstuff assembly system (e.g., according to S500). In variants, validation parameters, such as the deviation of foodstuff parameters for a pick(s) (e.g., difference between specified and measured ingredient amount), can be provided to users via the HMI and/or used to update ingredient models. In a first example, in response to detecting a deviation of an ingredient amount in excess of a threshold, an HMI may notify a user that manual intervention is required for an operation (e.g., to fill a particular order). In a second example, the pick accuracy (e.g., percentage of picks within a threshold deviation of the specified ingredient amount) may be provided via the HMI. In a third example, the model of the foodstuff bin can be used to determine an amount of remaining foodstuff and/or an expected time to bin replacement, which may be provided (e.g., via the HMI) for use in S500. In a fourth example, the size of the set of candidate picks (and/or lack of a pick target) can be provided via the HMI and/or used to trigger a refill notification (or refill event).

However, target planning can be otherwise suitably performed

4.3 Insert Target Planning.

Figure 4:
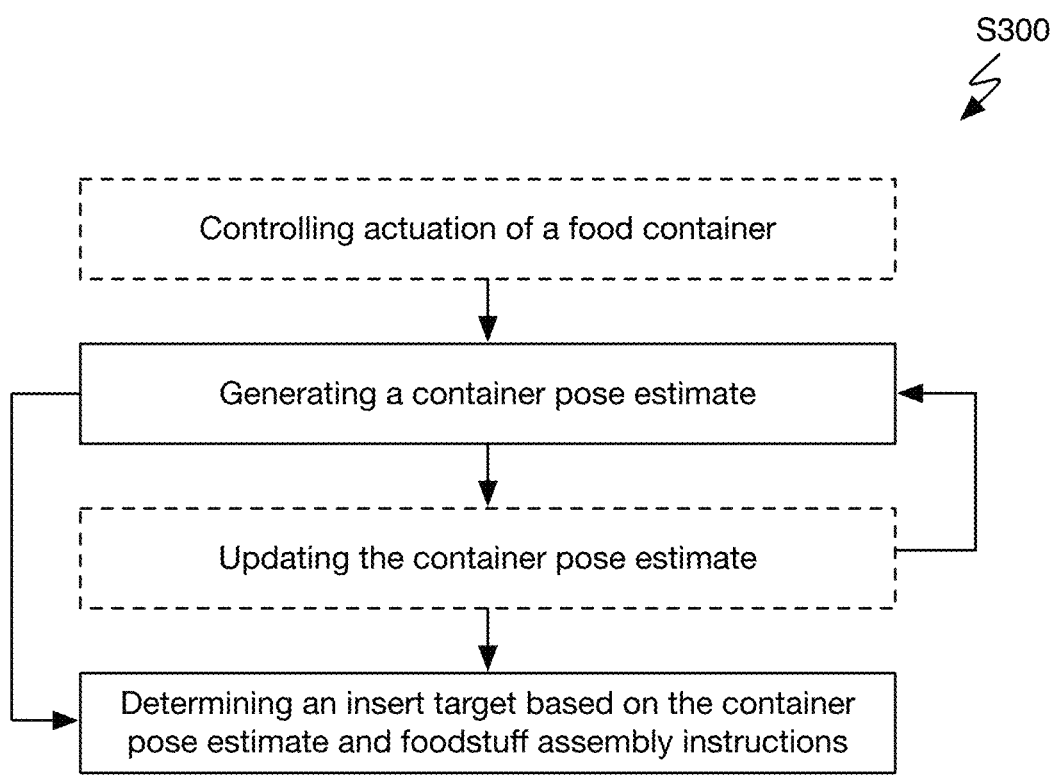
FIG. 4 is a diagrammatic flowchart representation of foodstuff insertion in a variant of the method.

Determining an insert target based on the foodstuff assembly instructions S300 functions to determine an insert target within a food container to be used for motion planning and control. Determining an insert target, an example of which is shown in FIG. 4, can include: optionally controlling actuation of a food container; generating a container pose estimate; optionally updating the container pose estimate; determining an insert target based on the container pose estimate and foodstuff assembly instructions; and optionally facilitating foodstuff placement at the insert target. However, determining the insert target can include any other suitable steps.

Optionally controlling actuation of a food container functions to transform a food container within the foodstuff assembly system. In such variants, the system can transform indexed food containers via a container management system, and the transformation rate (e.g., velocity) of food containers can be directly determined via feedback sensors of the sensor suite (e.g., encoders, position sensors, etc.).

Alternatively, the system can be used with a separately controlled belt or industrial line (e.g., without direct knowledge of belt speed, where the belt speed is estimated in S110, etc.), or containers may be transformed by humans (e.g., human placement of containers within a workspace of the robotic assembly system); and/or may be static during insert planning and/or control.

Figure 10:
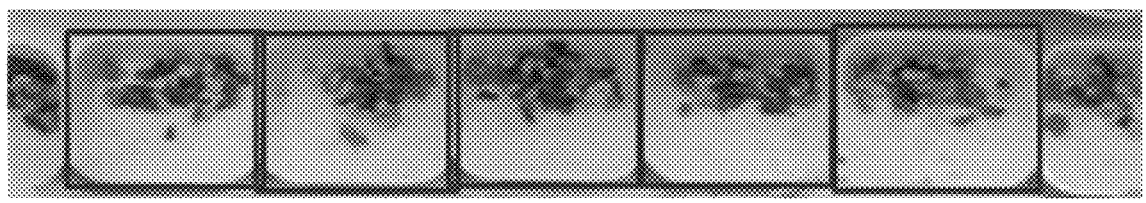
FIG. 10 is an example of a container tracking in variants of the method.

Generating a container pose estimate functions to determine a pose estimate for a food container(s) to be used for insert planning and/or control. The container pose estimate is preferably 2D, but can alternatively be 3D (e.g., point cloud, 3D surface/model, etc.), and/or 1D (e.g., a point along a predetermined line/curve, such as defined by the path of a conveyor). In a first example, the container pose can be determined as a 2D bounding box of the container in any suitable reference frame (e.g., sensor, cartesian, joint space, etc.; an example is shown in FIG. 10). In a second example, the container pose can be a point in 2D or 3D, such as a center point of a circular container or a reference position of a rectangular container (e.g., neglecting rotation, etc.). In a third example, the container pose can be a model of the container (e.g., 'thin' 3D surface, etc.). However, the container pose can be otherwise suitably estimated.

The container pose estimate can be determined using an image frame from the container imaging sensor(s). The images are preferably captured by the container imaging sensors, and depict a physical scene which spans a food container region of the foodstuff assembly system (e.g., a width and/or length of a conveyance system). The images can include 2D RGB images, depth images, and/or any other suitable images (e.g., lidar, etc.).

The container pose estimate is preferably determined using an object detector and/or object tracking system. The object detector is preferably pre-trained for the particular type of food container (e.g., color, shape, geometry, etc.; any suitable food container), but can be any suitable object detector (e.g., a generic object detector). The object detector is preferably an object network such as YOLO or RCN, but can be any other suitable type of object detector network, or another object detector.

In variants where the container transforms, either by controlled actuation or separate actuation (e.g., a container line), the container pose estimate for a container can be indexed along with container motion parameters (e.g., container velocity, acceleration, etc.), which can be received from a controller, determined based on an analysis of historical container displacement across multiple image frames, and/or otherwise suitably determined. Thus, for any time stamp following the initial pose estimate, the pose of the (each) indexed container can be estimated. Forward propagation of an initial pose estimate for each indexed container can allow tracking across occluded frames, thus providing 'object permanence' even when the robot arm repeatedly obstructs container imagining sensors within the confined space of the system.

In variants, the container pose estimate can be updated and/or refined using the object detector based on an analysis of subsequent, un-occluded image frames.

Determining an insert target based on the container pose estimate functions to determine an insert target to be used for trajectory/motion planning to allow ingredient insertion according to the foodstuff assembly instructions (e.g., from S100). The insert target can be determined according to a placement template as specified as part of the foodstuff assembly instructions (an example is shown in FIG. 11A). The placement template can be predetermined (e.g., predetermined set of positions relative to the food container reference frame, center position of the container, section reference of a container tray, etc.), dynamically determined at a system planner (e.g., based on the set of ingredients respective ingredient amounts; based on the foodstuff parameters, etc.), and/or can be otherwise suitably determined. Alternatively, the insert target can be dynamically determined based on the images and/or a surface profile of the interior of the container (e.g., pose of previously inserted ingredients). However, the insert target can be any suitable position relative to the container and/or any other suitable position.

The insert target can be static, dynamic (e.g., a trajectory transforming along with the food container), or be otherwise suitably determined. In a first variant, the insert target can be determined for a stationary food container. In a second variant, the insert target can be computed for a food container on a continuously actuated conveyor line.

However, the insert target can be otherwise suitably determined.

4.5 Controlling the Foodstuff Assembly System.

Controlling the foodstuff assembly system based on a pick target and an insert target S400 functions to transfer the ingredient from the foodstuff bin into a food container based on the foodstuff assembly instructions. Control instructions and/or control operations are preferably executed by the computing system and/or the robot. Executing the pick can include: planning a pick trajectory for the pick target, executing the pick, planning an insert trajectory for the insert target based on the pick target, and inserting the foodstuff at the insert target.

In variants, motion/trajectory planning can be dynamically computed and/or include various predetermined sub-elements or subroutines, which may correspond to the utensil class, ingredient type, and/or various other ingredient parameters. As an example, it may be advantageous to pick with a predetermined 'punching' motion for a puncher utensil or insert with a predetermined sequence (e.g., sweeping the arm at a fixed height above the container while actuating the food utensil). Accordingly, the motion/trajectory planning may be precomputed for a waypoint (or pair of waypoints) and/or robot arm pose with a deterministic position relative to the pick target (or insert target). The trajectory between the pick/insert waypoints can be computed while restricting the arm inside the confines of the frame (e.g., without articulating the wrist of the robot arm, relying on a limited range of motion of the robot arm), thus eliminating the possibility of singularities. Alternatively, the trajectory and/or control can be dynamically determined, and the robot arm can be dynamically controlled in any suitable feedforward or feedback control scheme. In some variants, trajectories and/or control instructions can be further refined or optimized after selecting the pick target (e.g., during an interval prior to execution of the pick based on path and/or pick optimization; during a pick based on feedback from a force-torque sensors, etc.).

However, trajectories for picking and/or insertion can be otherwise suitably determined can be otherwise suitably determined.

However, the foodstuff assembly system can be otherwise suitably controlled.

4.6 System Servicing.

Optionally servicing the foodstuff assembly system S500 functions to ensure the foodstuff assembly system is persistently available for picking and/or insertion according to foodstuff assembly instructions. Additionally or alternatively, servicing the system can maintain regulatory compliance with sanitation standards. Servicing the foodstuff system can include: adding ingredients to the foodstuff bin(s) (e.g., maintaining a persistent pick target), replacing the foodstuff bin(s) (e.g., with new types of ingredients; replacing an empty or near-empty foodstuff bin with a fill foodstuff bin; maintaining a persistent pick target; etc.), changing a food utensil of the foodstuff assembly system (e.g., based on the foodstuff assembly instructions, based on a state of the food utensil, in response to more than a threshold number of unsuccessful picks, etc.), cleaning the foodstuff assembly system (e.g., in response to an event trigger, in response to satisfaction of a time threshold, etc.), operating in place of the foodstuff system, and/or other suitable servicing operations.

In variants, servicing the foodstuff assembly system can occur based on information and/or feedback provided at the HMI, such as in the form of a continuously or selectively available parameter (e.g., 'remaining food bin capacity: 20%'; 'time until replace tomatoes: 20 minutes'; 'current pick mass: 50 g of rice'; etc.) or a notification (e.g., via the HMI; 'replace rice bin'; 'add broccoli'; 'reject order X'; etc.) in response to an event trigger (e.g., remaining foodstuff within a bin falls below a predetermined threshold, pick amount deviates by an excess of a predetermined threshold, etc.). Additionally, the HMI can direct human intervention for placement of a particular ingredient, such as for an ingredient type/volume which may be challenging for the system, or when a corresponding utensil is not available/clean.

In variants, it can be advantageous to control the robotic arm to move away from a human workspace during system servicing (e.g., into a static configuration, stowed upwards and rearwards within the workspace relative to the user). In variants, it can be advantageous to reduce an operational speed of the robot arm during system servicing and/or restrict the workspace of the robot arm during system servicing (e.g., restricting the robot arm to one side of a midsagittal plane of the system during servicing, such as the left side, operating at 20% of a maximum travel speed, etc.). However, the robot arm can otherwise operate normally during servicing (e.g., where the robot translation continuously operates below a predetermined threshold speed to minimize danger to workers in the surrounding environment), and/or otherwise operate during servicing. Additionally or alternatively, the robot can use an anomaly detector to detect if a human body part or unknown hazard is within the workspace. In these cases, a user (e.g., via the HMI) can decide if they want the robot to either slow down or stop.

Figure 5A:
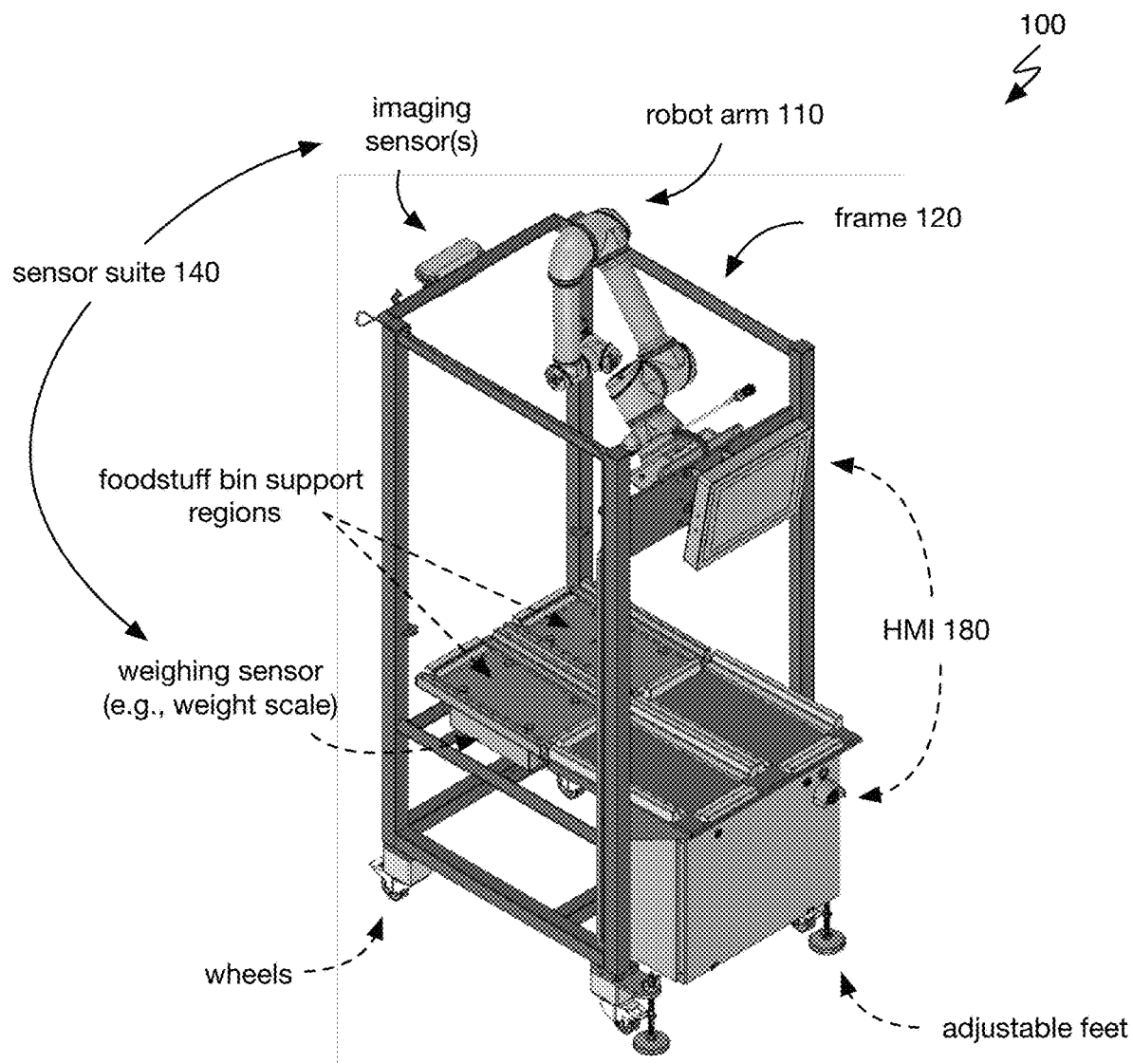
FIG. 5A-5B are orthogonal views of a first and second variant of the foodstuff assembly system, respectively.
Figure 5B:
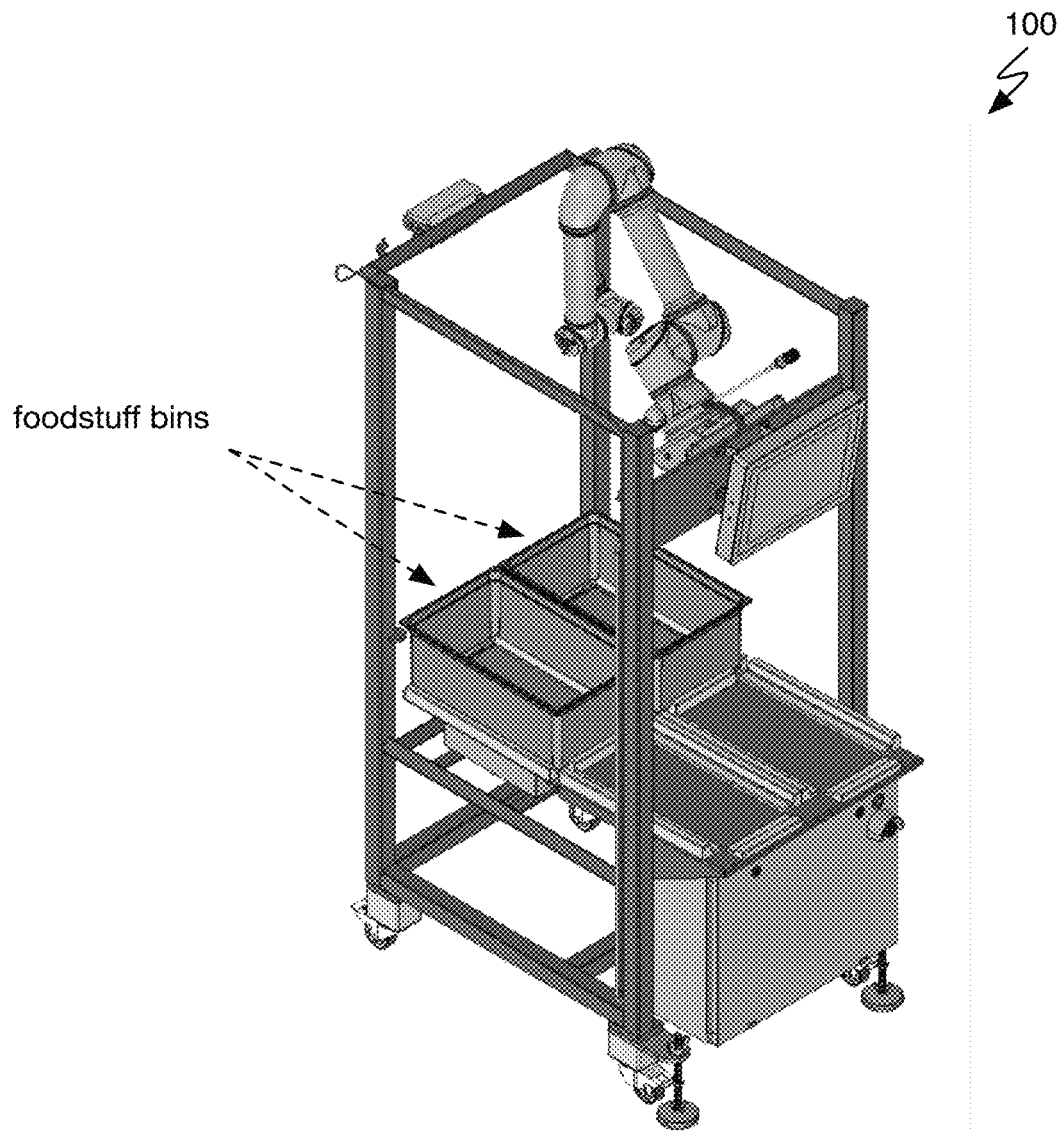
Figure 23:
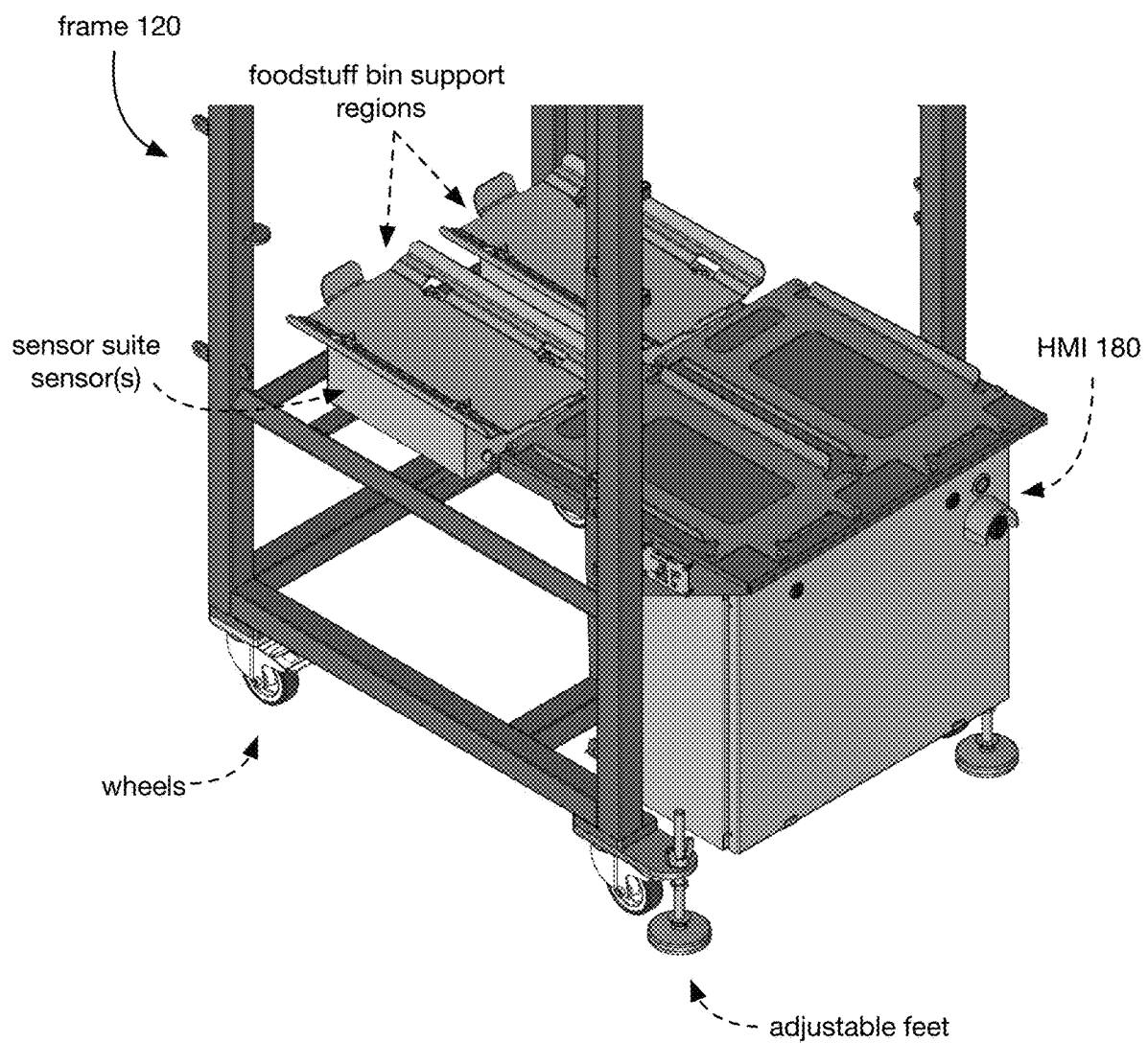
FIG. 23 is a partial orthographic view of a variant of the foodstuff assembly system.

In some variants, the foodstuff assembly system may be configured to continuously operate during ingredient refill (e.g., where the robot arm is a collaborative robot arm). For example, the system can include a plurality (e.g., two) foodstuff bins housing identical (interchangeable) bulk foodstuff, and may continue picking out of a first foodstuff bin while the second bin is being refilled (e.g., in-situ; while supported by the frame assembly; removed for refilling; etc.; examples are shown in FIG. 5B and FIG. 23, etc.).

However, the foodstuff assembly system can be otherwise suitably serviced.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
    based on a first set of depth-image data sampled during a first time period with a camera oriented towards a foodstuff bin, generating a representation of a three-dimensional surface of bulk foodstuff within the foodstuff bin;
    based on the representation, executing a first pick with a food utensil of a robot;
    maintaining the representation over a second time period after execution of the first pick, comprising:
        updating a portion of the representation of the three-dimensional surface based on a second set of data, wherein a remainder of the representation is based on the first set of depth-image data; and
    contemporaneously with maintaining the representation of the three— dimensional surface, repeatedly:
        based on a target portion amount of the bulk foodstuff, generating a pick depth map for the three-dimensional surface, using the representation;

based on the pick depth map, selecting a pick target associated with a coordinate position and a pick-depth below the three-dimensional surface of the foodstuff;

determining control instructions for the robot based on the pick target, the control instructions comprising a robot trajectory; and executing a pick with the food utensil of the robot based on the control instructions.

2. The method of claim 1, wherein the pick depth map is generated using a pretrained neural network.

3. The method of claim 1, wherein selecting the pick target comprises: for each of a set of candidate coordinate positions, determining a respective pick-depth value, wherein the pick target is selected from the set of candidate coordinate positions based on a roughness minimization for the three-dimensional surface.

4. The method of claim 1, wherein the robot comprises a line assembly robot defining an operation cycle between consecutive foodstuff insertions, wherein a respective pick is executed for each respective operation cycle of the line assembly robot, wherein the pick target is selected prior to the respective operation cycle of the robot.

5. The method of claim 4, wherein a duration of the operation cycle is less than 5 seconds.

6. The method of claim 5, further comprising: after selecting the pick target, refining the pick target or the control instructions during an interval prior to execution of the pick.

7. The method of claim 5, wherein the pick target is selected based on a spatiotemporal optimization of the respective operational cycle.

8. The method of claim 1, wherein the robot at least partially occludes a field of view of the camera during a majority of the second time period.

9. The method of claim 1, wherein the representation unitarily models a topography of the bulk foodstuff within foodstuff bin.

10. The method of claim 9, wherein generating the pick depth map comprises: for each of a set of candidate coordinate positions, determining a respective pick-depth value which satisfies the target portion amount based on the food utensil and the topography of the bulk foodstuff.

11. The method of claim 1, further comprising: after the second time period, determining satisfaction of a refill condition, and in response to determining satisfaction, providing a refill notification via a human-machine interface (HMI); subsequently, automatically determining satisfaction of a refill event, and in response to determining satisfaction of the refill event, regenerating the representation.

12. The method of claim 1, wherein the pick target is selected based on a success probability generated by a trained neural network.

13. The method of claim 1, wherein the target portion amount comprises a predetermined target mass.

14. The method of claim 1, wherein executing the pick comprises picking, with the food utensil, a volume of the bulk foodstuff below the three-dimensional surface of the bulk foodstuff by controlling the robot along the robot trajectory.

15. The method of claim 1, wherein, during the second time period, the representation of the three-dimensional surface is maintained under a monotonically-decreasing-height constraint.

16. The method of claim 15, wherein the monotonically-decreasing-height constraint is applied at each coordinate position of the representation.

* * * * *